(12) United States Patent
Arunachalam et al.

(10) Patent No.: US 11,391,193 B2
(45) Date of Patent: Jul. 19, 2022

(54) SYSTEMS AND METHODS FOR MOUNTING A DOSER TO A COMPONENT OF AN EXHAUST AFTERTREATMENT SYSTEM

(71) Applicant: Cummins Emission Solutions Inc., Columbus, IN (US)

(72) Inventors: Lakshmanan Arunachalam, Columbus, IN (US); Christopher A. Thompson, Columbus, IN (US); Pradnya Pranav Ballal, Ahmednagar (IN); Elliot Dilger, Jasper, IN (US); Nathan Hansen, Stoughton, WI (US); Taren DeHart, Columbus, IN (US); Mahendra Mittapalli, Pune (IN); Aaron Riedel, Madison, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/472,984

(22) Filed: Sep. 13, 2021

(65) Prior Publication Data
US 2022/0018274 A1     Jan. 20, 2022

Related U.S. Application Data

(63) Continuation of application No. PCT/US2020/022347, filed on Mar. 12, 2020.
(Continued)

(51) Int. Cl.
*F01N 3/02* (2006.01)
*F01N 3/24* (2006.01)
(Continued)

(52) U.S. Cl.
CPC ............. *F01N 3/24* (2013.01); *F01N 3/2066* (2013.01); *F01N 13/1805* (2013.01); *F01N 2450/24* (2013.01); *F01N 2610/1453* (2013.01)

(58) Field of Classification Search
CPC ............... F01N 3/24; F01N 13/1805; F01N 2610/1453; F01N 2450/00; F01N 13/18; F01N 13/00; F02M 61/14
(Continued)

(56) References Cited

U.S. PATENT DOCUMENTS

| 1,035,782 A | 8/1912 | Fowler |
| 5,102,090 A * | 4/1992 | Farris ............... E05F 15/697 310/91 |

(Continued)

FOREIGN PATENT DOCUMENTS

| GB | 2 549 507 A | 10/2017 |
| WO | WO-2019/201981 A1 | 10/2019 |

OTHER PUBLICATIONS

International Search Report and Written Opinion issued for PCT Application No. PCT/US20/22347, dated Jun. 10, 2020, 18 pages.

*Primary Examiner* — Jason D Shanske
(74) *Attorney, Agent, or Firm* — Foley & Lardner LLP

(57) ABSTRACT

A doser mounting bracket for coupling a doser to an exhaust gas aftertreatment system component having a sidewall and an exhaust gas aftertreatment system component opening includes a lower surface, an engagement wall, a central structure, an upper surface, and an attachment structure. The lower surface is configured to be held in a position opposing the sidewall. The engagement wall extends from the lower surface. The central structure has an opening that extends therethrough and includes a centering structure that extends from the lower surface and is configured to be received within the exhaust gas aftertreatment system component opening. The attachment structure extends from the upper surface and is configured to be coupled to the doser. The engagement wall is configured to separate the lower surface from the sidewall when the engagement wall interfaces with (Continued)

the sidewall such that a pocket is formed between the engagement wall, the centering structure, and the lower surface.

42 Claims, 38 Drawing Sheets

Related U.S. Application Data

(60) Provisional application No. 62/818,550, filed on Mar. 14, 2019, provisional application No. 62/883,203, filed on Aug. 6, 2019.

(51) Int. Cl.
*F01N 3/20* (2006.01)
*F01N 13/18* (2010.01)

(58) Field of Classification Search
USPC .......................................................... 60/317
See application file for complete search history.

(56) References Cited

U.S. PATENT DOCUMENTS

| | | | |
|---|---|---|---|
| 6,996,976 B2* | 2/2006 | Rumminger | F16L 41/12 60/272 |
| 8,327,829 B2 | 12/2012 | Keidel et al. | |
| 11,248,508 B2* | 2/2022 | Grünig | F01N 3/2073 |
| 2003/0226412 A1 | 12/2003 | Rumminger et al. | |
| 2008/0236147 A1* | 10/2008 | Van Vuuren | F01N 3/2066 60/286 |
| 2010/0024406 A1* | 2/2010 | Pollitt | F01N 3/36 123/470 |
| 2012/0090305 A1 | 4/2012 | Floyd et al. | |
| 2013/0219871 A1* | 8/2013 | Crandell | F01N 3/24 60/295 |
| 2014/0196442 A1 | 7/2014 | Katou et al. | |
| 2014/0237998 A1 | 8/2014 | Fahrenkrug et al. | |
| 2015/0135683 A1* | 5/2015 | Petry | F01N 3/2006 60/301 |
| 2015/0252711 A1 | 9/2015 | Muruganantham et al. | |
| 2015/0285200 A1* | 10/2015 | Niaz | F01N 3/021 123/470 |
| 2016/0153334 A1 | 6/2016 | Assalve et al. | |
| 2016/0160735 A1 | 6/2016 | Kapale et al. | |
| 2016/0201539 A1* | 7/2016 | Tongu | B01D 53/9431 422/171 |
| 2016/0348559 A1 | 12/2016 | Hirayama et al. | |
| 2018/0328249 A1* | 11/2018 | Upadhye | F01N 3/2066 |
| 2018/0328250 A1* | 11/2018 | Upadhye | F02M 53/043 |

\* cited by examiner

SYSTEMS AND METHODS FOR MOUNTING A DOSER TO A COMPONENT OF AN EXHAUST AFTERTREATMENT SYSTEM

CROSS-REFERENCE TO RELATED PATENT APPLICATIONS

This application is a continuation of PCT Application No. PCT/US2020/022347, filed Feb. 12, 2020, which claims the benefit of U.S. Provisional Patent Application No. 62/818,550, filed Mar. 14, 2019, and U.S. Provisional Patent Application No. 62/883,203, filed Aug. 6, 2019. The contents of these applications are incorporated herein by reference in their entireties.

TECHNICAL FIELD

The present application relates generally to systems and methods for mounting a doser to a component of an exhaust gas aftertreatment system of an internal combustion engine.

BACKGROUND

For internal combustion engines, such as diesel engines, nitrogen oxide ($NO_x$) compounds may be emitted in exhaust. It may be desirable to reduce $NO_x$ emissions to comply with environmental regulations, for example. To reduce $NO_x$ emissions, a reductant may be dosed into the exhaust by a doser within an aftertreatment system. The reductant facilitates conversion of a portion of the exhaust into non-$NO_x$ emissions, such as nitrogen ($N_2$), carbon dioxide ($CO_2$), and water ($H_2O$), thereby reducing $NO_x$ emissions.

The doser is attached to a component of aftertreatment system. Typically, this attachment causes a substantial amount of heat to be transferred from the component of the exhaust gas aftertreatment system to the doser. This heat can negatively impact the performance and/or operation of the doser. Additionally, this heat can structurally comprise the joint between the doser and the component, which is undesirable.

SUMMARY

In one implementation of the present disclosure, a doser mounting bracket for coupling a doser to an exhaust gas aftertreatment system component having a sidewall and an exhaust gas aftertreatment system component opening includes a lower surface, an engagement wall, a central structure, an upper surface, and an attachment structure. The lower surface is configured to be held in a position opposing the sidewall. The engagement wall extends from the lower surface and is configured to interface with the sidewall. The central structure has an opening that extends therethrough. The central structure includes a centering structure that extends from the lower surface and is configured to be received within the exhaust gas aftertreatment system component opening. The attachment structure extends from the upper surface and is configured to be coupled to the doser. The engagement wall is configured to separate the lower surface from the sidewall when the engagement wall interfaces with the sidewall such that a pocket is formed between the engagement wall, the centering structure, and the lower surface.

In some embodiments, the centering structure includes a lug receiver configured to receive a lug when the centering structure is received within the exhaust gas aftertreatment system component opening. In some embodiments, the engagement wall is defined by a first radius of curvature that is substantially equal to a second radius of curvature that defines the sidewall.

In some embodiments, the central structure further includes a central support extending from the upper surface around the opening that extends through the central structure. In some embodiments, the central structure includes a first annular wall and a second annular wall located radially inwards from the first annular wall. In some embodiments, the central structure includes an upper wall and a lower wall that is spaced from the upper wall. In some embodiments, the opening is defined by an annular central wall that is attached to and extends between an inner periphery of the upper wall and an inner periphery of the lower wall of the central structure.

In some embodiments, the first annular wall extends upwards from an outer periphery of the lower wall and the second annular wall extends upwards from an outer periphery of the upper wall. In some embodiments, the central structure includes a connector wall extending between an upper portion of the first annular wall and an upper portion of the second annular wall.

In some embodiments, a cavity is defined by the first annular wall and second annular wall of the circular structure, the upper wall, the lower wall, the annular central wall, and the connector wall. One or more openings may extend through the central structure and fluidly couple the cavity with an ambient environment. In some embodiments, the one or more openings extend through the connector wall.

In some embodiments, the mounting bracket includes a first wall having the upper surface and a second wall having the lower surface. The first wall and second wall are spaced from one another. In some embodiments, an outer periphery of each of the first wall and the second wall is attached to an inner surface of the engagement wall, and an inner periphery of each of the first wall and the second wall is attached to an exterior surface of the central structure. In some embodiments, the first wall, the second wall, the engagement wall and the central structure define a cavity. A plurality of openings may extend through the first wall and fluidly couple the cavity with an ambient environment. The second wall may be a solid structure without any openings extending therethrough. In some embodiments, at least one of the first wall and the second wall defines an undulating surface. In some embodiments, each of the first wall and the second wall defines an undulating surface. A thickness of the first wall may be different than a thickness of the second wall. For example, the thickness of the first wall may be less than the thickness of the second wall. In some embodiments at least one of the first wall and second wall has a varying thickness.

In some embodiments, the attachment structure includes a plurality of attachment structures extending from various locations along the upper surface. Each attachment structure may include a boss. In some embodiments, the doser mounting bracket includes a plurality of support structures. Each support structure extends from the upper surface between the central structure and a respective one of the bosses. In some embodiments, each support structure includes one or more fins. The cross-section of each support structure may be defined by a variety of different types of multifaceted configurations. For example, each support structure may have an I-shaped cross-section, a T-shaped cross-section, an X-shaped cross-section, a V-shaped cross-section, etc.

In some embodiments, the doser mounting bracket includes a plurality of support struts extending between an exterior of each attachment structure and the upper surface.

In some embodiments, a height of each attachment structure is greater than a height of the central structure. In some embodiments, the upper surface extends concavely between the upper surfaces of the attachment structures and the central support. In some embodiments, the mounting bracket includes a single, monolithic wall having each of the upper surface and the lower surface.

In some embodiments, a doser mounting bracket for coupling a doser to an exhaust gas aftertreatment system component having a sidewall and an exhaust gas aftertreatment system component opening, includes an engagement wall, a lower surface, an upper surface, a doser mounting bracket opening, and an attachment structure. The lower surface is bordered by the engagement wall, the lower surface recessed relative to the engagement wall so as to cooperate with the engagement wall and the sidewall to define a pocket when the doser mounting bracket is coupled to the sidewall. The upper surface is opposite the lower surface. The upper surface is configured to be in confronting relation with the doser when the doser is coupled to the doser mounting bracket. The doser mounting bracket opening extends through the upper surface and the lower surface. The doser mounting bracket opening is configured to receive a portion of the doser when the doser is coupled to the doser mounting bracket. The attachment structure protrudes from the upper surface and configured to receive a fastener for coupling the doser to the doser mounting bracket.

In some embodiments, an exhaust gas aftertreatment system includes an exhaust gas aftertreatment system component, a doser mounting bracket, and a doser. The exhaust gas aftertreatment system component includes a sidewall having an exhaust gas aftertreatment system component opening. The doser mounting bracket is configured to be coupled to the sidewall. The doser mounting bracket includes an engagement wall, a lower surface, an upper surface, and a doser mounting bracket opening. The lower surface is bordered by the engagement wall. The lower surface is recessed relative to the engagement wall so as to cooperate with the engagement wall and the sidewall to define a pocket when the doser mounting bracket is coupled to the sidewall. The upper surface is opposite the lower surface. The doser mounting bracket opening extends through the upper surface and the lower surface. The doser mounting bracket opening is configured to be aligned with the exhaust gas aftertreatment system component opening when the doser mounting bracket is coupled to the sidewall. The doser is configured to be coupled to the doser mounting bracket. The doser is configured to be separated from the sidewall by the doser mounting bracket when the doser is coupled to the doser mounting bracket and the doser mounting bracket is coupled to the sidewall.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
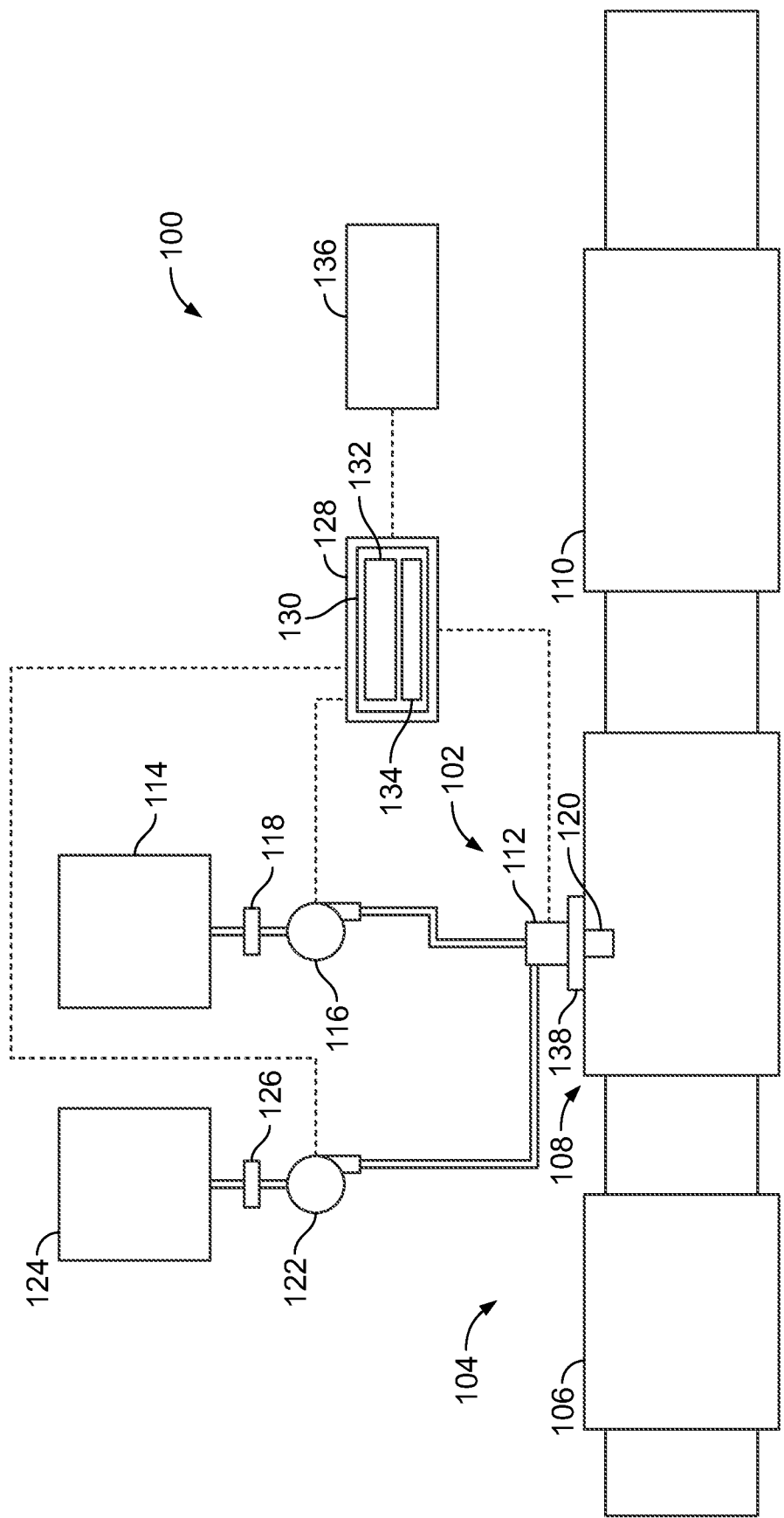
FIG. 1 is a block schematic diagram of an example exhaust gas aftertreatment system.

It will be recognized that some or all of the Figures are schematic representations for purposes of illustration. The Figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods and apparatuses for mounting a doser to a component of an exhaust gas aftertreatment system of an internal combustion engine. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gas that is often treated by a doser within an exhaust gas aftertreatment system. The doser typically treats exhaust gas using a reductant. The reductant is adsorbed by a catalyst. The adsorbed reductant in the catalyst functions to reduce $NO_x$ in the exhaust gas.

The doser is mounted on a component of the exhaust gas aftertreatment system. For example, the doser may be mounted on a decomposition reactor, an exhaust conduit, or other similar component of the exhaust gas aftertreatment system. As exhaust gas flows through the component of the exhaust gas aftertreatment system, the doser may be heated. It is desirable to maintain the temperature of the doser below a threshold at which performance of the doser may be negatively impacted. Heat may be transferred to the doser via conduction through a mounting bracket holding the doser to the component.

Implementations herein are directed to a doser mounting bracket incorporating features that mitigate the transfer of heat from the exhaust gas aftertreatment system component to the doser. For example, the doser mounting bracket forms a pocket (e.g., a gap, etc.) between a lower surface of the doser mounting bracket and a sidewall of the exhaust gas aftertreatment system component and/or between an upper surface of the doser mounting bracket and a lower portion of the doser. Air is contained within the pocket and functions as a thermal barrier which mitigates heat transfer to the doser. Other systems do not create such a pocket between a doser and a structure. As a result, the doser mounting bracket described herein is capable of maintaining the doser at a lower temperature than is possible in other systems which do not create a thermal barrier using a mounting bracket for the doser.

Additionally, the doser mounting bracket described herein includes features that facilitate repeated accurate installation on the exhaust gas aftertreatment system component. For example, the lower surface includes a centering structure that is received within an opening in the exhaust gas aftertreatment system component and has a lug receiver that receives a lug on the sidewall of the exhaust gas aftertreatment system component. The lug and lug receiver cooperate to resist rotation of the doser mounting bracket relative to the exhaust gas aftertreatment system component and aid in installing the doser mounting bracket in a target orientation. Furthermore, the doser mounting bracket described herein is capable of mounting flush with a sidewall of the exhaust gas aftertreatment system component. This may minimize warping and enable the doser mounting bracket to be less expensive to manufacture and install than other brackets that do not mount flush with a curved surface.

II. Overview of Exhaust Gas Aftertreatment System

FIG. 1 depicts an exhaust gas aftertreatment system 100 having an example reductant delivery system 102 for an exhaust conduit system 104. The exhaust gas aftertreatment system 100 includes the reductant delivery system 102, a particulate filter (e.g., a diesel particulate filter (DPF)) 106, a decomposition chamber 108 (e.g., reactor, reactor pipe, etc.), and an SCR catalyst 110.

The DPF 106 is configured to (e.g., structured to, able to, etc.) remove particulate matter, such as soot, from exhaust gas flowing in the exhaust conduit system 104. The DPF 106 includes an inlet, where the exhaust gas is received, and an outlet, where the exhaust gas exits after having particulate matter substantially filtered from the exhaust gas and/or converting the particulate matter into carbon dioxide. In some implementations, the DPF 106 may be omitted.

The decomposition chamber 108 is configured to convert a reductant into ammonia. The reductant may be, for example, urea, diesel exhaust fluid (DEF), Adblue®, a urea water solution (UWS), an aqueous urea solution (e.g., AUS32, etc.), and/or other similar fluids. The decomposition chamber 108 includes an inlet in fluid communication with the DPF 106 to receive the exhaust gas containing NOx emissions and an outlet for the exhaust gas, $NO_x$ emissions, ammonia, and/or reductant to flow to the SCR catalyst 110.

The reductant delivery system 102 includes a doser 112 (e.g., dosing module, etc.) configured to dose the reductant into the decomposition chamber 108 (e.g., via an injector). The doser 112 is mounted to the decomposition chamber 108 such that the doser 112 may dose the reductant into the exhaust gas flowing through the exhaust conduit system 104. The doser 112 may include an insulator interposed between a portion of the doser 112 and the portion of the decomposition chamber 108 on which the doser 112 is mounted.

The doser 112 is fluidly coupled to (e.g., fluidly configured to communicate with, etc.) a reductant source 114. The reductant source 114 may include multiple reductant sources 114. The reductant source 114 may be, for example, a diesel exhaust fluid tank containing Adblue®. A reductant pump 116 (e.g., supply unit, etc.) is used to pressurize the reductant from the reductant source 114 for delivery to the doser 112. In some embodiments, the reductant pump 116 is pressure-controlled (e.g., controlled to obtain a target pressure, etc.). The reductant pump 116 includes a reductant filter 118. The reductant filter 118 filters (e.g., strains, etc.) the reductant prior to the reductant being provided to internal components (e.g., pistons, vanes, etc.) of the reductant pump 116. For example, the reductant filter 118 may inhibit or prevent the transmission of solids (e.g., solidified reductant, contaminants, etc.) to the internal components of the reductant pump 116. In this way, the reductant filter 118 may facilitate prolonged desirable operation of the reductant pump 116. In some embodiments, the reductant pump 116 is coupled (e.g., fastened, attached, affixed, welded, etc.) to a chassis of a vehicle associated with the exhaust gas aftertreatment system 100.

The doser 112 includes at least one injector 120. Each injector 120 is configured to dose the reductant into the exhaust gas (e.g., within the decomposition chamber 108, etc.). In some embodiments, the reductant delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the doser 112 via a conduit. In these embodiments, the doser 112 is configured to mix the air and the reductant into an air-reductant mixture and to provide the air-reductant mixture into the decomposition chamber 108. In other embodiments, the reductant delivery system 102 does not include the air pump 122 or the air source 124. In such embodiments, the doser 112 is not configured to mix the reductant with air.

The doser 112 and the reductant pump 116 are also electrically or communicatively coupled to a reductant delivery system controller 128. The reductant delivery system controller 128 is configured to control the doser 112 to dose the reductant into the decomposition chamber 108. The reductant delivery system controller 128 may also be configured to control the reductant pump 116.

The reductant delivery system controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the reductant delivery system controller 128 can read instructions. The instructions may include code from any suitable programming language. The memory 134 may include various modules that include instructions which are configured to be implemented by the processor 132.

In various embodiments, the reductant delivery system controller 128 is configured to communicate with a central controller 136 (e.g., engine control unit (ECU)), engine control module (ECM), etc.) of an internal combustion engine having the exhaust gas aftertreatment system 100. In some embodiments, the central controller 136 and the reductant delivery system controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 136. By changing state, the display device may provide an indication to a user (e.g., operator, etc.) of a status (e.g., operation, in need of service, etc.) of the reductant delivery system 102.

The decomposition chamber 108 is located upstream of the SCR catalyst 110. As a result, the reductant is injected upstream of the SCR catalyst 110 such that the SCR catalyst 110 receives a mixture of the reductant and exhaust gas. The reductant droplets undergo the processes of evaporation, thermolysis, and hydrolysis to form non-NOx emissions (e.g., gaseous ammonia, etc.) within the exhaust conduit system 104.

The SCR catalyst 110 includes an inlet in fluid communication with the decomposition chamber 108 from which exhaust gas and reductant are received and an outlet in fluid communication with an end of the exhaust conduit system 104.

The exhaust gas aftertreatment system 100 may further include an oxidation catalyst (e.g., a diesel oxidation catalyst (DOC)) in fluid communication with the exhaust conduit system 104 (e.g., downstream of the SCR catalyst 110 or upstream of the DPF 106) to oxidize hydrocarbons and carbon monoxide in the exhaust gas.

In some implementations, the DPF 106 may be positioned downstream of the decomposition chamber 108. For instance, the DPF 106 and the SCR catalyst 110 may be combined into a single unit. In some implementations, the doser 112 may instead be positioned downstream of a turbocharger or upstream of a turbocharger.

The exhaust gas aftertreatment system 100 also includes a doser mounting bracket 138 (e.g., mounting bracket, coupler, plate, etc.). The doser mounting bracket 138 couples the doser 112 to a component of the exhaust gas aftertreatment system 100. As is explained in more detail herein, the doser mounting bracket 138 is configured to mitigate the transfer of heat from the exhaust gas passing through the exhaust conduit system 104 to the doser 112. In this way, the doser 112 is capable of operating more efficiently and desirably than other dosers which are not able to mitigate the transfer of heat. Additionally, as explained in more detail herein, the doser mounting bracket 138 is configured to aid in reliable installation of the doser 112. This may decrease manufacturing costs associated with the exhaust gas aftertreatment system 100 and ensure repeated desirable installation of the doser 112.

In various embodiments, the doser mounting bracket 138 couples the doser 112 to the decomposition chamber 108. In some embodiments, the doser mounting bracket 138 couples the doser 112 to an exhaust conduit of the exhaust conduit system 104. For example, the doser mounting bracket 138 may couple the doser 112 to an exhaust conduit of the exhaust conduit system 104 that is upstream of the decomposition chamber 108 or to an exhaust conduit of the exhaust conduit system 104 that is downstream of the decomposition chamber 108. In some embodiments, the doser mounting bracket 138 couples the doser 112 to the DPF 106 and/or the SCR catalyst 110. The location of the doser mounting bracket 138 may be varied depending on the application of the exhaust gas aftertreatment system 100. For example, in some exhaust gas aftertreatment systems 100, the doser mounting bracket 138 may be located further upstream than in other exhaust gas aftertreatment systems 100. Furthermore, some exhaust gas aftertreatment systems 100 may include multiple dosers 112 and therefore may include multiple doser mounting brackets 138.

III. Example Doser Mounting Bracket

FIGS. 2-22 depict the doser mounting bracket 138 in greater detail according to various embodiments. The doser mounting bracket 138 is coupled to an exhaust gas aftertreatment system component 200 (e.g., conduit, housing, etc.). The exhaust gas aftertreatment system component 200 may be, for example, an exhaust conduit of the exhaust conduit system 104, the decomposition chamber 108, the DPF 106, and/or the SCR catalyst 110.

The exhaust gas aftertreatment system component 200 includes a sidewall 202 (e.g., wall, etc.) and an exhaust gas aftertreatment system component opening 204 (e.g., hole, aperture, etc.). The exhaust gas aftertreatment system component opening 204 extends through the sidewall 202 and facilitates communication (e.g., fluid communication, etc.) through the sidewall 202. The doser mounting bracket 138 is positioned about (e.g., disposed about, disposed around, etc.) the exhaust gas aftertreatment system component opening 204. A lower surface (e.g., bottom surface, etc.) of the doser mounting bracket 138 interfaces with, or is located in confronting relation with, the sidewall 202 when the doser mounting bracket 138 is coupled to the exhaust gas aftertreatment system component 200. The doser mounting bracket 138 includes an upper surface (e.g., top surface, etc.) opposite the lower surface and that interfaces with, or is located in confronting relation with, the doser 112 when the doser mounting bracket 138 is coupled to the exhaust gas aftertreatment system component 200.

The doser mounting bracket 138 is configured to be (e.g., structured to be, capable of being, etc.) separately coupled to the exhaust gas aftertreatment system component 200 and the doser 112. For example, the doser mounting bracket 138 may be coupled to the doser 112 first, and then the doser mounting bracket 138, together with the doser 112, may be coupled to the exhaust gas aftertreatment system component 200. Similarly, in some embodiments, the doser 112 may be removed from (e.g., decoupled from, etc.) the doser mounting bracket 138 while the doser mounting bracket 138 remains coupled to the exhaust gas aftertreatment system component 200 (e.g., to perform servicing of the doser 112, to perform replacement of the doser 112, etc.). Furthermore, in some embodiments, the doser mounting bracket 138 may be coupled to the exhaust gas aftertreatment system component 200 and the doser 112 may be subsequently coupled to the doser mounting bracket 138. When the doser mounting bracket 138 is coupled to the exhaust gas aftertreatment system component 200 and the doser 112, the injector 120 is aligned with the exhaust gas aftertreatment system component opening 204. In some embodiments, the injector 120 protrudes into and/or through the exhaust gas aftertreatment system component opening 204 when the doser mounting bracket 138 is coupled to the exhaust gas aftertreatment system component 200 and the doser 112.

The sidewall 202 to which the doser mounting bracket 138 is coupled is at least partially cylindrical or curved. The doser mounting bracket 138 is curved to substantially match (e.g., within 2% of, within 5% of, etc.) a curvature of the sidewall 202. In this way, the doser mounting bracket 138 may be mounted flush on the sidewall 202 (e.g., such that a gap between the doser mounting bracket 138 and the sidewall 202 when the doser mounting bracket 138 is coupled to the exhaust gas aftertreatment system component 200 is substantially equal along the doser mounting bracket 138, etc.). This mitigates play (e.g., slop, movement, etc.) between the doser mounting bracket 138 and the sidewall 202 and therefore decreases stress and strain on fasteners, welds, or rivets that couple the doser mounting bracket 138 to the exhaust gas aftertreatment system component 200.

The doser mounting bracket 138 may be defined by any number of different shapes and sizes. In various embodiments, the doser mounting bracket 138 is generally triangular. For example, the doser mounting bracket 138 may be shaped like an isosceles triangle. In other embodiments, the doser mounting bracket 138 is generally square or rectangular. In other embodiments, the doser mounting bracket 138 is generally trapezoidal.

The doser mounting bracket 138 includes a central structure 420 that defines a doser mounting bracket opening 206. The doser mounting bracket opening 206 is configured to be aligned with the exhaust gas aftertreatment system component opening 204 when the doser mounting bracket 138 is coupled to the exhaust gas aftertreatment system component 200. When the doser mounting bracket 138 is coupled to the exhaust gas aftertreatment system component 200 and the doser 112, the injector 120 is aligned with the doser mounting bracket opening 206. In some embodiments, the injector 120 protrudes into and/or through the doser mounting bracket opening 206 when the doser mounting bracket 138 is coupled to the exhaust gas aftertreatment system component 200 and the doser 112.

Figure 3:
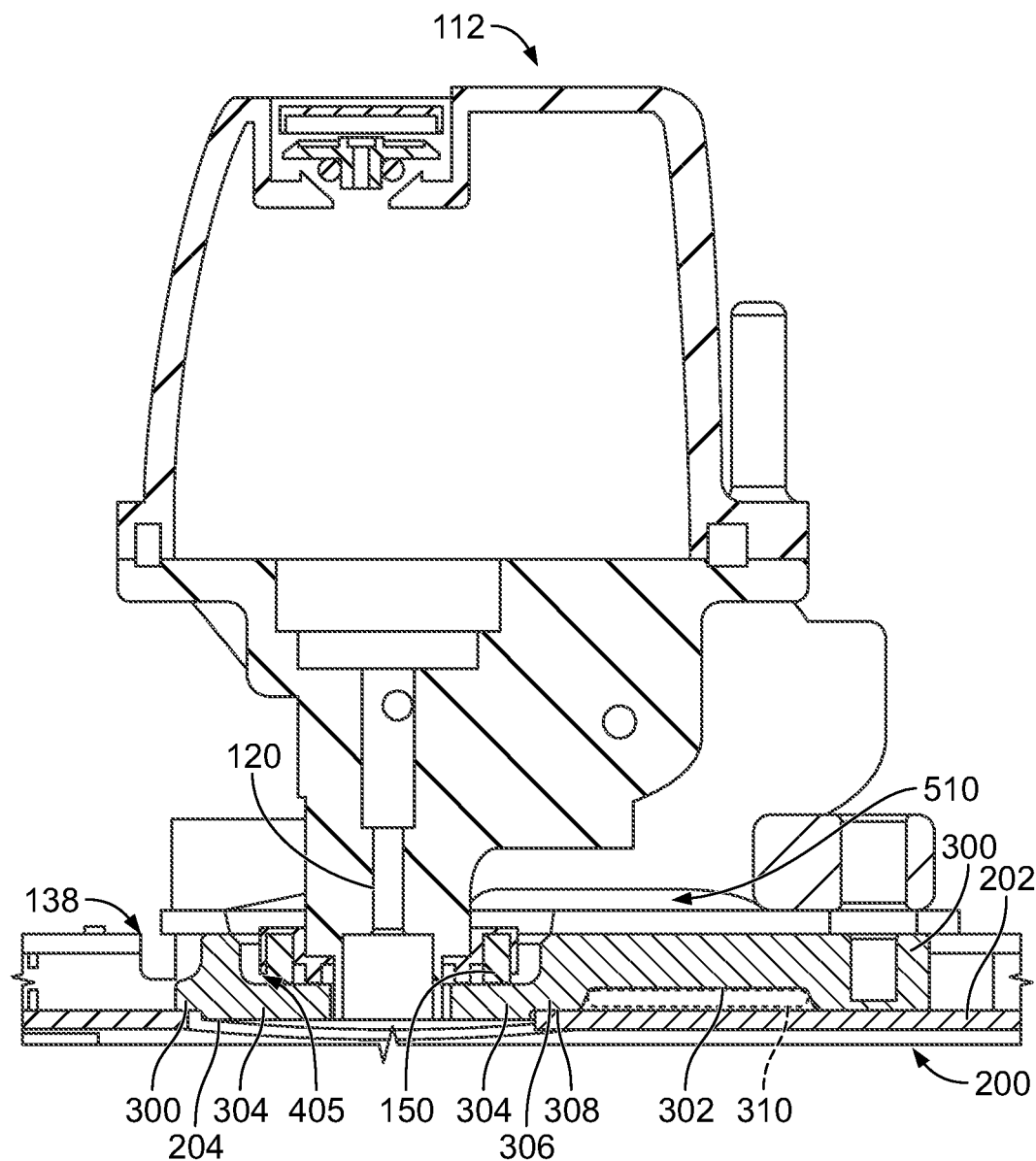
FIG. 3 is a cross-sectional view of doser mounted to an exhaust gas aftertreatment system component via an example doser mounting bracket.

FIG. 3 depicts a cross-sectional view of the doser 112 coupled to the exhaust gas aftertreatment system component 200 via the doser mounting bracket 138. The doser mounting bracket 138 includes an engagement wall 300. The engagement wall 300 borders and extends (e.g., protrudes, etc.) from a lower surface 302 of a bracket wall 350 and is configured to interface with the exhaust gas aftertreatment system component 200. In various embodiments, the engagement wall 300 extends continuously (e.g., in an uninterrupted fashion, etc.) about a perimeter of the lower surface 302 of the bracket wall 350. In other embodiments, the engagement wall 300 is segmented into a plurality of wall segments are arranged about a perimeter of the lower surface 302 of the bracket wall 350.

According to some embodiments, the engagement wall 300 is shaped to only be received on the sidewall 202 when the doser mounting bracket 138 is in a target orientation. This may provide an additional safeguard against misalignment of the doser mounting bracket 138 on the exhaust gas aftertreatment system component 200.

In various embodiments, the engagement wall 300 is shaped to substantially mirror (e.g., match, etc.) the sidewall 202 such that the entirety of, or at a majority of, the engagement wall 300 is in direct contact or in confronting relation with sidewall 202 when the doser mounting bracket 138 is coupled to the exhaust gas aftertreatment system component 200. As a result, warping (e.g., deflecting, etc.) of the doser mounting bracket 138 due to thermal stresses from the exhaust gas may be minimized or prevented. Due to this configuration, welding of the doser mounting bracket 138 to the exhaust gas aftertreatment system component 200 is facilitated. In other systems which do not include the doser mounting bracket 138, warping is not minimized and welds can become compromised and are therefore undesirable.

Additionally, the close conformance of the doser mounting bracket 138 to the sidewall 202 enables the doser mounting bracket 138 to be of a one-piece construction (e.g., unitary construction, such that all components of the doser mounting bracket 138 are structurally integrated, etc.). As a result, the doser mounting bracket 138 can be manufactured using processes (e.g., casting, etc.) that are significantly less expensive than processes required for multi-piece constructions. In various embodiments, the doser mounting bracket 138 is cast from a cobalt alloy (e.g., CB6, etc.). The cobalt alloy may provide increased corrosion resistance from fluids (e.g., urea, etc.) to which the doser mounting bracket 138 may be exposed, compared to non-cobalt alloy structures. In some embodiments, the doser mounting bracket 138 is cast from metal (e.g., stainless steel, etc.).

The central structure 420 of the doser mounting bracket 138 includes a centering structure 304 that extends (e.g., protrudes, etc.) from the lower surface 302 of the bracket wall 350. The centering structure 304 may be contiguous with the engagement wall 300 (e.g., such that the centering structure 304 extends from the engagement wall 300, etc.) or be separate from the engagement wall 300. The centering structure 304 is configured to be received in the exhaust gas aftertreatment system component opening 204. In various embodiments, a thickness of the centering structure 304 is greater than a thickness of the engagement wall 300 (e.g., relative to the lower surface 302, etc.). In this way, when the centering structure 304 is received within the exhaust gas aftertreatment system component opening 204, translation (e.g., along the sidewall 202, etc.) of the doser mounting bracket 138 is resisted or prevented. In this way, an installer of the doser mounting bracket 138 is provided an indication of when the doser mounting bracket 138 is aligned with the exhaust gas aftertreatment system component opening 204. In some embodiments, the centering structure 304 is circular and a diameter of the centering structure 304 is approximately equal to 40 millimeters.

Additionally, the insertion of the centering structure 304 through the exhaust gas aftertreatment system component opening 204 may provide an improved seal that may minimize, or prevent transmission (e.g., leakage, etc.) of fluid (e.g., reductant, exhaust gas, etc.) between the doser mounting bracket 138 and the exhaust gas aftertreatment system component 200. As a result, corrosion of the doser mounting bracket 138 and/or the exhaust gas aftertreatment system component 200 may be mitigated or substantially prevented. In some embodiments, an O-ring, gasket, or other sealing member is included between the doser mounting bracket 138 and the exhaust gas aftertreatment system component 200.

The centering structure 304 includes a lug receiver 306 (e.g., opening, hole, aperture, recess, etc.) and the sidewall 202 includes a lug 308 (e.g., projection, etc.) disposed proximate the exhaust gas aftertreatment system component opening 204. The lug receiver 306 is configured to receive the lug 308 when the centering structure 304 is received within the exhaust gas aftertreatment system component opening 204. The lug 308 and the lug receiver 306 cooperate to resist or prevent rotation of the centering structure 304 within the exhaust gas aftertreatment system component opening 204. In this way, the centering structure 304 ensures consistent alignment of the doser mounting bracket 138 relative to the exhaust gas aftertreatment system component 200 in a target orientation (e.g., clocking, etc.). In some embodiments, insertion of the centering structure 304 into the exhaust gas aftertreatment system component opening 204 is prevented until the lug 308 is aligned with the lug receiver 306 and subsequent insertion of the centering structure 304 into the exhaust gas aftertreatment system component opening 204 causes insertion of the lug 308 into the lug receiver 306.

A diameter of the centering structure 304 may be substantially equal to (e.g., within 5% of, within 3% of, etc.), or less than, a diameter of the exhaust gas aftertreatment system component opening 204.

As shown in FIG. 3, the doser mounting bracket 138 defines a pocket 310 (e.g., void, gap, etc.) between the sidewall 202 and the lower surface 302 of the bracket wall 350. The pocket 310 is bordered by the engagement wall 300 and the centering structure 304. The pocket 310 creates an air gap (e.g., void, etc.) between the sidewall 202 and the lower surface 302. In some embodiments, the doser mounting bracket 138 is configured such that a distance (e.g., height, etc.) between the sidewall 202 and the lower surface 302, when the doser mounting bracket 138 is coupled to the exhaust gas aftertreatment system component 200, is substantially uniform within the pocket.

When the doser mounting bracket 138 is coupled to the exhaust gas aftertreatment system component 200, the doser 112 is coupled to the doser mounting bracket 138, and exhaust gas is flowing through the exhaust gas aftertreatment system component 200, air is located within the pocket 310. The air within the pocket 310 functions as a thermal barrier (e.g., provides thermal insulation, etc.) between the lower surface 302 of the bracket wall 350 and the sidewall 202, thereby mitigating heat transfer from the exhaust gas to the doser 112. As a result, the doser 112 is insulated from heat produced by the exhaust gas flowing within the exhaust gas aftertreatment system component 200. In some embodiments, air inside the pocket 310 is in fluid communication with air outside of the pocket 310 (e.g., air surrounding the doser 112, etc.) such that circulation of air into the pocket 310 and out of the pocket 310 is facilitated. The pocket 310 may be configured to provide a thermal barrier sufficient to maintain the doser 112 at a temperature of approximately 140° C. (e.g., 130° C., 135° C., 145° C., 150° C., etc.) or less when the temperature of the sidewall 202 is approximately 650° C. (e.g., 640° C., 645° C., 655° C., 660° C., etc.) or greater.

In some embodiments, a thermally insulating material (e.g., mica, ceramic material, etc.) is included within the pocket 310. For example, the thermally insulating material may be inserted within the pocket 310 by an operator and located within the pocket 310 when the doser mounting bracket 138 is coupled to the exhaust gas aftertreatment system component 200. In these embodiments, the thermally insulating material may be configured to mitigate heat transfer to a greater extent than air (e.g., the thermally insulating material has a coefficient of thermal conductivity that is less than the coefficient of thermal conductivity of air, etc.).

The doser mounting bracket 138 also includes an upper surface. Portions of the upper surface (e.g. the upper surfaces of attachment structures 406, the upper surface of the central support 404, etc.) of the doser mounting bracket 138 are configured to engage the doser 112 (e.g., to aid in coupling the doser 112 to the doser mounting bracket 138, to support the doser 112, etc.). Each of the attachment structures 406 includes a hole that receives a fastener to couple the doser 112 to the doser mounting bracket 138. However, the holes in the attachment structures 406 are not throughholes. As a result, the fasteners do not directly couple the doser 112 to the exhaust gas aftertreatment system component 200.

The central structure 420 of the doser mounting bracket 138 further includes a central support 404 that extends from the upper surface 400 of the bracket wall 350. The central support 404 circumscribes the doser mounting bracket opening 206 and defines a recess 405. In various embodiments, the central support 404 may be defined by a non-circular shape (e.g., elliptical, ovoid, conical, obround, polygonal, etc.).

The recess 405 defined by the central support 404 is sized to receive a lower portion of the injector 120 when the doser 112 is coupled to the doser mounting bracket 138. In this way the central support 404 is configured to facilitate the alignment of the injector 120 with the doser mounting bracket opening 206 and exhaust gas aftertreatment system component opening 204 when the doser 112 is coupled to the doser mounting bracket 138. Additionally, interactions between the central support 404 and the portion of the injector 120 received within the recess 405 may resist or prevent translation of the doser 112 relative to the doser mounting bracket 138, and therefore relative to the exhaust gas aftertreatment system component 200.

As shown in FIG. 3, a gasket 150 may be inserted into the recess 405 by an operator and located within the recess 405 when the doser mounting bracket 138 is coupled to the exhaust gas aftertreatment system component 200. The gasket 150 may be configured to sealingly engage the injector 120 to minimize (e.g., prevent) the escape of exhaust gases from the exhaust gas aftertreatment system components 200. The gasket 150 may also be made of a thermally insulating material configured to mitigate heat transfer to the doser 112.

Figure 4:
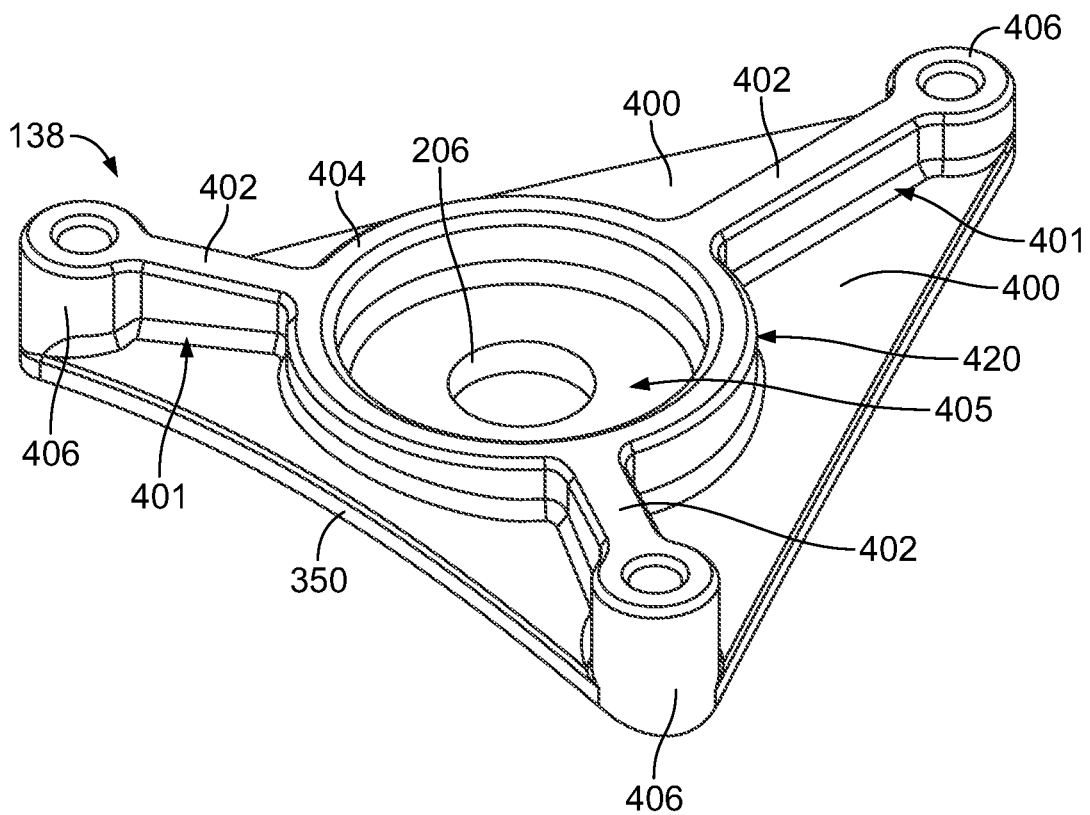
FIG. 4 is a top perspective view of an example doser mounting bracket.
Figure 5:
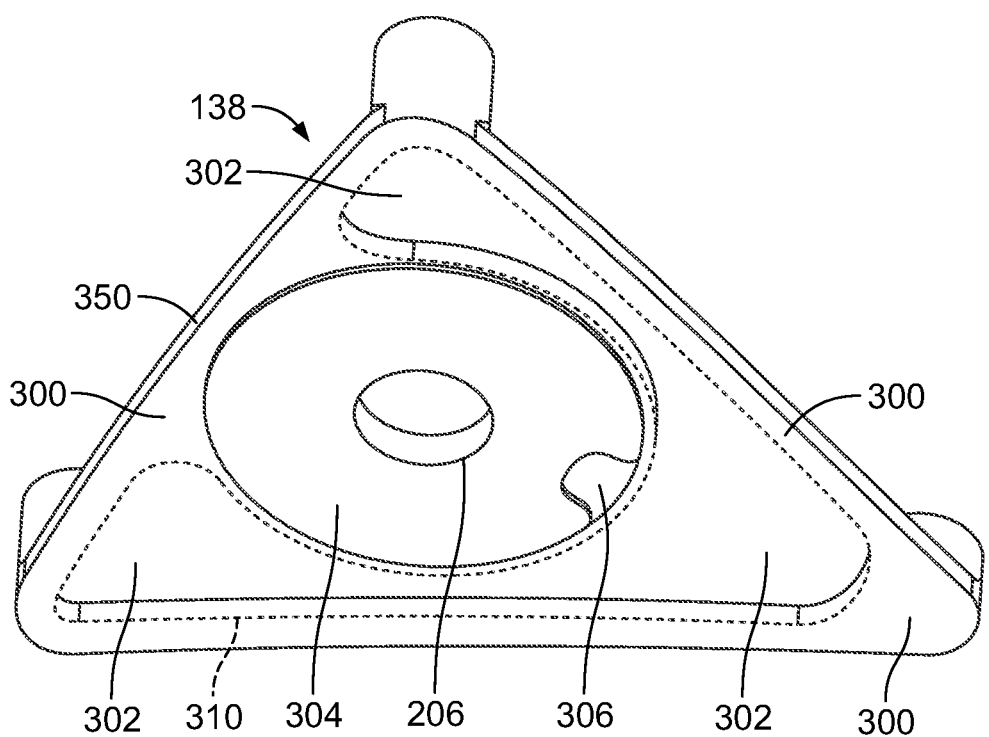
FIG. 5 is a bottom perspective view of the doser mounting bracket of FIG. 4.
Figure 6:
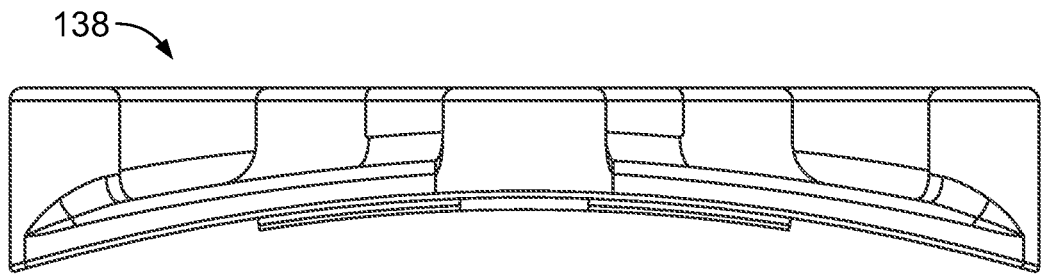
FIG. 6 is a rear view of the doser mounting bracket of FIG. 4.
Figure 7:
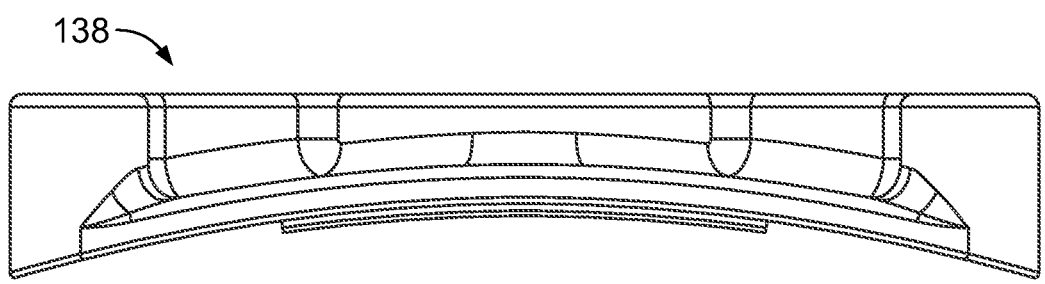
FIG. 7 is a front view of the doser mounting bracket of FIG. 4.
Figure 8:
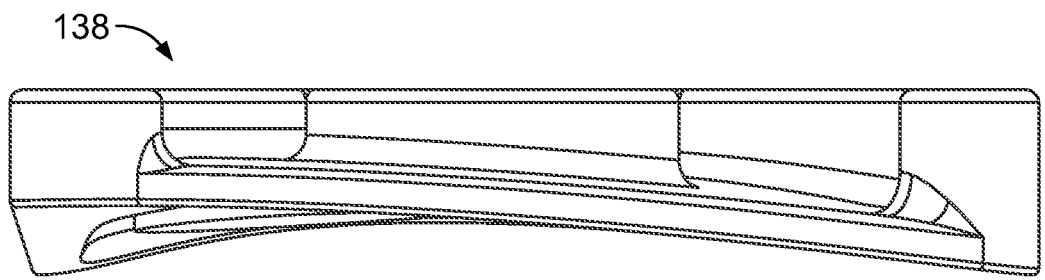
FIG. 8 is a perspective view of the left side of the doser mounting bracket of FIG. 4.
Figure 9:
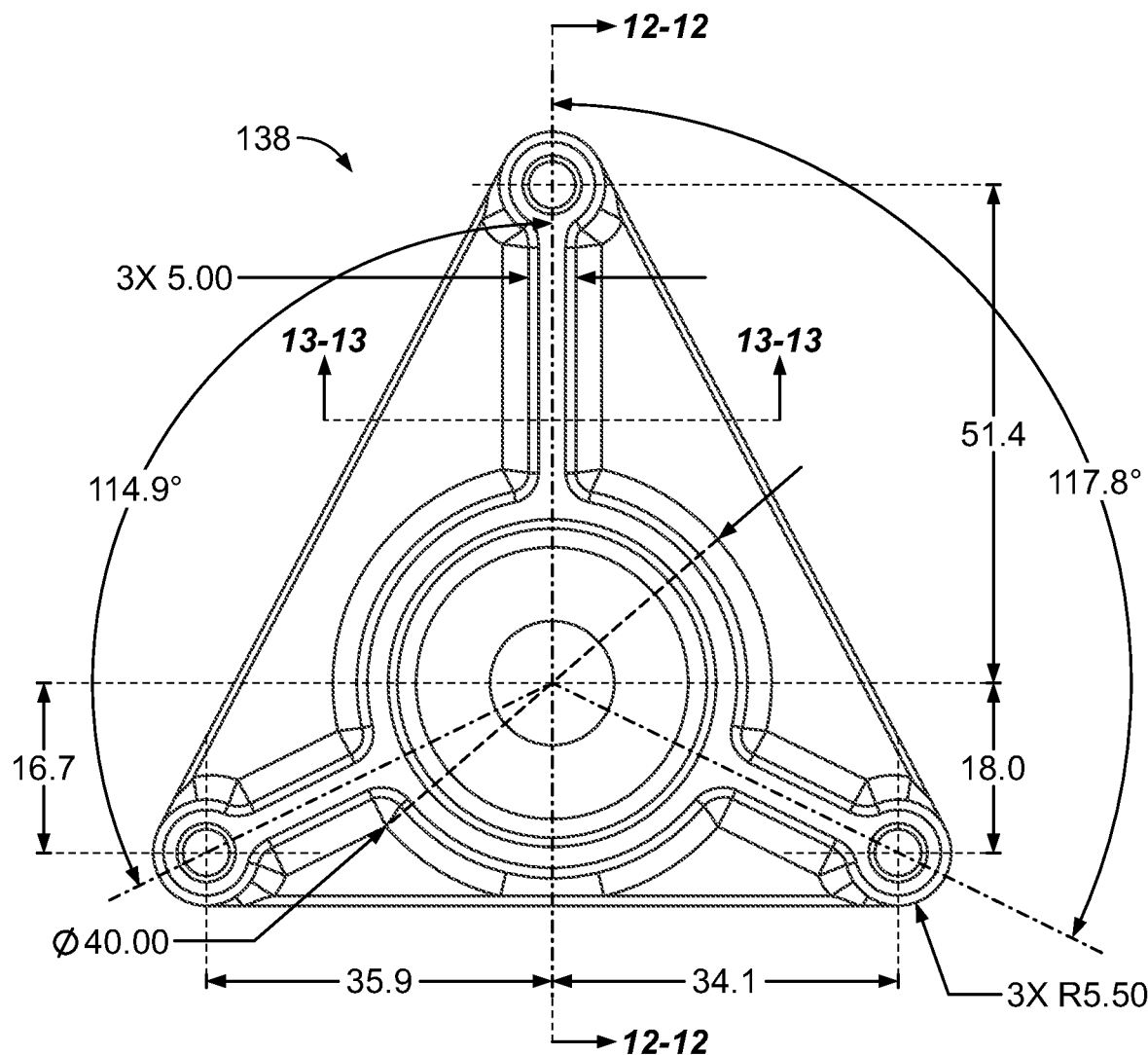
FIG. 9 is a top view of an example doser mounting bracket.
Figure 10:
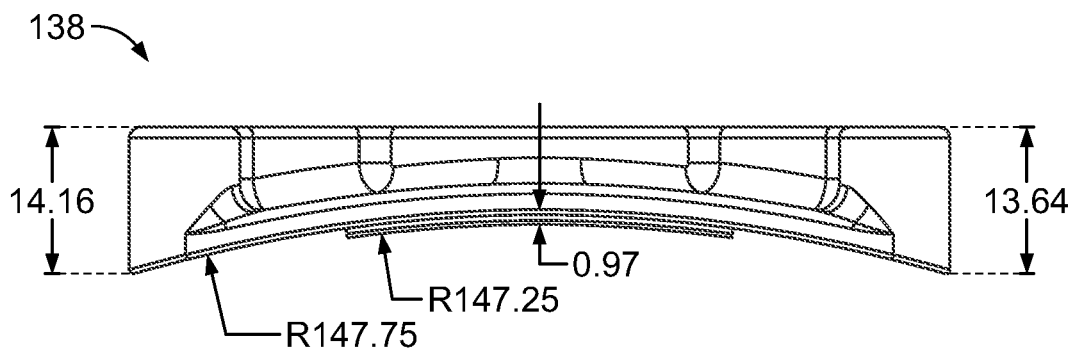
FIG. 10 is a front view of the doser mounting bracket of FIG. 9.
Figure 11:
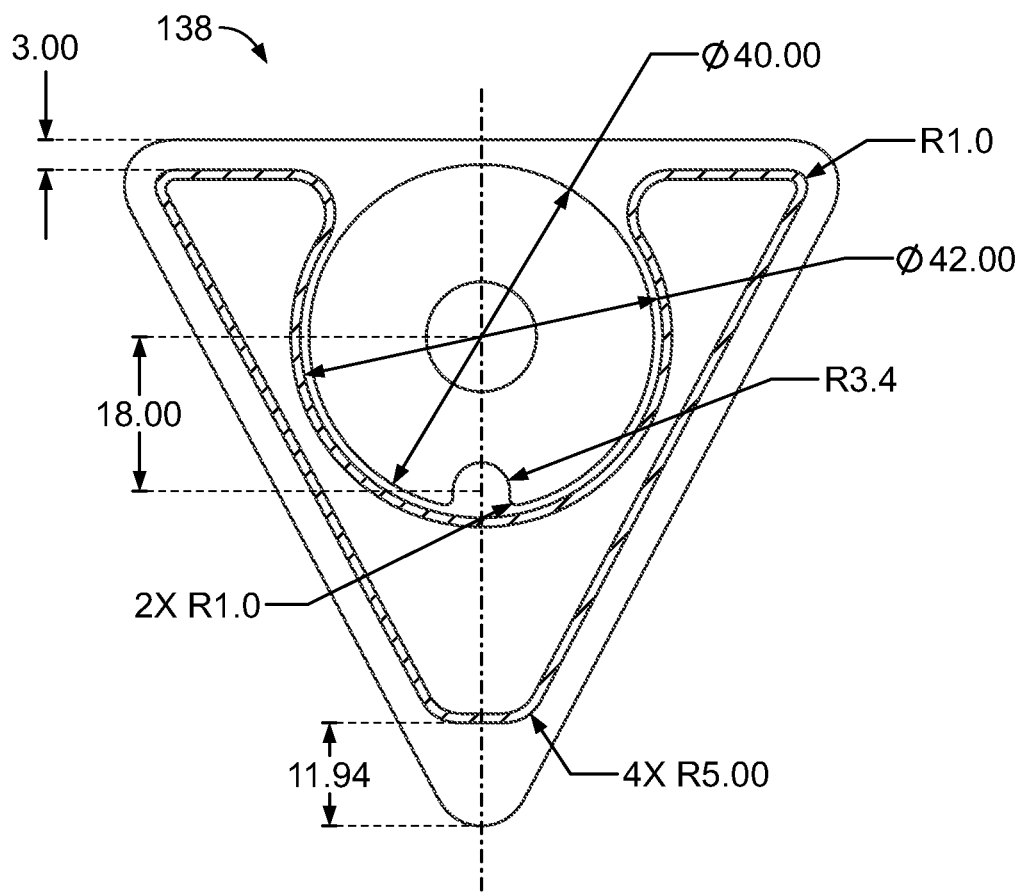
FIG. 11 is a bottom view of the doser mounting bracket of FIG. 9.

Attachment structures 406 (e.g., bosses, standoffs, posts, etc.) extend from the upper surface 400 of the bracket wall 350. The attachment structures 406 may extend from the upper surface 400 of the bracket wall 350 at locations along, or adjacent, an outer periphery of the upper surface 400. Each of the attachment structures 406 is configured to receive a fastener (e.g., screw, bolt, etc.) for coupling the doser mounting bracket 138 to the doser 112. The attachment structures 406 may be threaded. An upper surface of each attachment structure 406 is configured to support the doser 112. As illustrated in FIG. 4, the upper surfaces of the attachment structure 406 and the upper surface of the central support 404 are coplanar, or substantially coplanar (e.g., within ±5 degrees, etc.).

In some embodiments, the doser mounting bracket 138 is symmetrical about a plane that bisects the doser mounting bracket opening 206 and one of the attachment structures 406.

Figure 49:
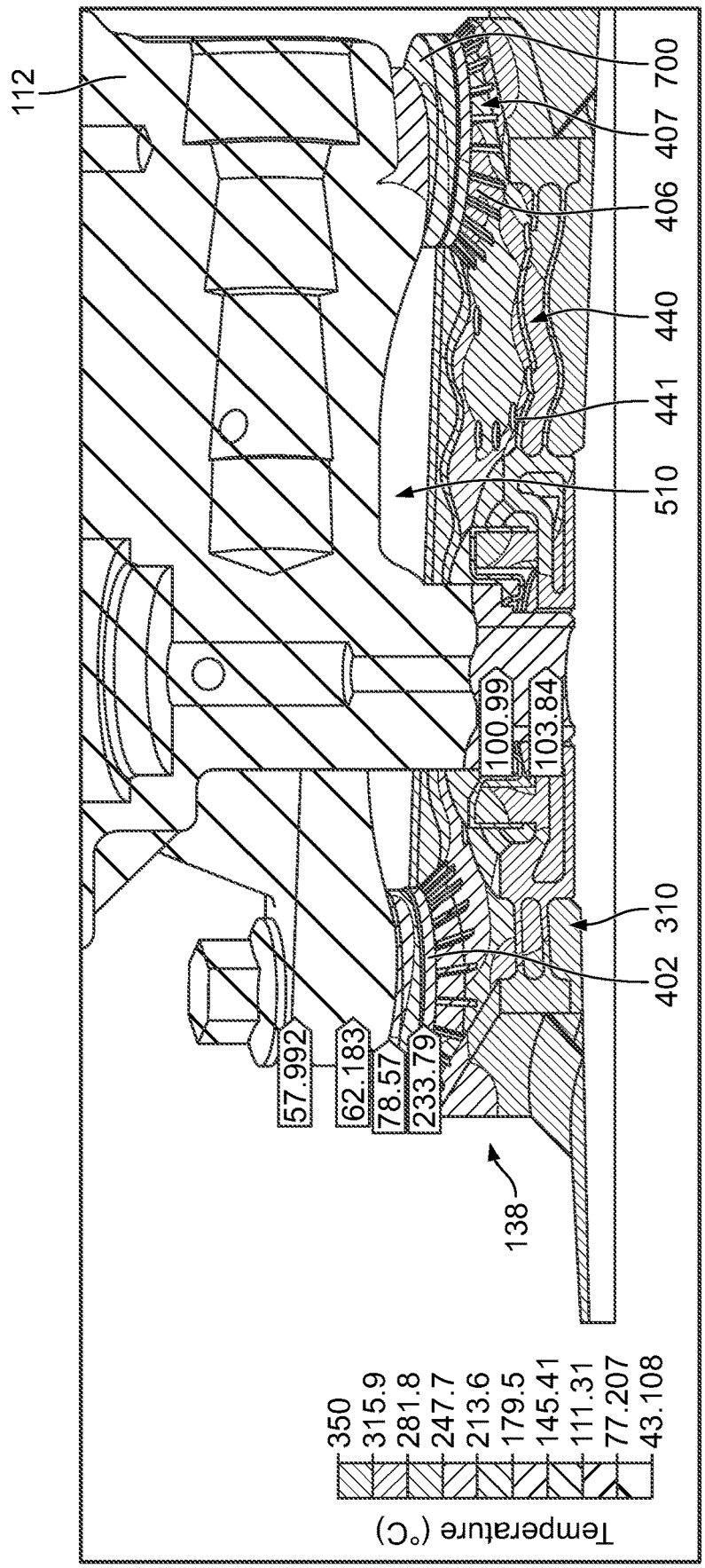
FIG. 49 is a heat map illustrating heat transfer from an exhaust gas aftertreatment system component to a doser mounted to the example mounting bracket of FIG. 48 with a thermal insulating material provided between the doser and the doser mounting bracket.

In some embodiments, thermally insulating material (e.g., mica, ceramic material, etc.) is positioned by an operator between the upper surfaces of the attachment structure 406 and the doser 112 prior to coupling the doser mounting bracket 138 to the doser 112 (see FIG. 49). In these embodiments, the thermally insulating material may be configured to mitigate heat transfer to a greater extent than air (e.g., the thermally insulating material has a coefficient of thermal conductivity that is less than the coefficient of thermal conductivity of air, etc.).

A plurality of support structures 402 (e.g., arms, struts, platforms, etc.) extend from the upper surface 400 of the bracket wall 350. The support structures 402 are configured to reinforce the attachment structures 406 against structural loads (e.g., the doser 112). The support structures 402 include support arms 401 that extend between the attachment structures 406 and the central support 404. A first end of each support arm 401 is coupled to an associated attachment structure 406. A second end of each support arm 401 is coupled to a location about the perimeter of the central support 404. In some embodiments, a thickness of each of the support structures 402 is substantially equal to 5 millimeters. The thickness of the support structure 402 may be substantially constant between the central support 404 and the attachment structure 406. Similarly, a thickness of the central support may be substantially equal to 5 millimeters. In some embodiments, a thickness of the central support 404 is substantially equal to a thickness of each of the support structures 402.

As shown in FIG. 3, the doser mounting bracket 138 defines an air gap 510 between the doser 112 and the upper surface 400 of the bracket wall 350. The air gap 510 creates an air space (e.g. void, etc.) between the doser 112 and the upper surface 400. When the doser mounting bracket 138 is coupled to the exhaust gas aftertreatment system component 200, the doser 112 is coupled to the doser mounting bracket 138, and exhaust gas is flowing through the exhaust gas aftertreatment system component 200, air is located within the air gap 510. As shown in FIG. 3, air inside the air gap 510 is in fluid communication with air outside of the air gap 510 (e.g., ambient air surrounding the doser 112, etc.) such that circulation of air into and out of the air gap 510 is facilitated. The air within the air gap 510 functions as a thermal barrier (e.g., provides thermal insulation, etc.) between the upper surface 400 and the doser 112, thereby mitigating heat transfer from the exhaust gas to the doser 112. The air gap 510 may be configured to provide a thermal barrier sufficient to maintain the doser 112 at a temperature of approximately 140° C. (e.g., 130° C., 135° C., 145° C., 150° C., etc.) or less when the temperature of the sidewall 202 is approximately 650° C. (e.g., 640° C., 645° C., 655° C., 660° C., etc.) or greater.

In some embodiments, a thermally insulating material (e.g., mica, ceramic material, etc.) is inserted into the air gap 510 by an operator and located within the air gap 510 when the doser mounting bracket 138 is coupled to the exhaust gas aftertreatment system component 200. In these embodiments, the thermally insulating material may be configured to mitigate heat transfer to a greater extent than air (e.g., the thermally insulating material has a coefficient of thermal conductivity that is less than the coefficient of thermal conductivity of air, etc.).

Figure 12:
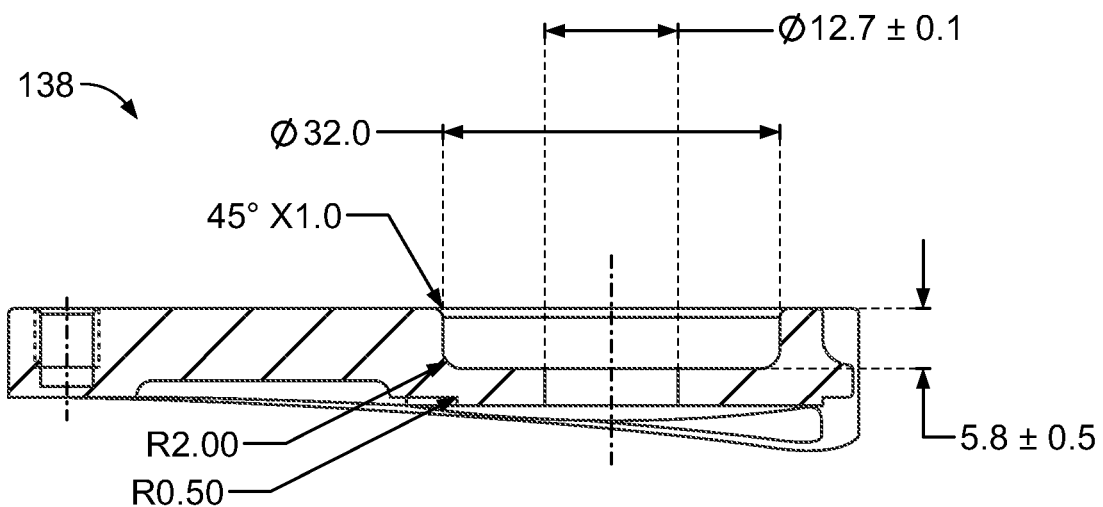
FIG. 12 is a cross-sectional view of the doser mounting bracket of FIG. 9 taken along line 12-12 of FIG. 9.
Figure 13:
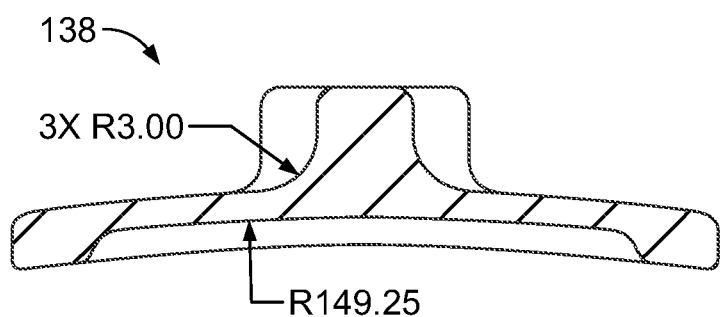
FIG. 13 is a cross-sectional view of the doser mounting bracket of FIG. 9 taken along line 13-13 of FIG. 9.
Figure 14:
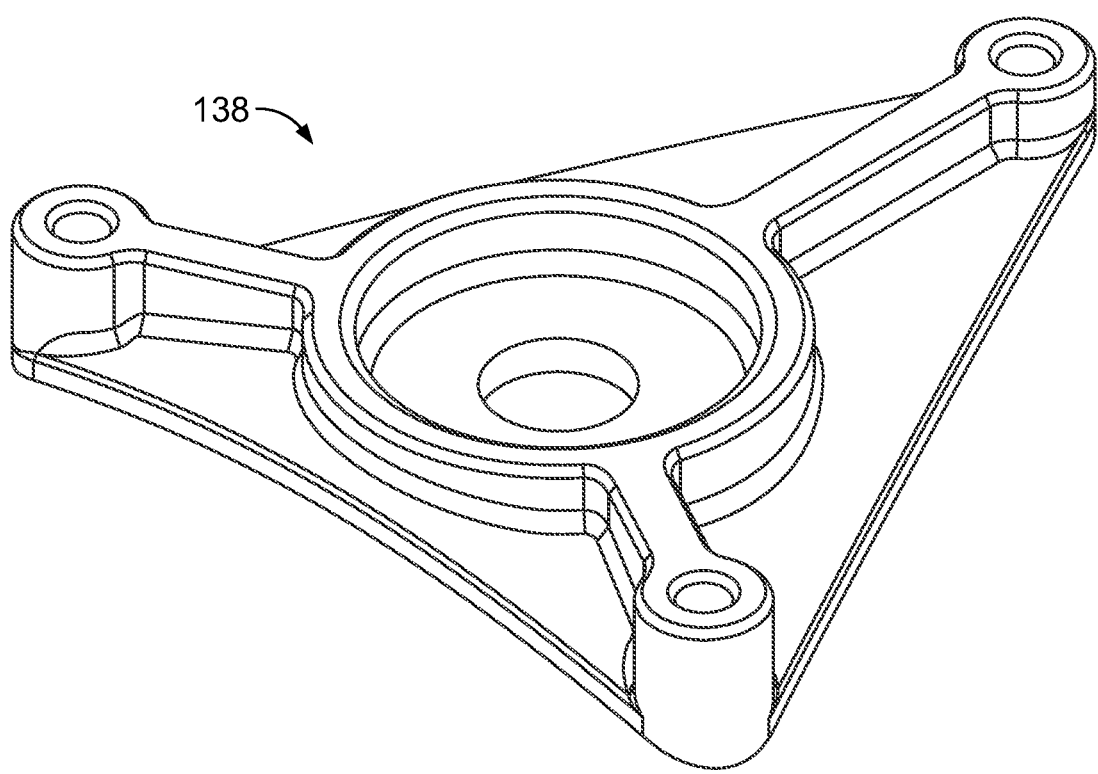
FIG. 14 is a top perspective view of an example doser mounting bracket.
Figure 15:
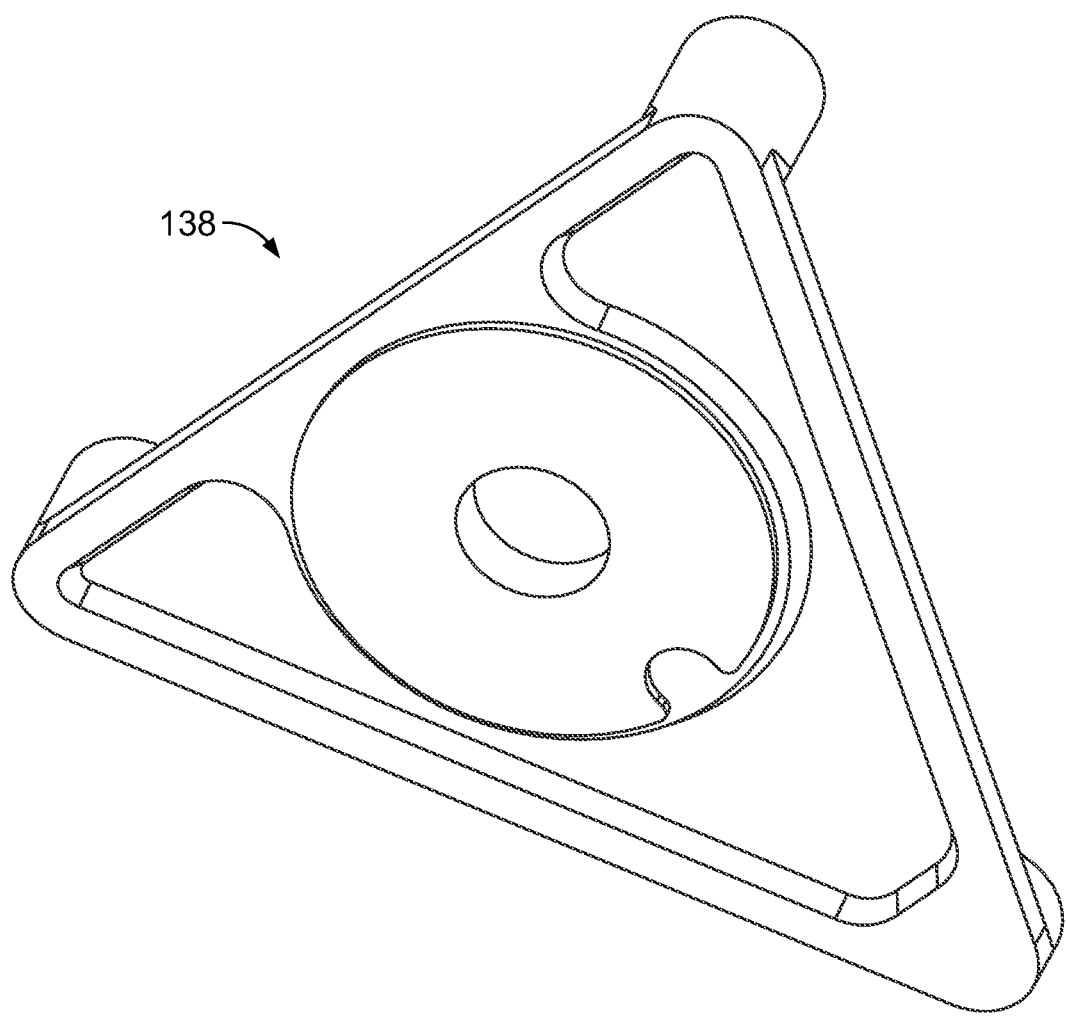
FIG. 15 is a bottom perspective view of the doser mounting bracket of FIG. 14.
Figure 16:
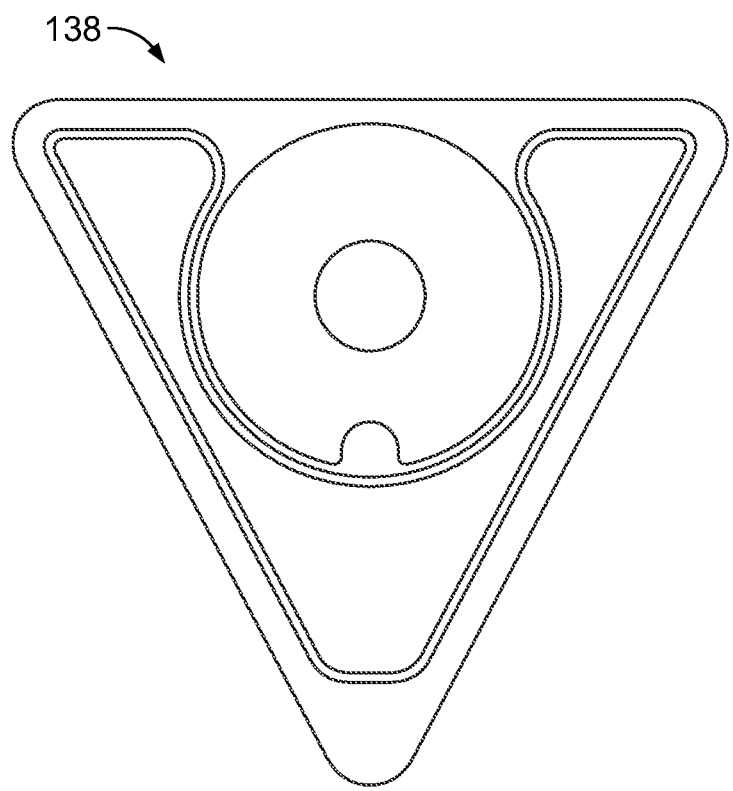
FIG. 16 is a bottom view of the doser mounting bracket of FIG. 14.
Figure 17:
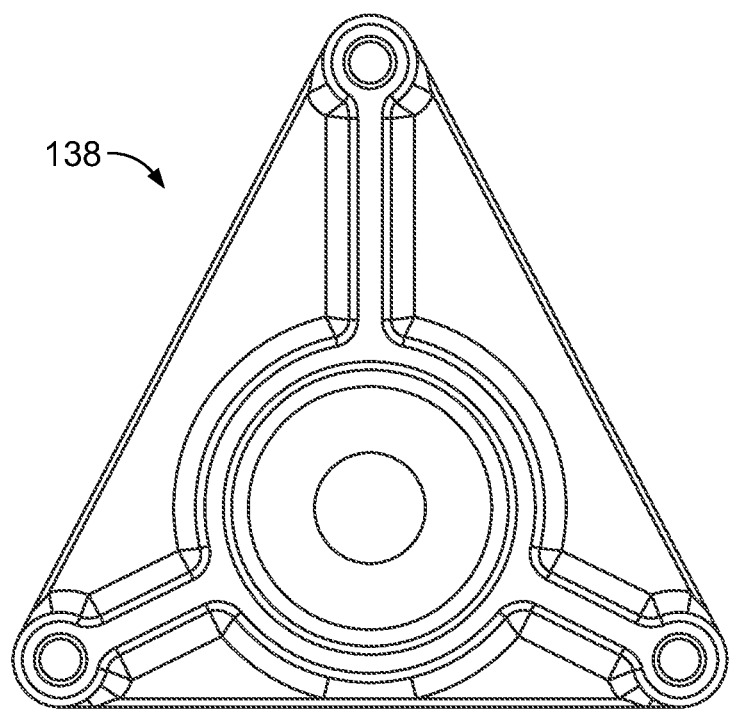
FIG. 17 is a top view of the doser mounting bracket of FIG. 14.
Figure 18:
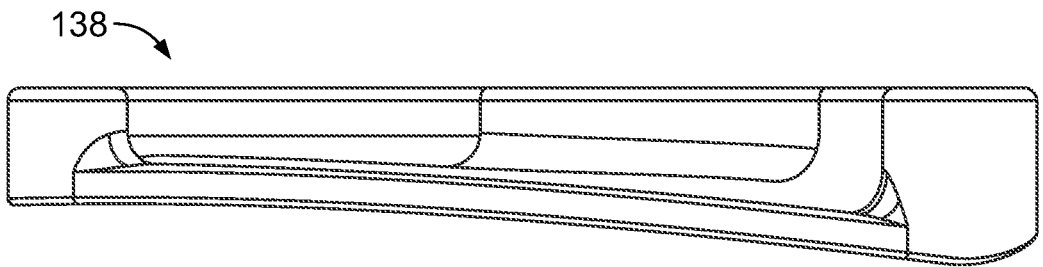
FIG. 18 is a left side view of the doser mounting bracket of FIG. 14.
Figure 19:
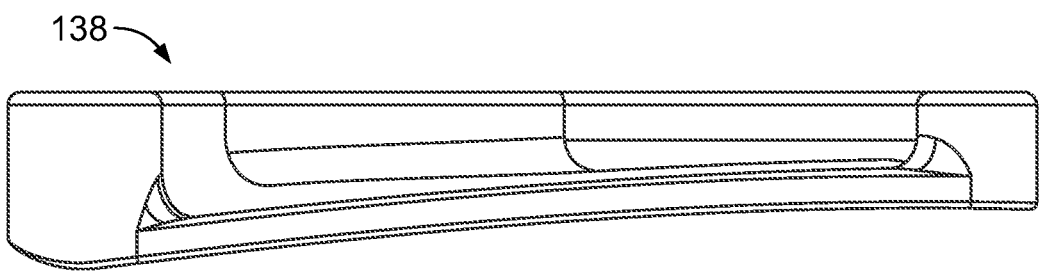
FIG. 19 is a right side view of the doser mounting bracket of FIG. 14.
Figure 20:
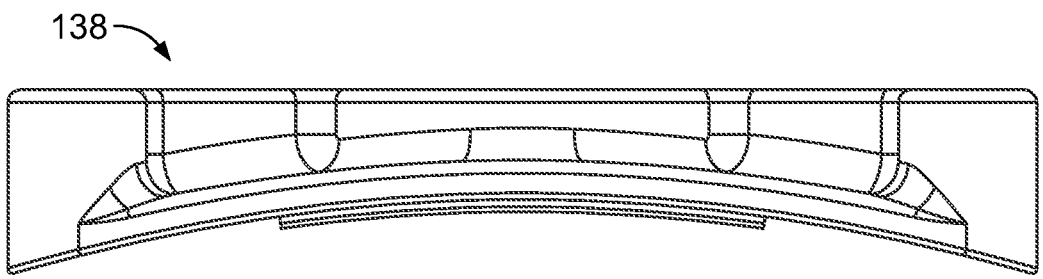
FIG. 20 is a front view of the doser mounting bracket of FIG. 14.
Figure 21:
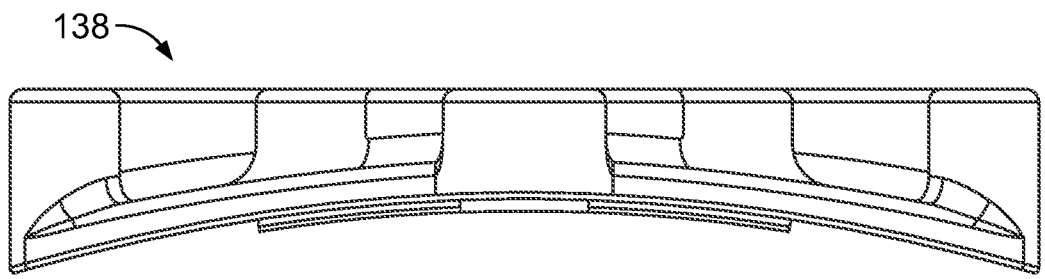
FIG. 21 is a rear view of the doser mounting bracket of FIG. 14.
Figure 22:
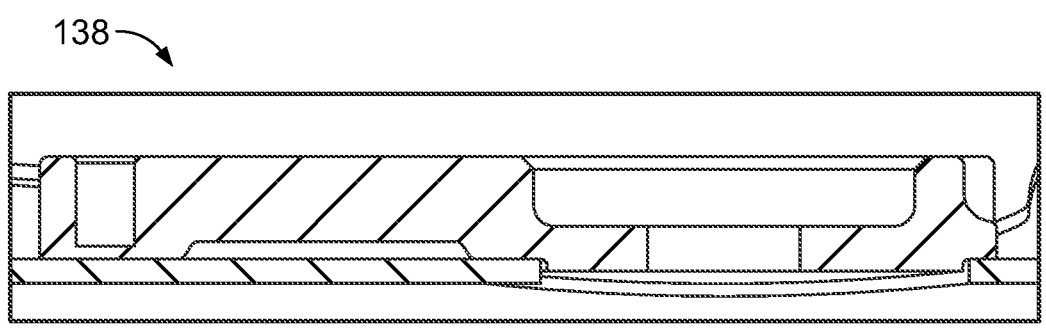
FIG. 22 is a cross-sectional view of an example doser mounting bracket mounted to an exhaust gas aftertreatment system component.

FIGS. 9-13 illustrate the doser mounting bracket 138 with dimensions (in millimeters) used in various embodiments of the doser mounting bracket 138 annotated. FIG. 12 is a cross-sectional view of the doser mounting bracket 138 taken about plane 12-12 in FIG. 9. FIG. 13 is a cross-sectional view of the doser mounting bracket 138 taken about plane 13-13 in FIG. 9.

FIGS. 23-44 depict a doser mounting bracket 138 according to additional example embodiments. The doser mounting brackets 138 of FIGS. 23-44 include features similar to those described with reference to the doser mounting bracket 138 of FIGS. 2-22. As discussed below, the doser mounting bracket 138 embodiments of FIGS. 23-44 also include various heat dissipating features in addition to the heating dissipating features (e.g. the pocket 310, the air gap 510, etc.) of the doser mounting bracket 138 of FIGS. 2-22. These additional heat dissipating features are configured to advantageously provide the doser mounting bracket 138 with increased heat transfer mitigating capabilities.

Referring to FIGS. 23-26, a doser mounting bracket 138 according to an example embodiment is illustrated. The doser mounting bracket 138 of FIGS. 23-26 incorporates various modifications to the features of the doser mounting bracket 138 of FIGS. 2-22. These modifications are configured to increase the heat transfer mitigating abilities of the doser mounting bracket 138.

Figure 23:
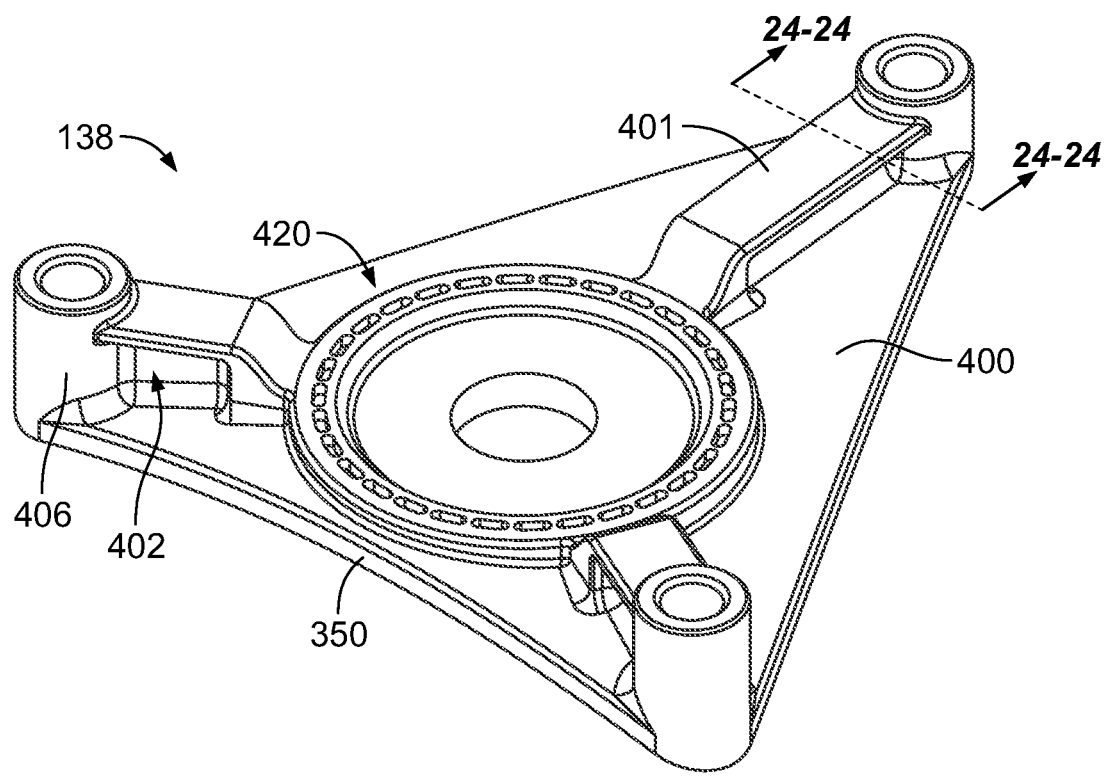
FIG. 23 is a top perspective view of an example doser mounting bracket.
Figure 24:
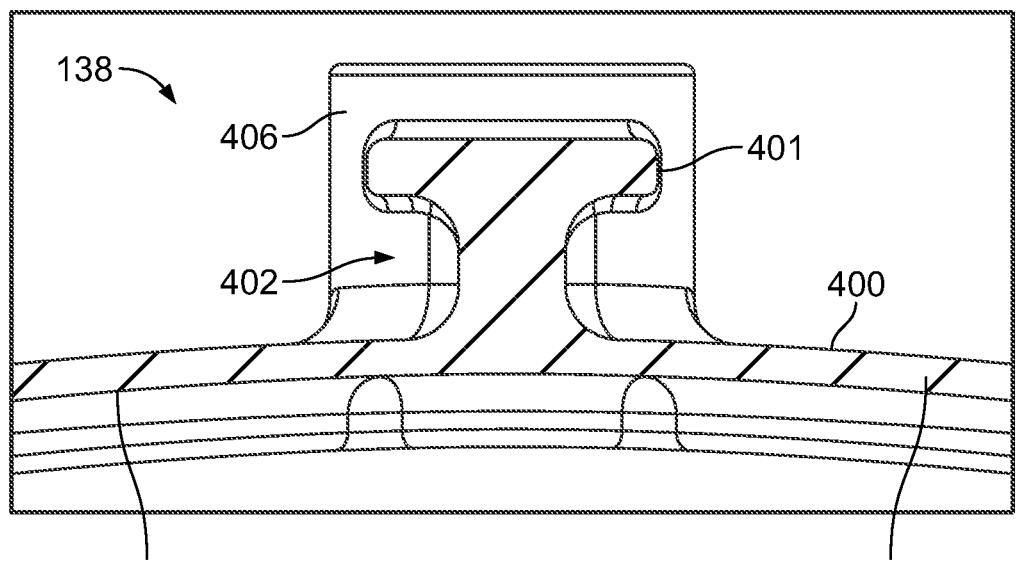
FIG. 24 is a cross-sectional view of the doser mounting bracket of FIG. 23 taken along line 24-24 of FIG. 23.
Figure 25:
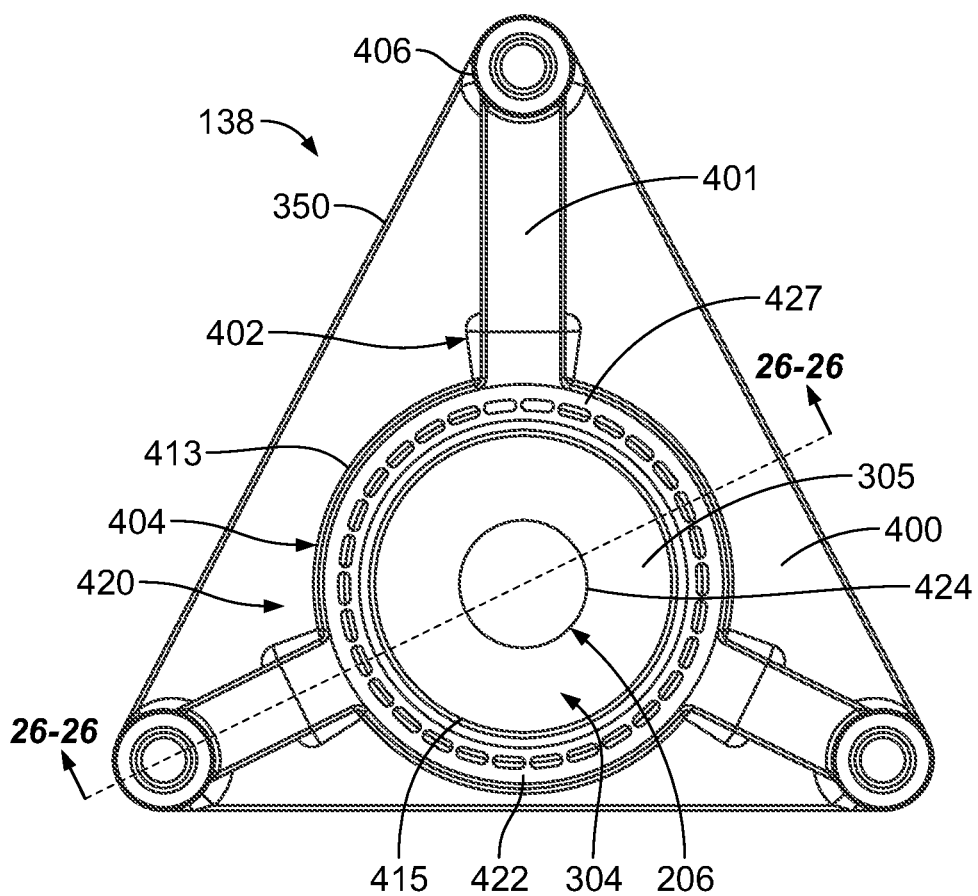
FIG. 25 is a top view of the doser mounting bracket of FIG. 23.

For example, as shown in FIG. 23, the upper surfaces of the attachment structures 406 are vertically offset from (i.e. are not coplanar with) the upper surface of a central structure 420. The vertical offset of the upper surface of the attachment structures 406 relative to the upper surface of the central structure 420 is configured to increase the air-filled space (e.g. void) defining the air gap 510 between the upper surface 400 of the bracket wall 350 and doser 112. The increased amount of air located in the air gap 510 between the upper surface 400 and the doser 112 increases the thermal insulation between the upper surface 400 and the doser 112, and thus improve the ability of the doser mounting bracket to mitigate heat transfer from the exhaust gas flowing through the exhaust gas aftertreatment system component 200 to the doser 112.

The central structure 420 of the embodiment of FIGS. 23-26 is defined by a dual-layered arrangement of each of the centering structure 304 and central support 404. The hollow central structure 420 interior defined by the dual-layered configurations provides the doser mounting bracket 138 of FIGS. 23-26 with increased heat transfer mitigating capabilities.

Similar to the single-layered centering structure 304 of the doser mounting bracket 138 of FIGS. 2-22, a lower portion 421 of the dual-layered central structure 420 of FIGS. 23-26 is configured to be received within the exhaust gas aftertreatment system component opening 204 to prevent transmission of fluid between the doser mounting bracket 138 and the exhaust gas aftertreatment system component 200. Also, an upper portion 419 of the dual-layered central structure 420 of the doser mounting bracket 138 of FIGS. 23-26 circumscribes a recess 405 that is configured to receive and support a lower portion of the injector 120, in a manner similar to the central support 404 of the doser mounting bracket 138 of FIGS. 2-22.

Figure 26:
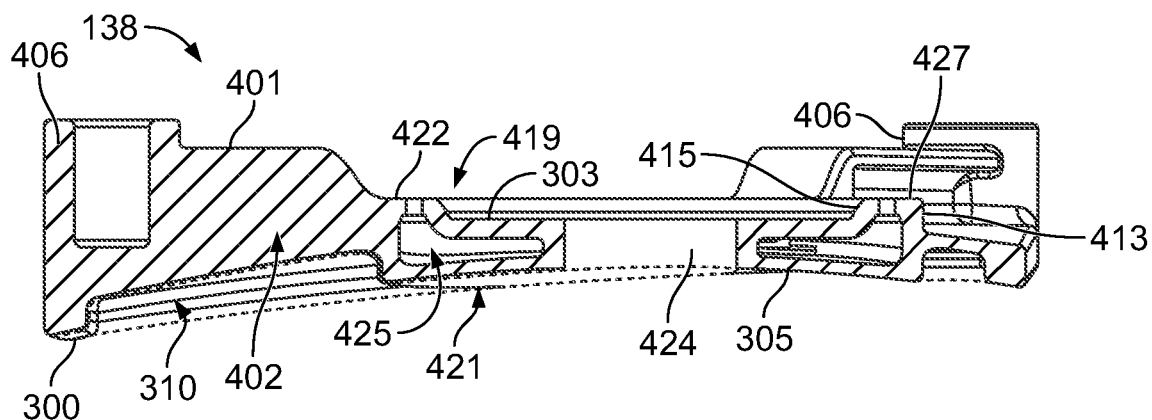
FIG. 26 is a cross-sectional view of the doser mounting bracket of FIG. 23 taken along line 26-26 of FIG. 25.
Figure 27:
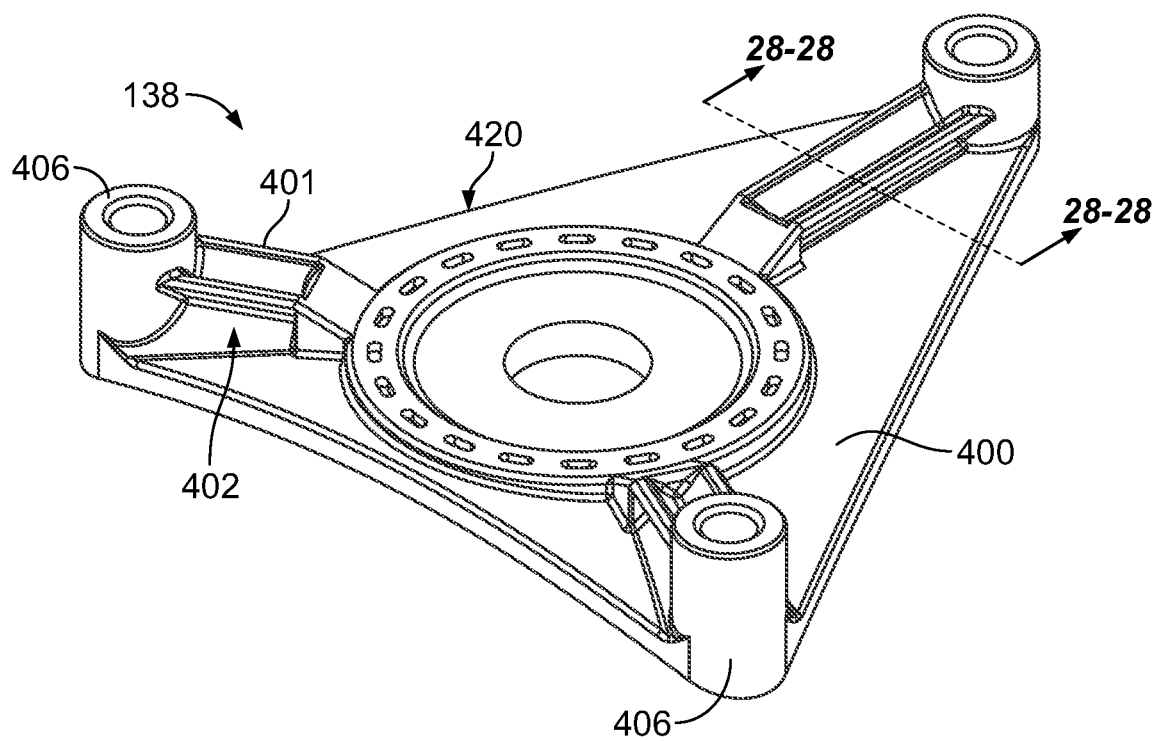
FIG. 27 is a top perspective view of an example doser mounting bracket.

As shown in FIG. 26, the dual-layered centering structure 304 of the central structure 420 includes an upper portion 303 (e.g. an upper wall) that is spaced apart from (e.g. vertically offset from) a lower portion 305 (e.g. a lower wall) of the centering structure 304. The dual-layered central support 404 of the central structure 420 includes an outer portion 413 (e.g. a first annular wall) that is spaced apart from (e.g. radially offset from) an inner portion 415 (e.g. a second annular wall) of the central support 404.

Together, the upper portion 303 of the centering structure 304 and the inner portion 415 of the central support 404 define an upper portion 419 of the central structure 420. The lower portion 305 of the centering structure 304 and the outer portion 413 of the central support 404 together define a lower portion 421 of the central structure 420. A connector wall 422 of the central structure 420 extends between the upper ends of the inner portion 415 and outer portion 413 of the central support 404. An annular wall 424 (e.g. an annular central wall, an annular structure, etc.) of the central structure 420 extends between the upper portion 303 and the lower portion 305 of the centering structure 304. An interior of the annular wall 424 defines the doser mounting bracket opening 206.

The central structure 420 of the doser mounting bracket 138 embodiment of FIGS. 23-26 is defined by the upper portion 419, the lower portion 421, the connector wall 422 and the annular wall 424. A hollow interior of the central structure 420 defines an air space (e.g. void, etc.) that creates an air-filled cavity 425. As representatively illustrated by FIG. 40, one or more supporting structures 428 (e.g. vertically and/or laterally extending ribs, struts, etc.) may be provided within the cavity 425 to reinforce and support the structural integrity of the central structure 420.

A plurality of openings 427 (e.g. apertures, holes, etc.) extend through the central structure 420. The openings 427 may extend through any one or more of the upper portion 419, the lower portion 421 and the connector wall 422. The openings 427 may have a variety of shapes (e.g., circular, elliptical, conical, obround, etc.) and sizes. The openings 427 provide fluid communication between the cavity 425 and an ambient environment (e.g. air surrounding the doser 112, etc.) such that circulation of air into and out of the cavity 425 is facilitated. The air within the cavity 425 functions as a thermal barrier (e.g., provides thermal insulation, etc.), and assists in mitigating heat transfer from the exhaust gas to the doser 112. Thus, the dual-layered arrangement of the central structure 420 is configured to provide the doser mounting bracket 138 of FIGS. 23-26 with the functionality of the single-layer centering structure 304 and central support 404 of the embodiment of FIGS. 2-22, while increasing the thermal insulation provided by the doser mounting bracket 138.

The doser mounting bracket 138 embodiment of FIGS. 23-26 additionally provides increased heat dissipating capabilities in the form of support structures 402 comprising support arms 401 having a multi-faceted design. The multifaceted (e.g. T-shaped) design of the support arms 401 is configured to increase the surface area of the support arms 401 (e.g., as compared to the generally rectangular design of the support arms 401 of the doser mounting bracket 138 of FIGS. 2-22). The increased surface area of the support arms 401 increases the rate of heat dissipation from the doser mounting bracket 138, such that heat transfer from the exhaust gas aftertreatment system component 200 to the doser 112 is reduced.

Figure 28:
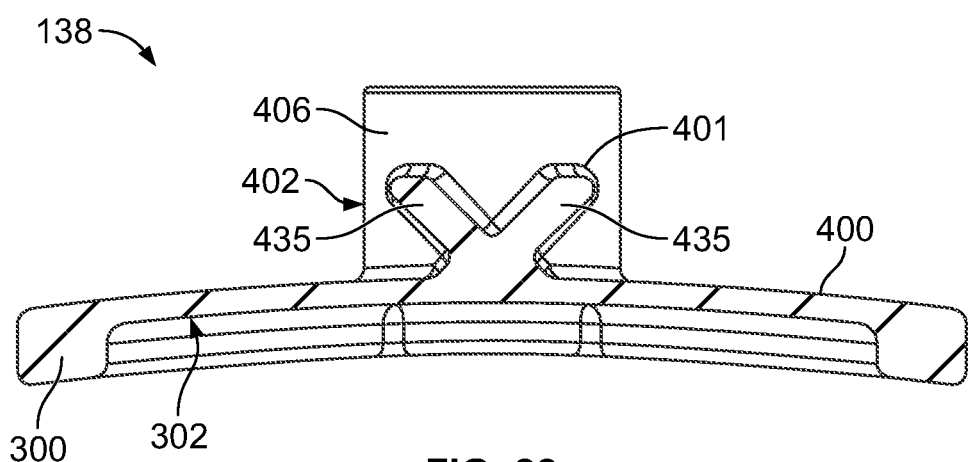
FIG. 28 is a cross-sectional view of the doser mounting bracket of FIG. 27 taken along line 28-28 of FIG. 27.
Figure 29:
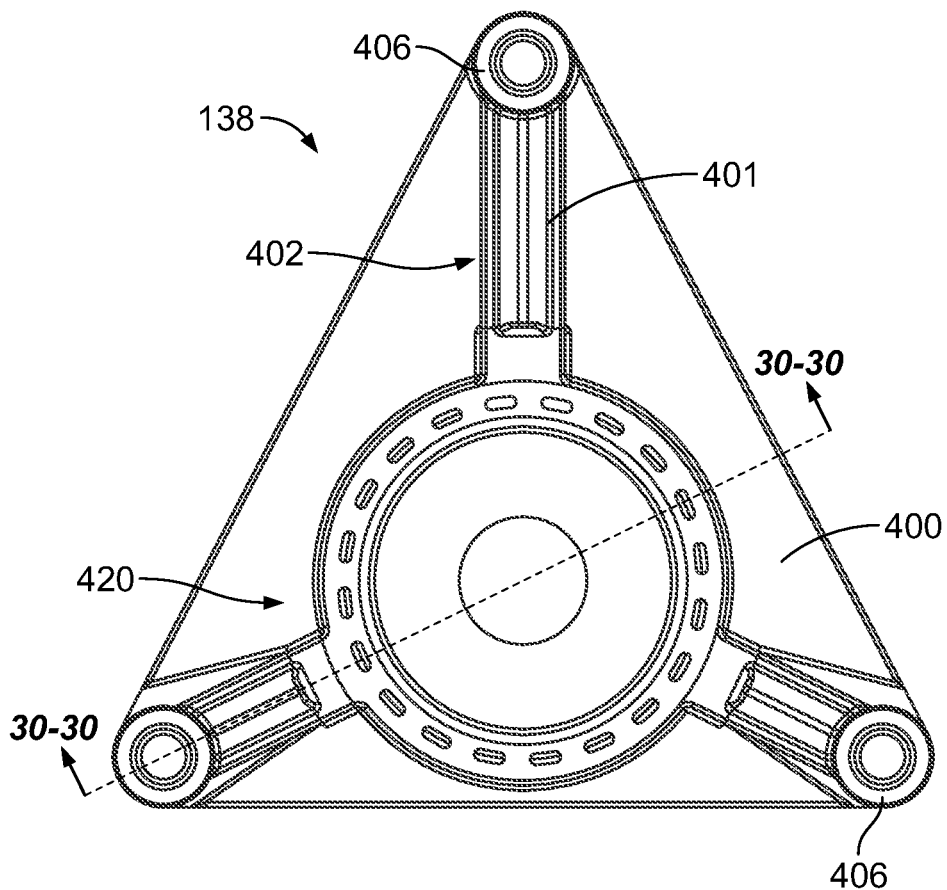
FIG. 29 is a top view of the doser mounting bracket of FIG. 23.
Figure 30:
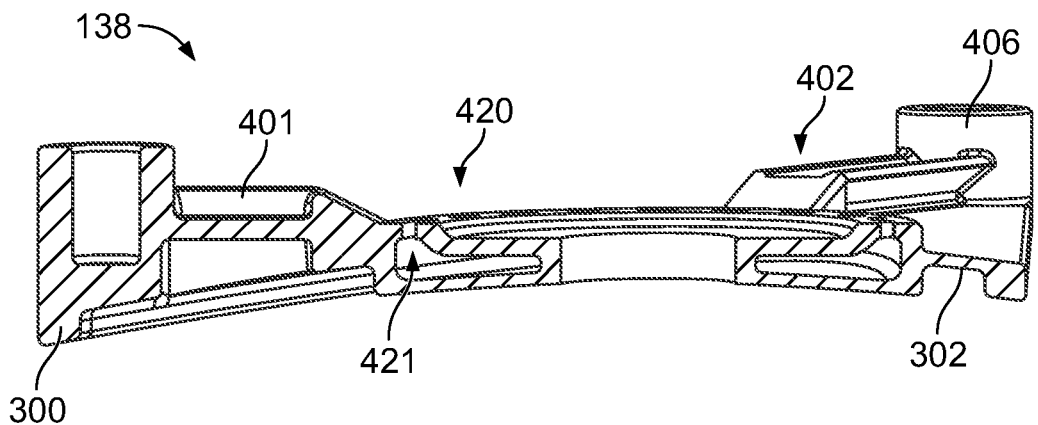
FIG. 30 is a cross-sectional view of the doser mounting bracket of FIG. 23 taken along line 30-30 of FIG. 29.
Figure 31:
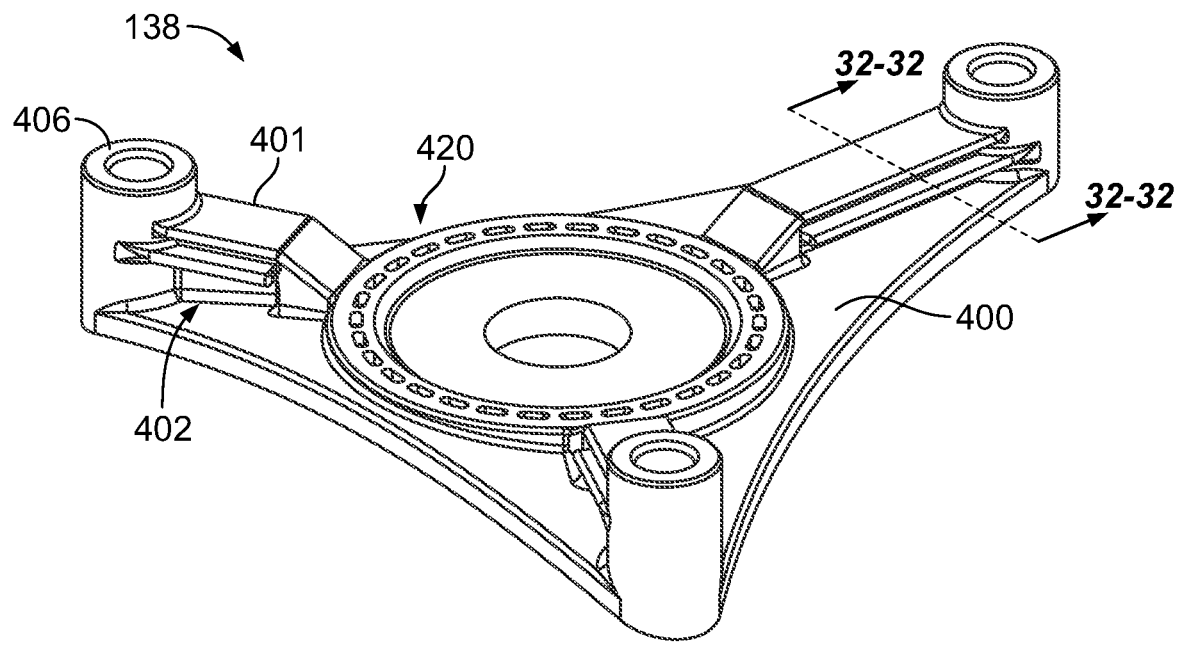
FIG. 31 is a top perspective view of an example doser mounting bracket.
Figure 32:
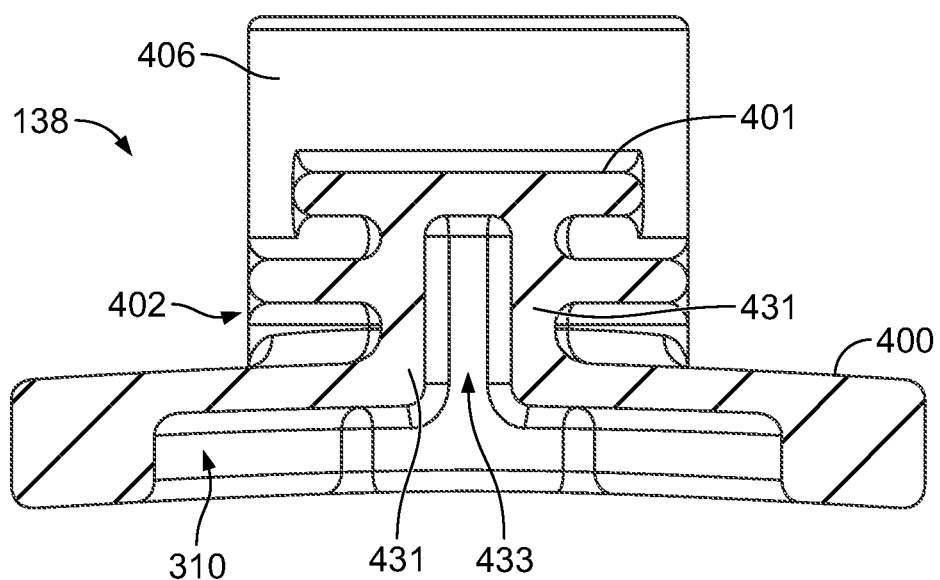
FIG. 32 is a cross-sectional view of the doser mounting bracket of FIG. 31 taken along line 32-32 of FIG. 31.
Figure 33:
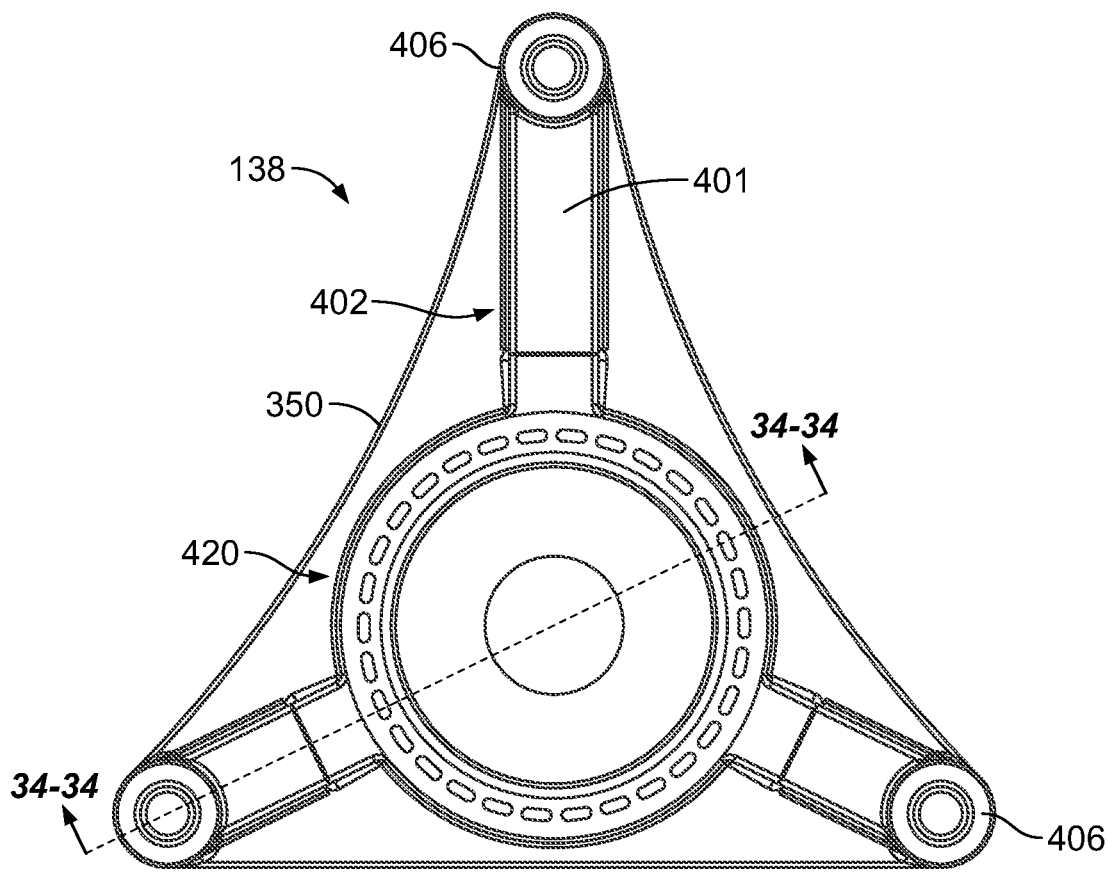
FIG. 33 is a top view of the doser mounting bracket of FIG. 31.
Figure 34:
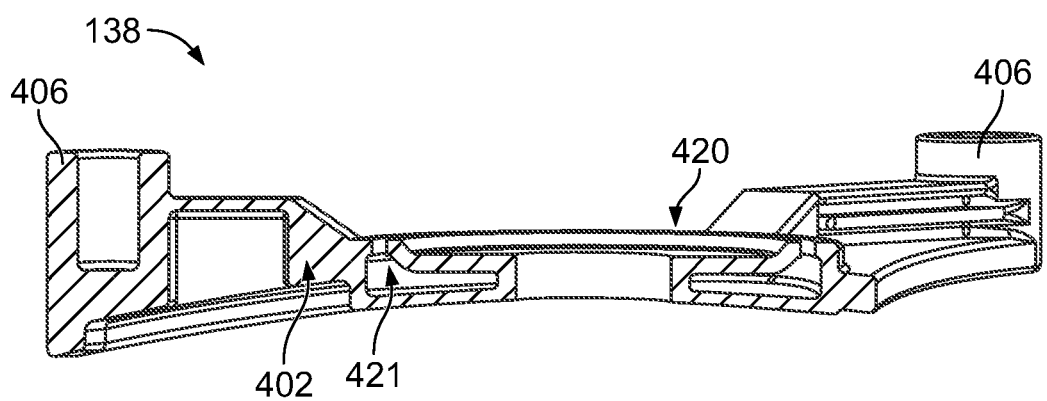
FIG. 34 is a cross-sectional view of the doser mounting bracket of FIG. 31 taken along line 34-34 of FIG. 33.

As illustrated by FIGS. 27-32, according to various embodiments, the support arms 401 may define a variety of additional multifaceted, surface-area maximizing designs. For example, as shown in FIG. 28, the support arms 401 may be defined by a pair of walls 435 (e.g., fins) that extend diagonally outwards from a common central axis that extends between the central structure 420 and a respective attachment structure 406 to define a V-shaped, trough-like structure. As shown in FIG. 32, the support arms 401 may be defined by an I-shaped cross-section. In yet other embodiments, the support arms 401 may be defined by any variety of other multifaceted cross-section configurations (e.g., an X-shaped structure, etc.).

As also illustrated by FIG. 32, the support arms 401 according to various embodiments may include a pair of sidewalls 431. The inner, opposed surfaces of the sidewalls 431 serve to further increase the surface area of the support arms 401. Additionally, the spaced arrangement of the opposed sidewalls 431 defines an air space (e.g. void, air-gap) that creates an air-filled channel 433. The air-filled channel 433 is fluidly connected to the pocket 310, thereby increasing the volume of the pocket 310. The increased surface area and the increased volume of the pocket 310 provided by the support arm 401 arrangement illustrated in FIG. 32 is configured to further increase the heat-mitigating capabilities of the doser mounting bracket 138.

Figure 35:
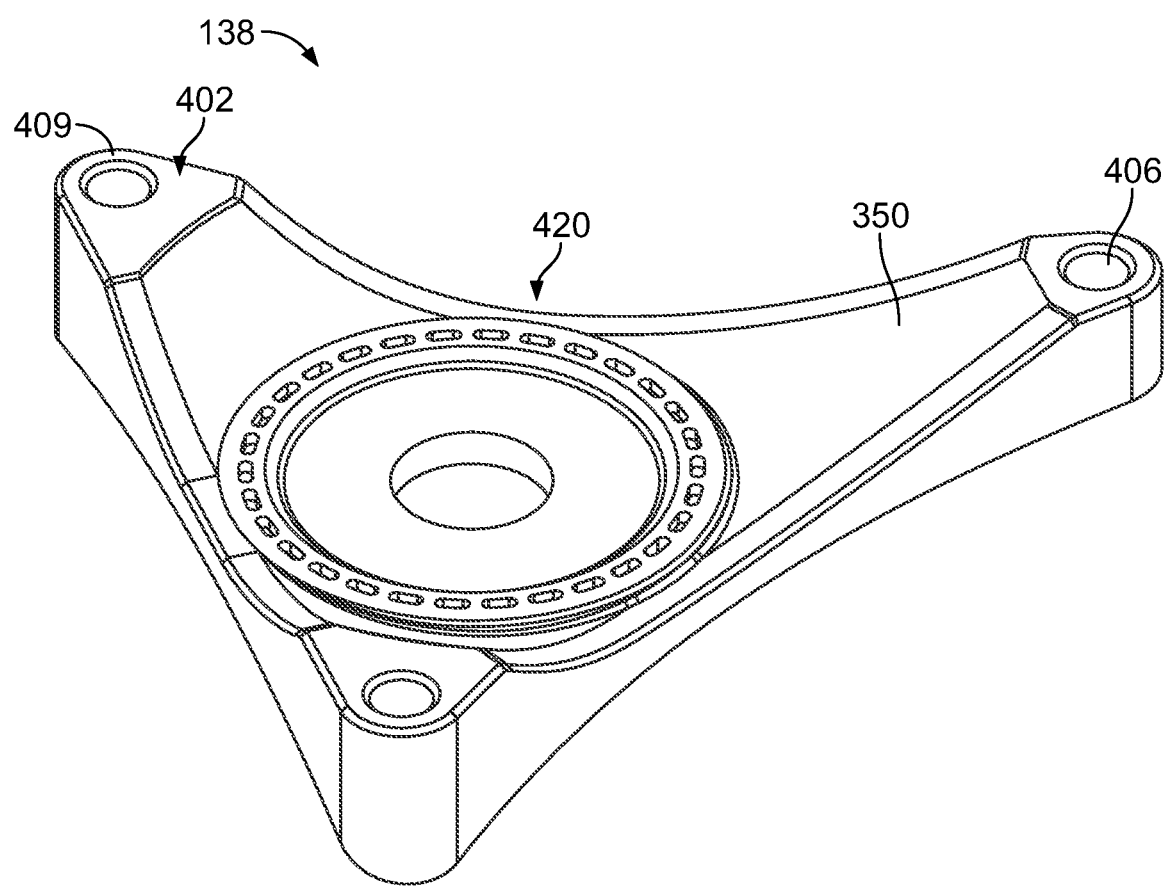
FIG. 35 is a top perspective view of an example doser mounting bracket.
Figure 36:
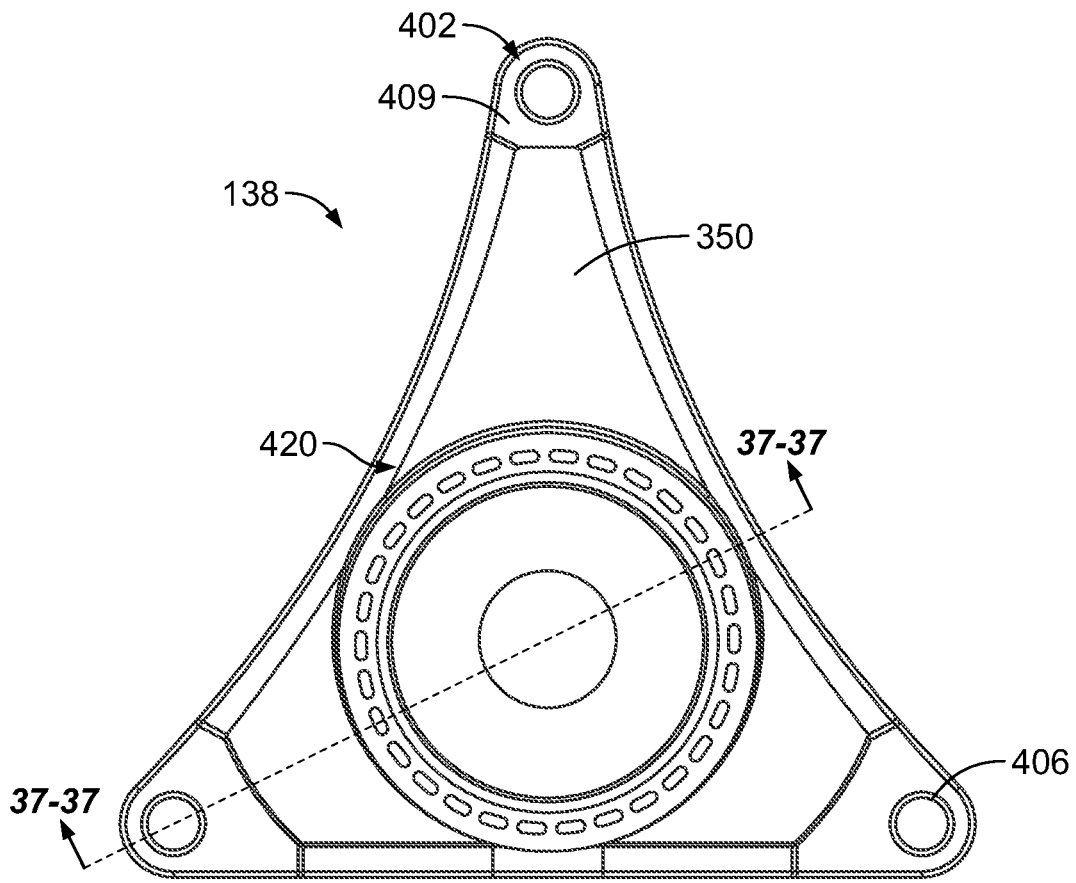
FIG. 36 is a top view of the doser mounting bracket of FIG. 35.
Figure 37:
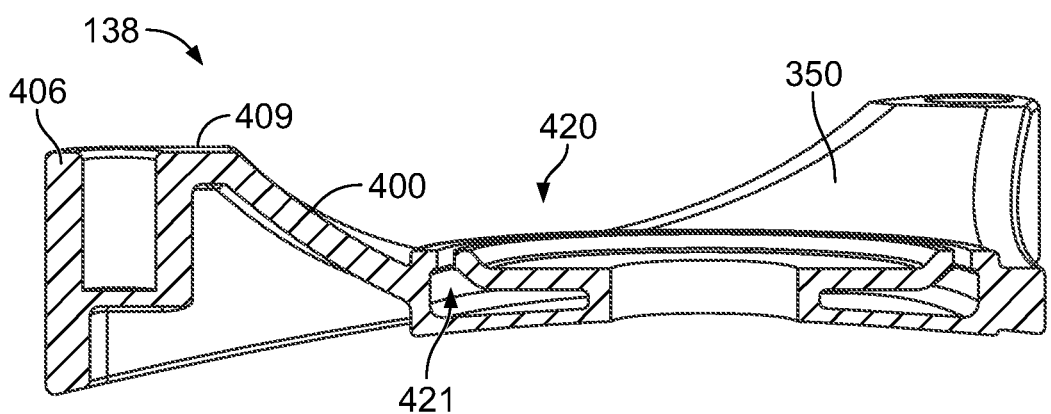
FIG. 37 is a cross-sectional view of the doser mounting bracket of FIG. 35 taken along line 37-37 of FIG. 36.
Figure 38:
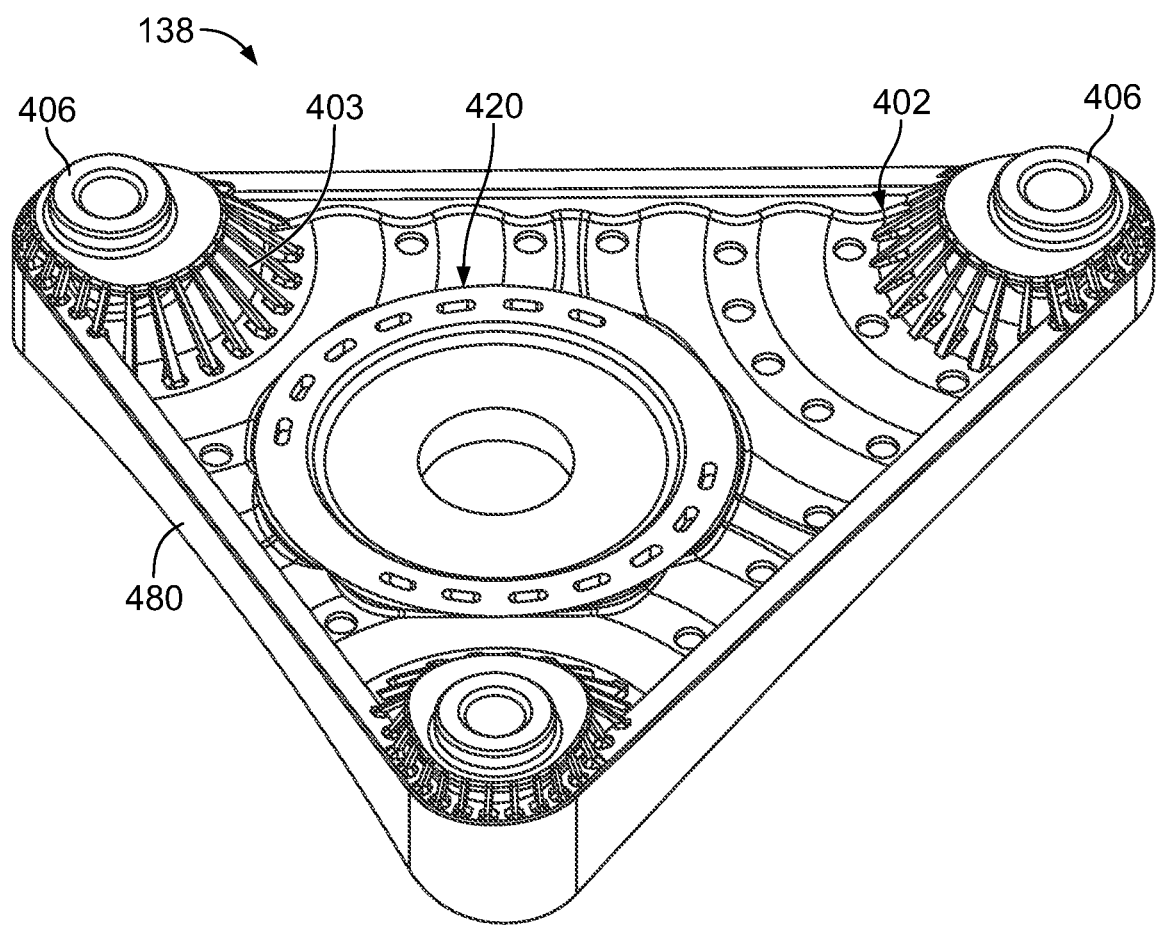
FIG. 38 is a top perspective view of an example doser mounting bracket.
Figure 39:
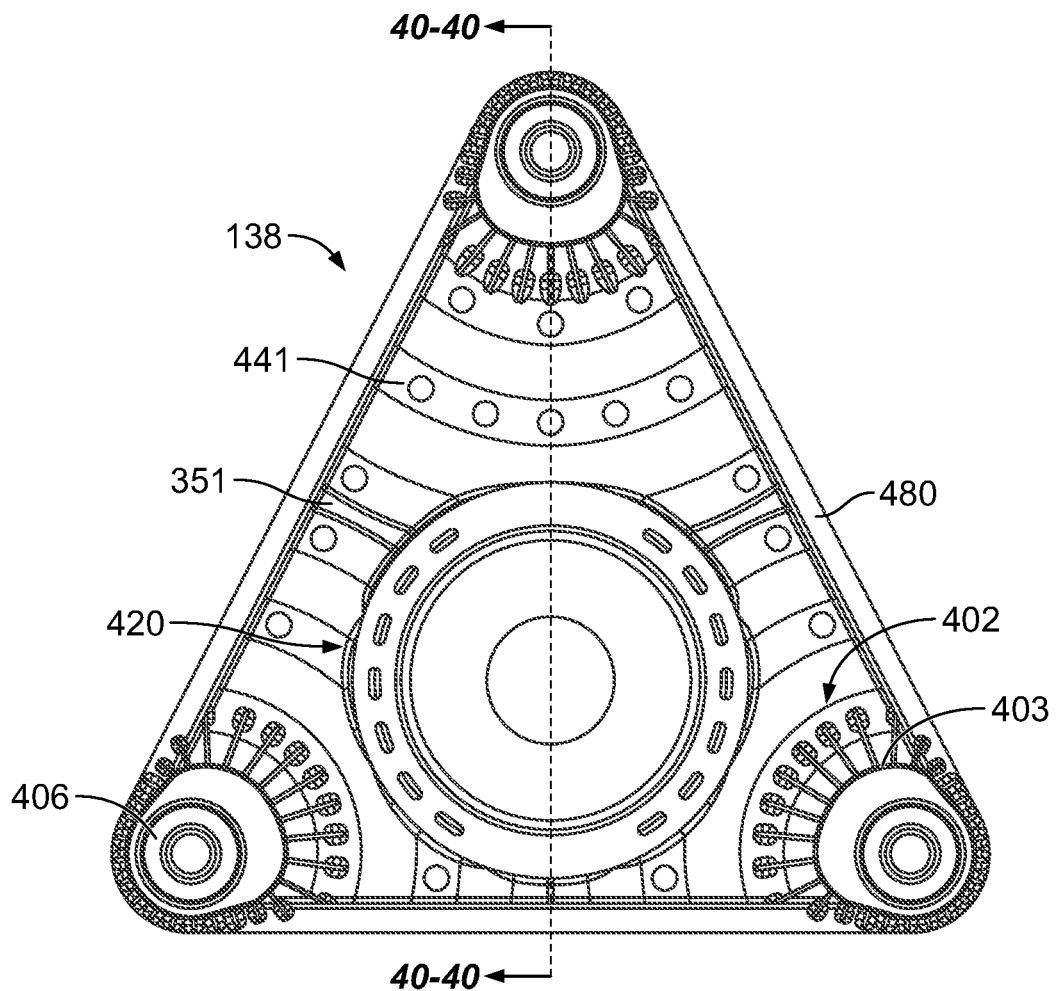
FIG. 39 is a top view of the doser mounting bracket of FIG. 38.

A doser mounting bracket 138 embodiment according to another example embodiment is shown in FIGS. 35-37. Similar to the embodiments of FIGS. 23-34, the doser mounting bracket 138 includes a hollow central structure 420. Also similar to the embodiments of FIGS. 23-34, the doser mounting bracket 138 includes attachment structures 406 that are vertically offset from (i.e. are located above, are not coplanar with, etc.) an upper surface of central structure 420.

In the embodiment of FIGS. 35-37, the doser mounting bracket 138 includes a modified attachment structure 406 arrangement in which an upper portion of each attachment structure 406 extends downwards from an upper end of the bracket wall 350. The lower portion of each attachment structure 406 terminates at a location that is vertically offset from (i.e. is located above) the lower surface of the engagement wall 300.

The upper portion of each attachment structure 406 is coupled to (e.g. attached) the upper surface 400 of the bracket wall 350 by a support structure 402 comprising a platform 409 that is configured to structurally reinforce the opening defined by each attachment structure 406. The upper surface 400 of the bracket wall 350 extends concavely between each platform 409 and the central structure 420. This concave configuration of the upper surface 400 is configured to maximize the volume of the air gap 510 defined when the doser 112 is mounted to the doser mounting bracket 138.

As illustrated in FIG. 37, the raised (i.e. vertically offset) arrangement of the lower portions of the attachment structures 406 relative to the lower surface of the engagement wall 300 is configured to increase the volume defined by the pocket 310. The raised arrangement of the attachment structures 406 relative to the lower surface of the engagement wall 300 additionally increases the vertical offset between the upper surfaces of the attachment structures 406 and the upper surface of the central structure 420. This additional increased vertical offset between the upper surfaces of the attachment structures 406 and the upper surface of the central structure 420 is configured to further increase the air gap 510 defined between the doser 112 and the upper surface 400 of the bracket wall 350. The combined increased air-filled spaces defined by the pocket 310 and air gap 510 when the doser mounting bracket 138 is coupled to the exhaust gas aftertreatment system component 200 and to the doser 112 is configured to increase the heat-mitigating capabilities of the doser mounting bracket 138. According to some embodiments, the heat-mitigating capabilities of the doser mounting bracket 138 described with reference to FIGS. 35-37 are optionally further increased by modifying the single layer bracket wall 350 configuration of the doser mounting bracket 138 with a dual-layer configuration as described with reference to FIGS. 38-45 below.

Additional example doser mounting bracket 138 embodiments incorporating heat-dissipating features are shown in FIGS. 38-45. Similar to the embodiments of FIGS. 23-34, the doser mounting bracket 138 embodiments of FIGS. 38-45 also include a heat-mitigating a hollow central structure 420 and a heat-mitigating attachment structure 406 arrangement in which the upper surfaces of the attachment structures 406 are vertically offset from (i.e. are located above, are not coplanar with, etc.) an upper surface of the central structure 420.

Figure 40:
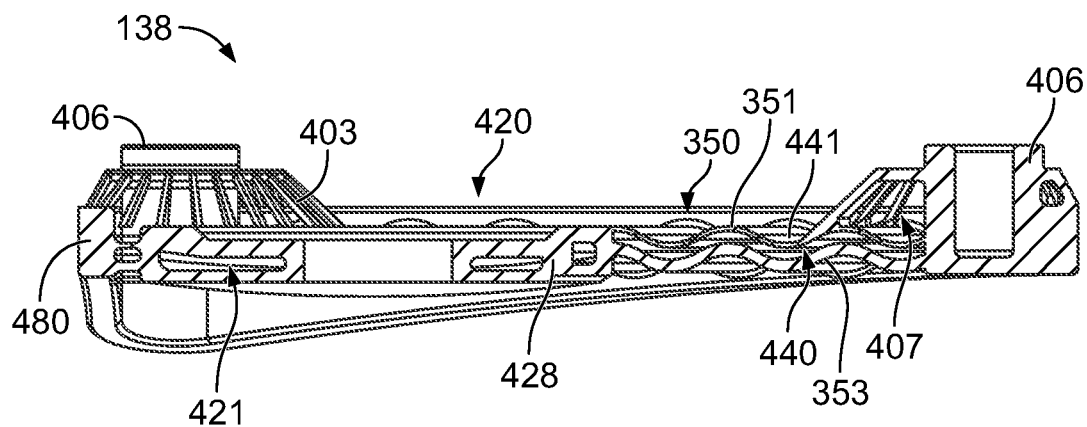
FIG. 40 is a cross-sectional view of the doser mounting bracket of FIG. 38 taken along line 40-40 of FIG. 39.
Figure 41:
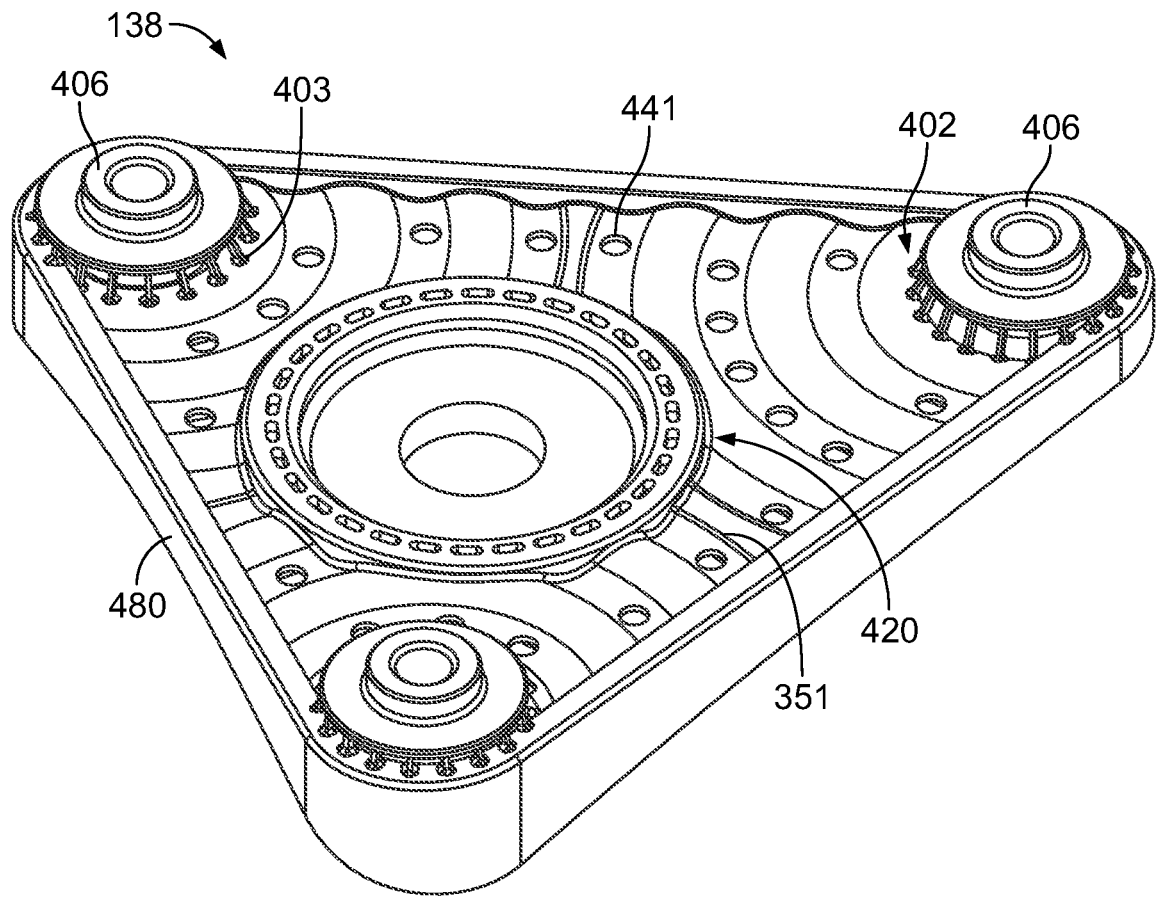
FIG. 41 is a top perspective view of an example doser mounting bracket.
Figure 42:
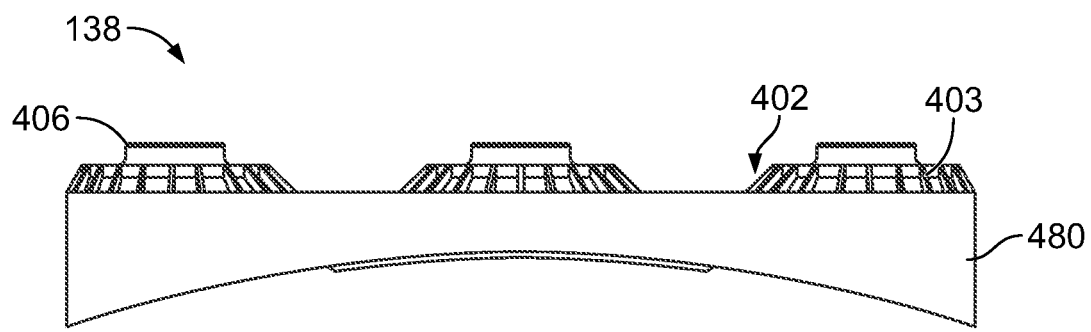
FIG. 42 is a front view of the doser mounting bracket of FIG. 41.
Figure 43:
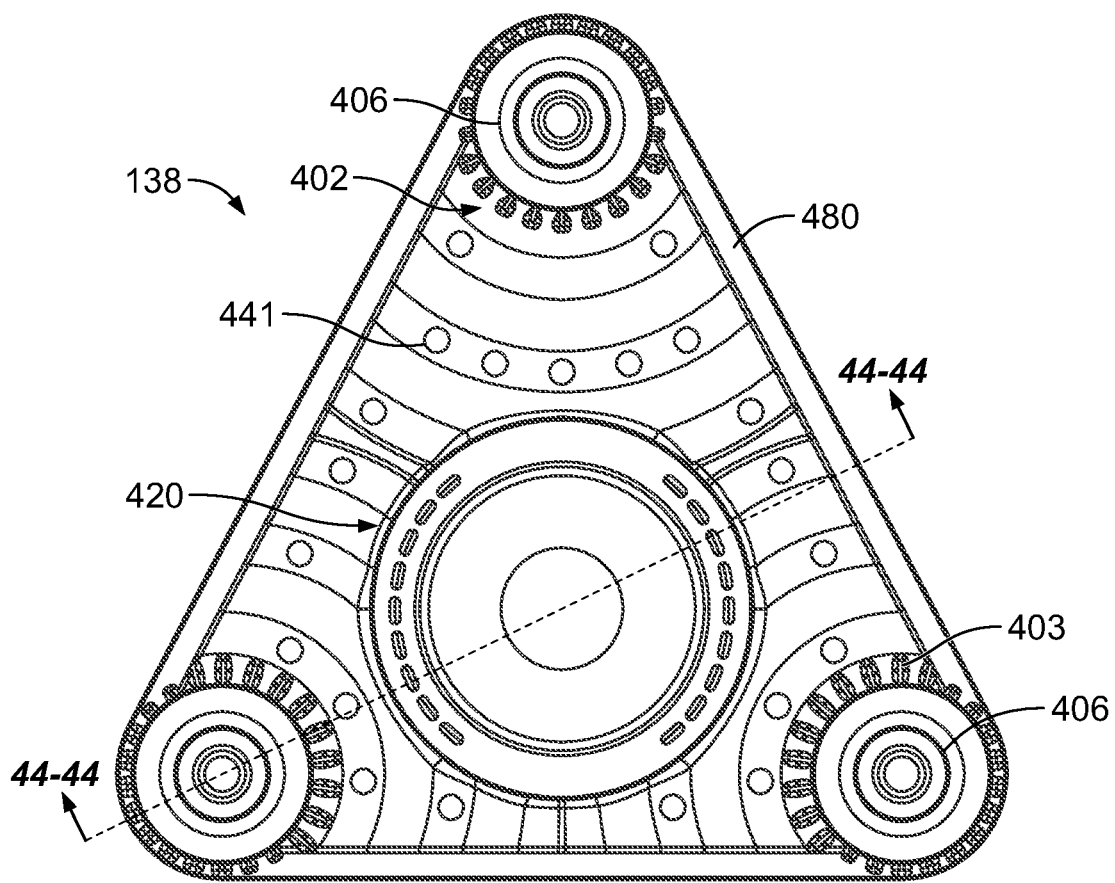
FIG. 43 is a top view of the doser mounting bracket of FIG. 41.

The doser mounting bracket 138 embodiment of FIGS. 38-45 also provides increased heat transfer mitigating capabilities in the form of a modified, dual-layer configuration of the single layer bracket wall 350 of the doser mounting bracket 138 embodiment of FIGS. 2-22. As shown in FIG. 40, the dual-layered bracket wall 350 configuration of the embodiments of FIGS. 38-45 includes an upper bracket wall 351 (e.g. a first wall, an upper wall, etc.) and a vertically offset (i.e. spaced apart) lower bracket wall 353 (e.g. a second wall, a lower wall, etc.). The upper bracket wall 351 has a top surface that is defined by the upper surface 400 and the lower bracket wall 353 has a bottom surface that is defined by the lower surface 302. A bottom surface of the upper bracket wall 351 is separated from (i.e. extends above, is spaced from, is vertically offset from) a top surface of the lower bracket wall 353.

Figure 44:
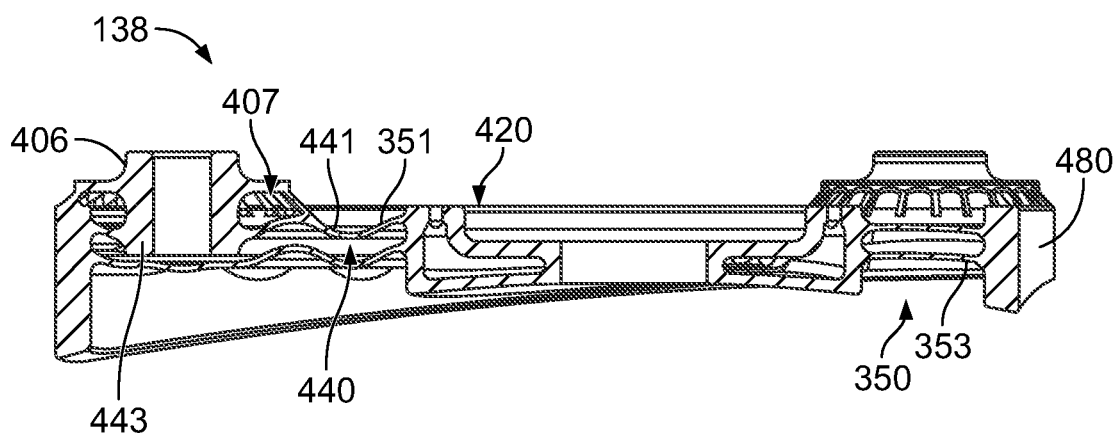
FIG. 44 is a cross-sectional view of the doser mounting bracket of FIG. 41 taken along line 44-44 of FIG. 43.

The upper bracket wall 351 and lower bracket wall 353 may each be defined by either a constant or a variable wall thickness. As illustrated by FIG. 44, in some embodiments the thickness of the upper bracket wall 351 is the same as the thickness of the lower bracket wall 353. Alternatively, in other embodiments the upper bracket wall 351 and lower bracket wall 353 each have different wall thicknesses. For example, in the doser mounting bracket 138 of FIG. 40, the relatively thicker lower bracket wall 353 minimizes heat transfer from the exhaust gas aftertreatment system component 200 to the doser 112 by increasing heat transfer resistance, while the relatively thinner upper bracket wall 351 increases the rate at which heat is dissipated from the doser mounting bracket 138. One or more supporting structures may be provided between the upper bracket wall 351 and lower bracket wall 353 to reinforce and support the structural integrity of the dual-layered bracket wall 350.

An outer periphery of each of the upper bracket wall 351 and lower bracket wall 353 is coupled to an inner surface of a wall 480 that extends about the dual-layered bracket wall 350. An inner periphery of each of the upper bracket wall 351 and the lower bracket wall 353 is coupled to an exterior of the central structure 420.

The coupling of the outer peripheries of the upper bracket wall 351 and the lower bracket wall 353 to the wall 480 and the coupling of the inner peripheries of the upper bracket wall 351 and the lower bracket wall 353 to the central structure 420 is configured to support the upper bracket wall 351 and the lower bracket wall 353 relative to one another such that an air filled cavity 440 (e.g. a void, air-gap, cavity, etc.) is defined by the dual-layered bracket wall 350. A lower portion of the wall 480 is configured to interface (e.g. engage) with the exhaust gas aftertreatment system component 200 in a manner similar to that described with reference to the engagement wall 300 of the doser mounting bracket 138 of FIGS. 2-22.

A plurality of openings (e.g. apertures, holes, etc.) 441 extend through the upper bracket wall 351. The openings may be defined by a variety of shapes (e.g., circular, elliptical, conical, obround, etc.) and sizes. The openings 441 provide fluid communication between the cavity 440 and an ambient environment (e.g. air surrounding the doser 112, etc.) such that circulation of air into and out of the cavity 440 is facilitated. According to various embodiments, the entirety of each of the outer peripheries of the lower surface 302 and the upper surface 400 are sealingly coupled to the wall 480, and each of the inner peripheries of the upper bracket wall 351 and the lower bracket wall 353 are sealingly coupled to the central structure 420 such that the openings 441 define the only source of fluid communication between the cavity 440 and the ambient environment.

The lower surface 302 of the lower bracket wall 353 and the lower portion of the central structure 420 define a pocket 310 (similar to that described with reference to FIGS. 2-22) when the doser mounting bracket 138 is attached to the sidewall 202 along the lower surface of the wall 480. The combined fully insulated pocket 310 and partially insulated cavity 440 function as a thermal barrier (e.g., provides thermal insulation, etc.) that is configured to mitigating heat transfer from the exhaust gas aftertreatment system component 200 to the doser 112.

As shown in FIG. 44, in various embodiments, each attachment structure 406 may include an opening 443 extending through a lower surface thereof. The attachment structures 406 may be arranged relative to the dual-layered bracket wall 350 so that the lower surfaces (and opening defined thereby) of the attachment structures 406 terminate (i.e. are located) within the cavity 440. This arrangement of the openings 443 of the attachment structures 406 within the cavity 440 provides additional fluid communication between the cavity 440 and an ambient environment (e.g. air surrounding the doser 112, etc.), which further facilitates the circulation of air into and out of the cavity 440 and assists in mitigating heat transfer to the doser 112.

As illustrated in FIGS. 38-45, one or both of the top surface and bottom surface of the upper bracket wall 351 and/or the lower bracket wall 353 define undulating (e.g., rippled, wavy, non-planar, etc.) surfaces. Such an undulating design increases the surface area of the doser mounting bracket 138, and is configured to allow the doser mounting bracket 138 to dissipate heat more rapidly, and thereby minimize heat transfer to the doser 112. Additionally, the undulating design increases the structural integrity of the dual-layered bracket wall 350, allowing the upper bracket wall 351 and the lower bracket wall 353 to be spaced relative to one another to define the cavity 440 without comprising the ability of the doser mounting bracket 138 to support the doser 112.

The ripples (e.g., waves, undulating portions, etc.) of the one or more undulating surfaces of the dual-layered bracket wall 350 may be arranged according to a variety of different designs. The ripples may radiate outwards from multiple centers across the upper surface 400 and lower surface 302. For example, a set of ripples may radiate outwards from each of the attachment structures 406. In other embodiments, the ripples may radiate from a common focal point.

The ripples of the one or more undulating surfaces of the dual-layered bracket wall 350 may also be shaped and sized according to a variety of different designs. The shape and size of the ripples may be uniform or may vary across each undulating surface of the dual-layered bracket wall 350. The shape, size and arrangement of ripples of different undulating surfaces of the dual-layered bracket wall 350 may vary from one another.

As illustrated by FIGS. 38-45, the support structures 402 of the doser mounting bracket 138 include angled support struts 403 (e.g. fins, ribs, pins, etc.). A first end of each support strut 403 extends upwards at a non-90 degree angle from the upper surface 400. A second end of each support strut 403 is coupled to an exterior of an associated attachment structure 406. The second end of each support strut 403 extends about a portion of, or the entirety of, the periphery of an associated attachment structure 406. The support struts 403 are configured to reinforce the attachment structure 406 against structural loads (e.g. the doser 112).

Figure 45:
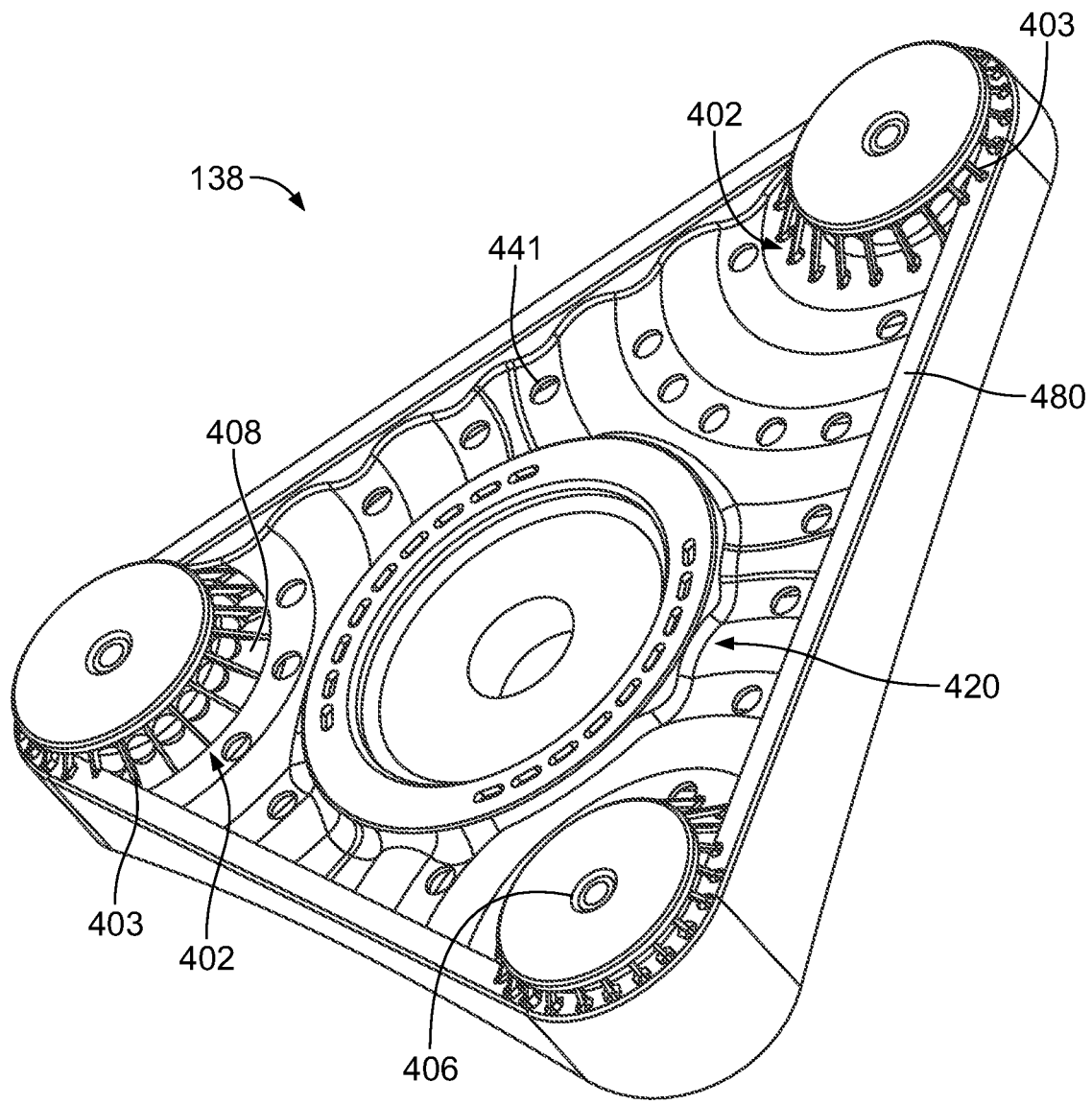
FIG. 45 is a top perspective view of an example doser mounting bracket.

As shown in FIGS. 40, 44, and 45, each support structure 402 includes a plurality of support struts 403 that are spaced about the exterior sidewall of an associated attachment structure 406. The support struts 403 may be defined by a variety of shapes, cross-sections and sizes. The support struts 403 may be uniform or non-uniform in thickness and spacing.

The spaced arrangement of the support struts 403 about each attachment structure 406 defines a cage-like design that creates an air gap 407 about each attachment structure 406. The air gaps 407 defined by the support struts 403 are in fluid communication with the air gap 510 defined between the upper surface 400 of the bracket wall 350 and the doser 112, and are configured to further facilitate the ability of air (e.g. ambient air) to flow between the doser mounting bracket 138 and doser 112 to increase heat dissipation. The increased surface area defined by the plurality of support struts 403 (e.g. as compared to a surface that would be defined by a single, annularly extending support strut) is also configured to provide the doser mounting bracket 138 with increased heat transfer mitigating capabilities.

As illustrated by FIG. 45, some or all of the support structures 402 additionally optionally include one or more walls 408 that are arranged in between some or all of the support struts 403 of a support structure 402. Each wall 408 extends discontinuously between a pair of adjacent support struts 403 (e.g. are perforated, are dimensioned smaller than the space between adjacent support struts 403, etc.), and are configured to provide additional reinforcement of an attachment structure 406 without impairing the heating dissipating capabilities provided by the cage-like design of the support structure 402.

Figure 46:
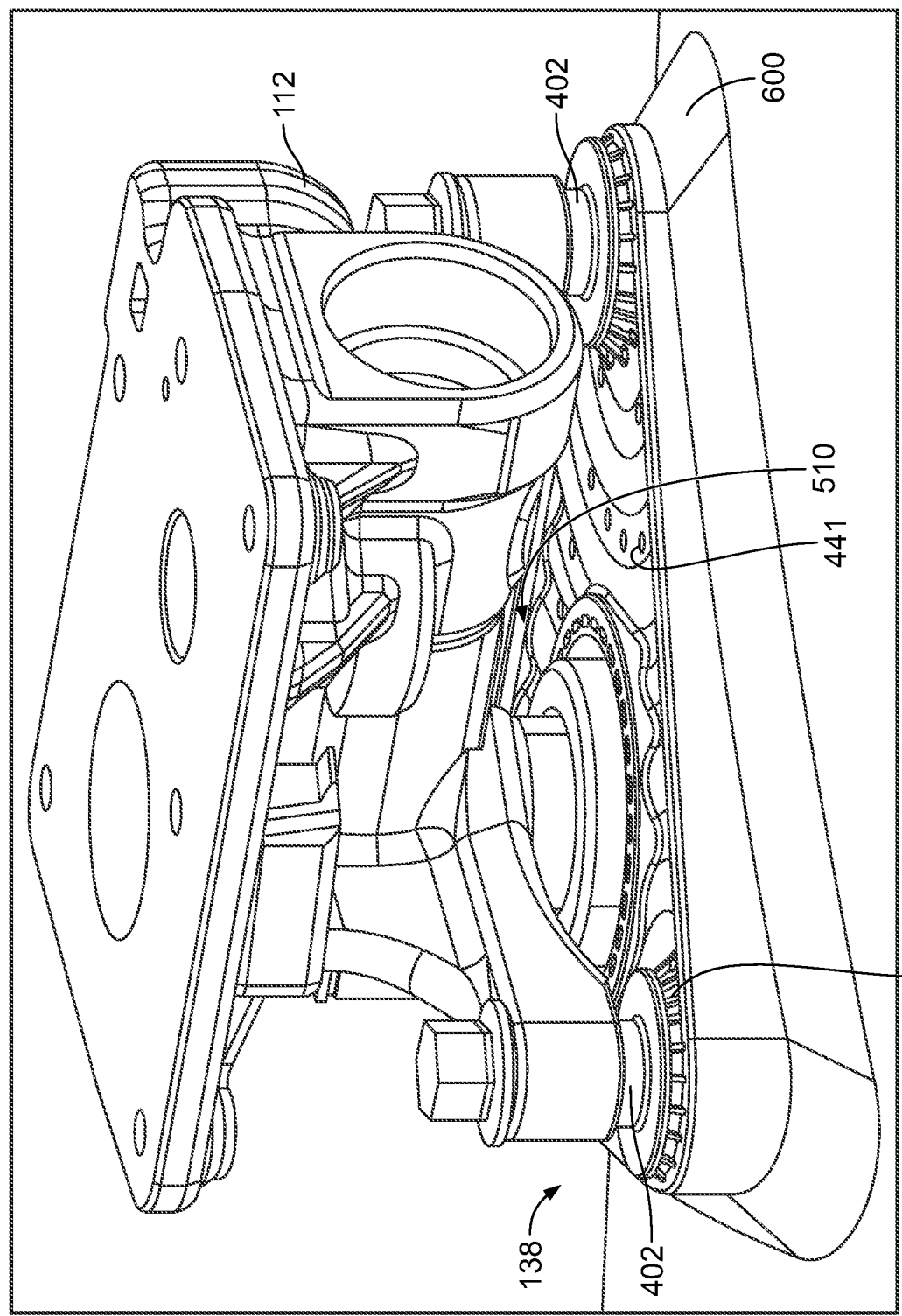
FIG. 46 is a perspective view of an example doser mounting bracket welded to an exhaust gas aftertreatment system component.
Figure 50:
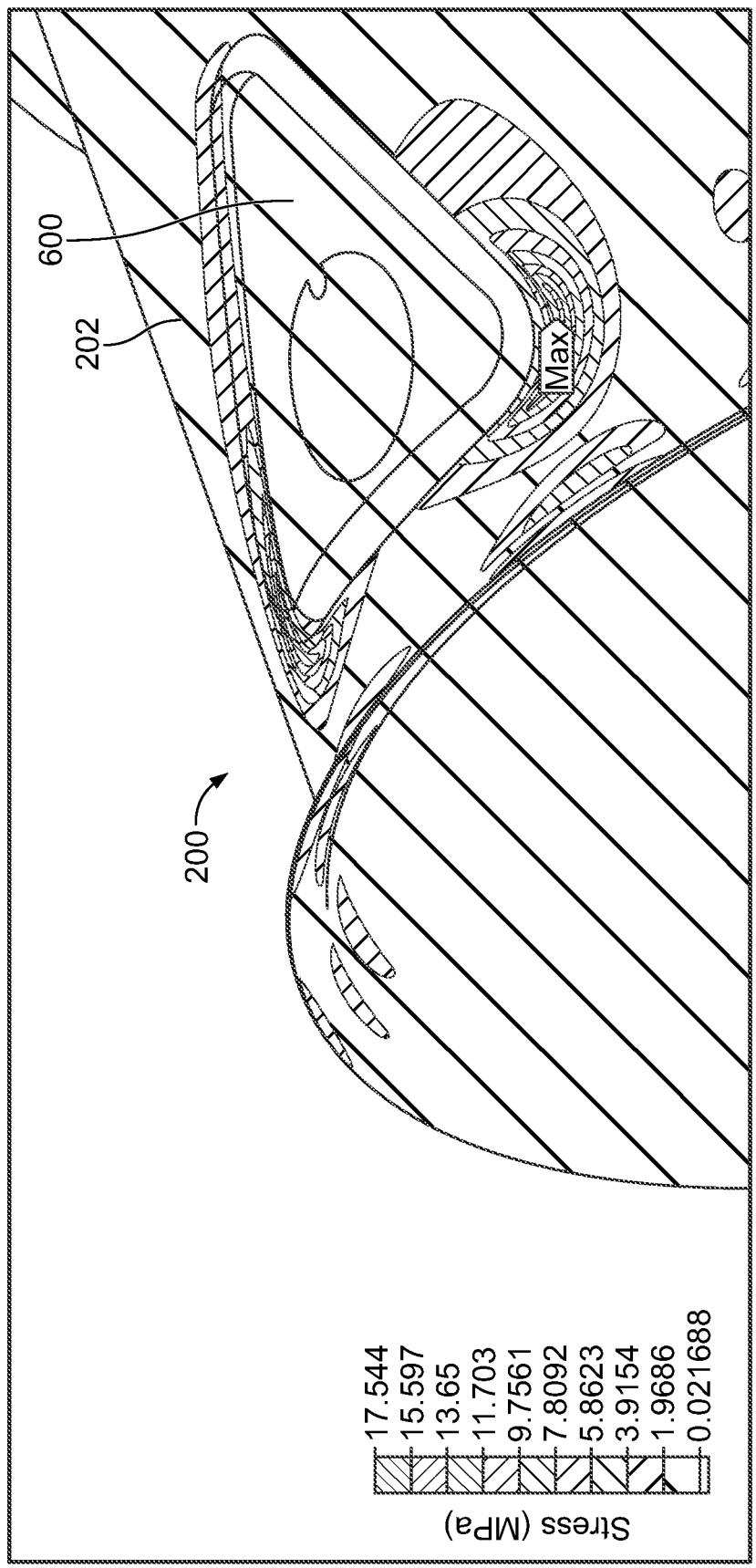
FIG. 50 is a stress plot illustrating stress on a sidewall of the exhaust gas aftertreatment system resulting from the welded attachment of the doser mounting bracket to the exhaust gas aftertreatment system shown in FIG. 46.

FIG. 46 shows a doser 112 coupled to (e.g. attached, supported by, etc.) the doser mounting bracket 138 of FIGS. 41-45 according to an example embodiment. The doser mounting bracket 138 is coupled to the exhaust gas aftertreatment system component 200 via a welded connection 600. As illustrated by a comparison of FIG. 2 and FIG. 46, the various heat mitigating features of the doser mounting bracket 138 of FIGS. 41-45 are configured to increase the air gap 510 between the doser 112 and the doser mounting bracket 138 as compared to the air gap 510 defined between the doser mounting bracket 138 embodiment of FIGS. 2-22 and the doser 112. As evidenced by the heat maps of FIGS. 47-49, the increased air gap 510 (as well as other heat-mitigating features of the doser mounting bracket 138 of FIGS. 41-44 described above) minimizes the heat transferred to the doser 112 from the exhaust gas aftertreatment system component 200. Additionally, as illustrated by the stress plot of FIG. 50, the increased air gap 510 (as well as other heat-mitigating features of the doser mounting bracket 138 of FIGS. 41-44 described above) also minimizes the stress on the sidewall 202 resulting from the welded connection 600 between the doser mounting bracket 138 and the exhaust gas aftertreatment system component 200 (such as, e.g., shown in FIG. 46).

Figure 47:
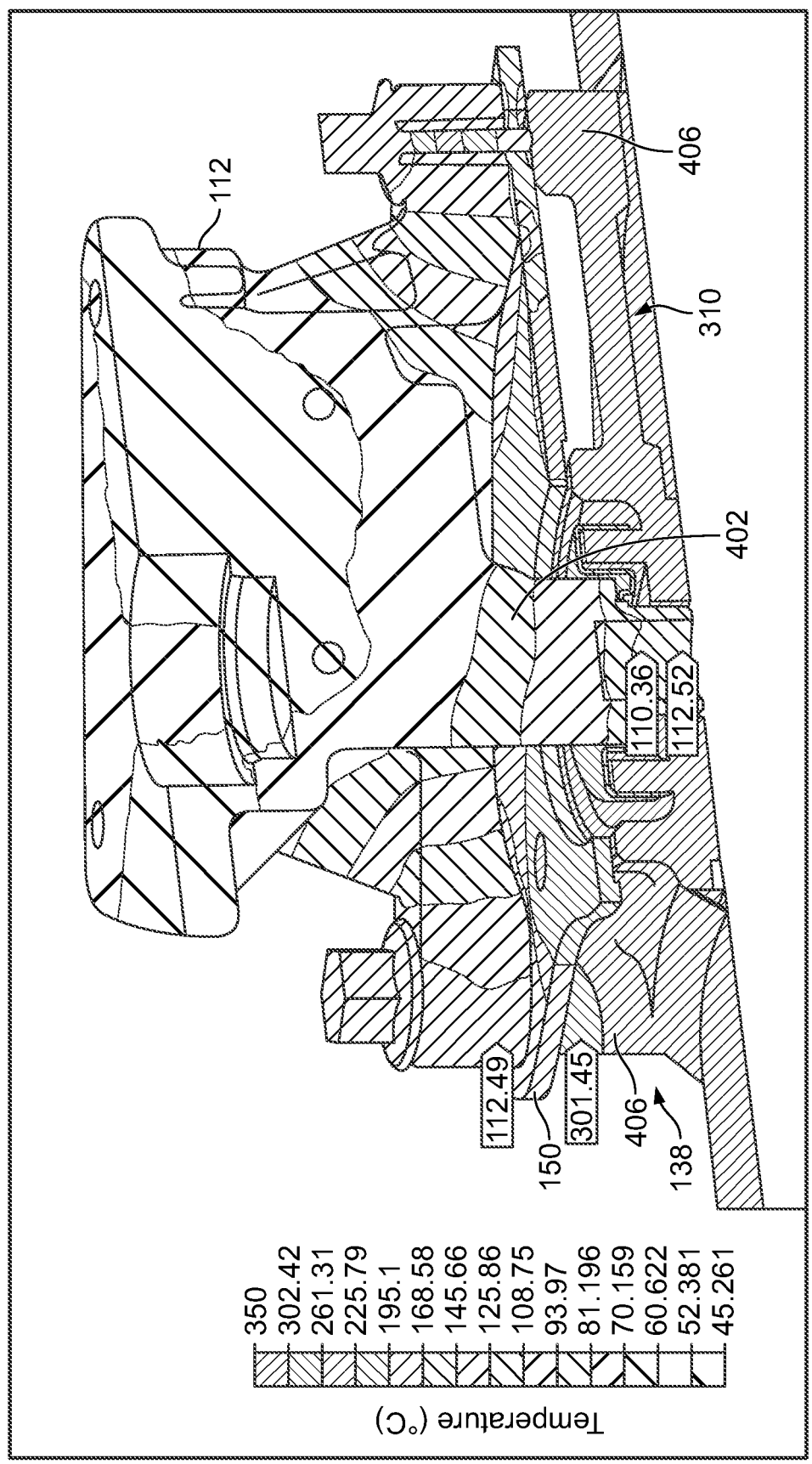
FIG. 47 is a heat map illustrating heat transfer from an exhaust gas aftertreatment system component to a doser mounted to an example doser mounting bracket with thermal a thermally insulating material provided between the doser and doser mounting bracket.

A heat map illustrating heat transferred to a doser 112 mounted to the doser mounting bracket of FIGS. 2-22 from the exhaust gas aftertreatment system component 200 is shown in FIG. 47. As illustrated by FIG. 47, when used with a gasket 150 (or other component formed of a thermally insulating material 700), the doser mounting bracket 138 of FIGS. 2-22 advantageously provides a thermal barrier sufficient to maintain the doser 112 at a temperature of approximately 120° C. (e.g., 115° C., 110° C., 105° C., etc.) or less when the temperature of the sidewall 202 is approximately 350° C. (e.g., 340° C., 345° C., 355° C., 360° C., etc.) or greater.

Figure 48:
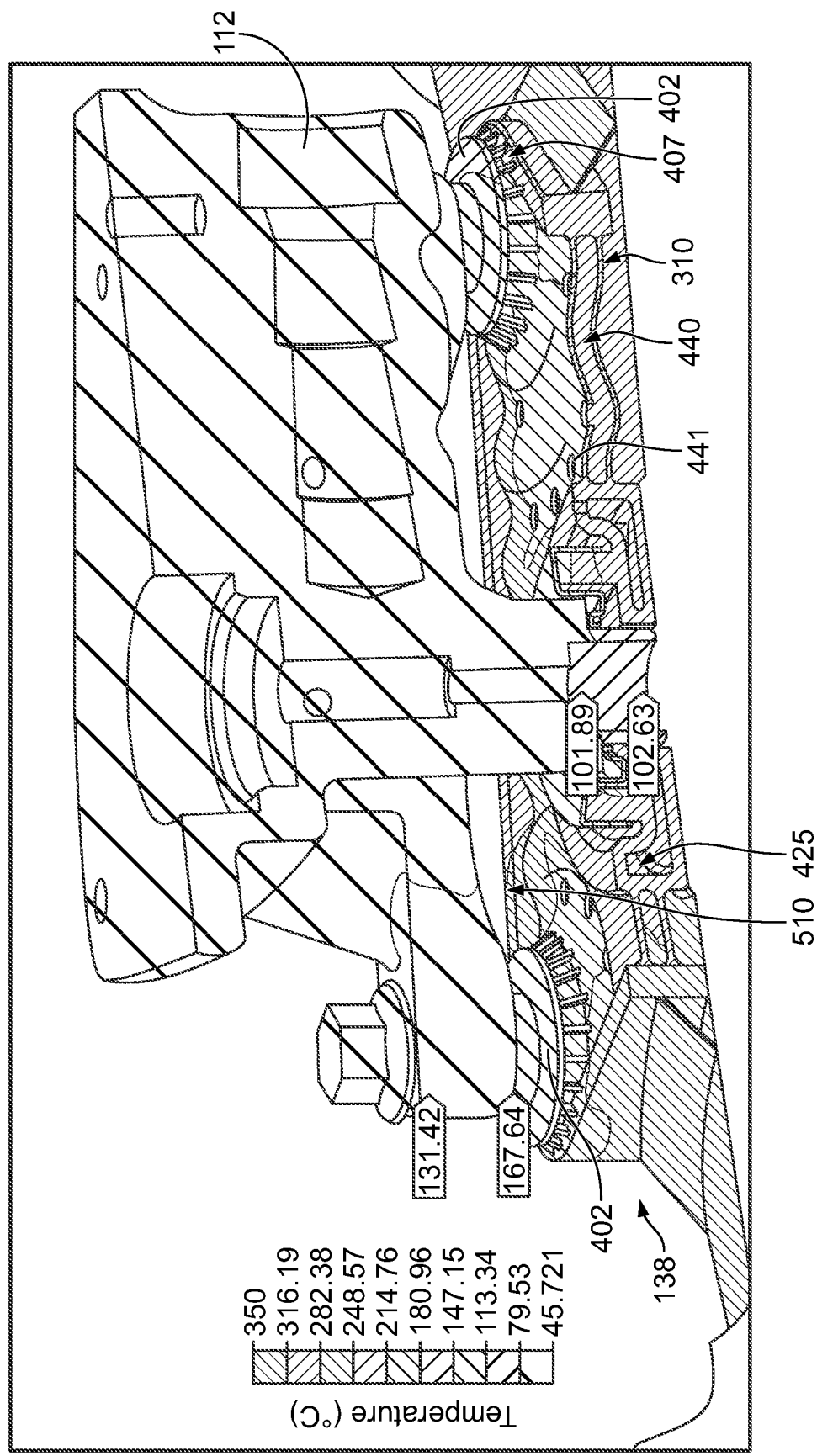
FIG. 48 is a heat map illustrating heat transfer from an exhaust gas aftertreatment system component to a doser mounted to an example mounting bracket.

A heat map illustrating heat transferred to a doser 112 mounted to the doser mounting bracket of FIGS. 41-45 from the exhaust gas aftertreatment system component 200 is shown in FIG. 48. As illustrated by FIG. 48, the various heat mitigating features of the doser mounting bracket of FIGS. 41-45 advantageously provide a thermal barrier sufficient to reduce the heat transferred to the doser 112 such that the doser 12 is at a temperature of approximately 140° C. (e.g., 145° C., 140° C., 135° C., etc.) or less when the temperature of the sidewall 202 is approximately 350° C. (e.g., 340° C., 345° C., 355° C., 360° C., etc.) or greater.

In various embodiments, a thermally insulating material 700 (e.g., mica, ceramic material, etc.) may be positioned between the upper surfaces of the attachment structures 406 and the doser 112. A heat map illustrating the effect of positioning such a thermally insulating material 700 on the heat transferred to a doser 112 mounted to the doser mounting bracket of FIGS. 41-45 from the exhaust gas aftertreatment system component 200 is shown in FIG. 49. As illustrated by FIG. 49, the additional thermal barrier provided by the thermally insulating material 700 further reduces the temperature of the doser 112 to approximately 70° C. (e.g., 65° C., 60° C., 55° C., etc.) or less when the temperature of the sidewall 202 is approximately 350° C. (e.g., 340° C., 345° C., 355° C., 360° C., etc.) or greater.

In various embodiments, the thermally insulating material 700 (e.g., mica, ceramic material, etc.) may also be inserted by an operator into any one or more of the other air spaces (e.g. pocket 310, recess 405, air gap 407, cavity 425, cavity 440, air gap 510, etc.) prior to, during, the coupling of the doser mounting bracket 138 to the exhaust gas aftertreatment system component 200 and doser 112. As illustrated by FIG. 49, in these embodiments, the thermally insulating material 700 may be configured to mitigate heat transfer to a greater extent than air (e.g., the thermally insulating material has a coefficient of thermal conductivity that is less than the coefficient of thermal conductivity of air, etc.).

While the doser 112 and the doser mounting bracket 138 are depicted as separate components, it is understood that the doser mounting bracket 138 may be structurally integrated within the doser 112. In these embodiments, the doser 112 is capable of being coupled to the exhaust gas aftertreatment system component 200 as the doser mounting bracket 138 described herein.

Additionally, while the doser mounting bracket 138 and the exhaust gas aftertreatment system component 200 are depicted as separated components, it is understood that the doser mounting bracket 138 may be structurally integrated within the exhaust gas aftertreatment system component 200. In these embodiments, the doser 112 is capable of being coupled to the exhaust gas aftertreatment system component 200 as the doser mounting bracket 138 described herein.

According to some embodiments, the sidewall 202 of the exhaust gas aftertreatment system component 200 optionally includes a mounting platform that is integrally formed (e.g. is attached to define a single structure, is monolithic, etc.) with the sidewall 202. The mounting platform is configured to facilitate the identification of the mounting location of the doser mounting bracket 138 along the exhaust gas aftertreatment system component 200, and also provides an additional safeguard against misalignment of the doser mounting bracket 138 relative to the exhaust gas aftertreatment system component 200. The mounting platform is also configured to assist in mitigating heat transfer to the doser 112 by offsetting (e.g. spacing apart) the doser mounting bracket 138 from the exhaust gas aftertreatment system component 200.

Figure 2:
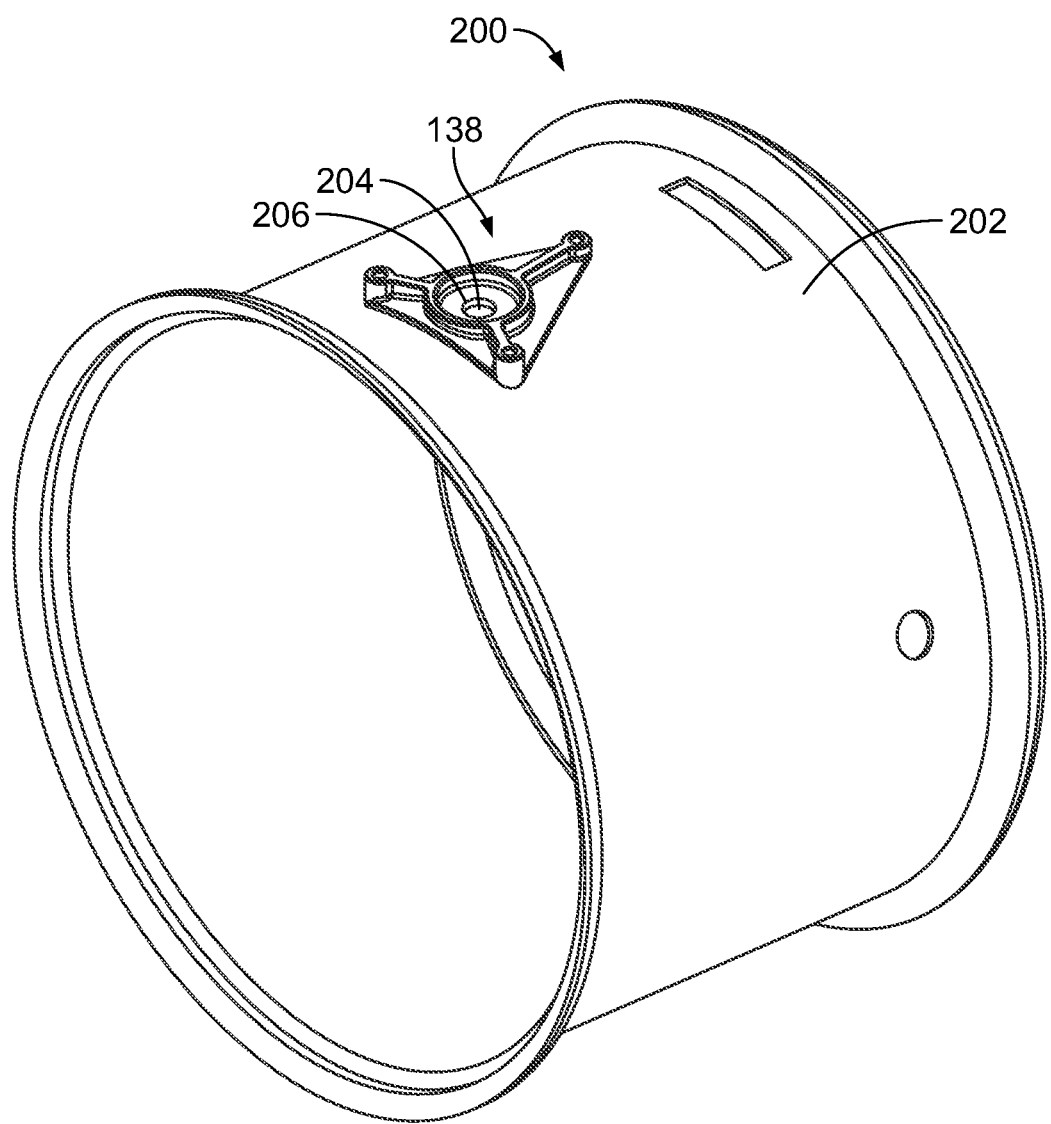
FIG. 2 is a perspective view of an example doser mounting bracket mounted to an exhaust gas aftertreatment system component.
Figure 51:
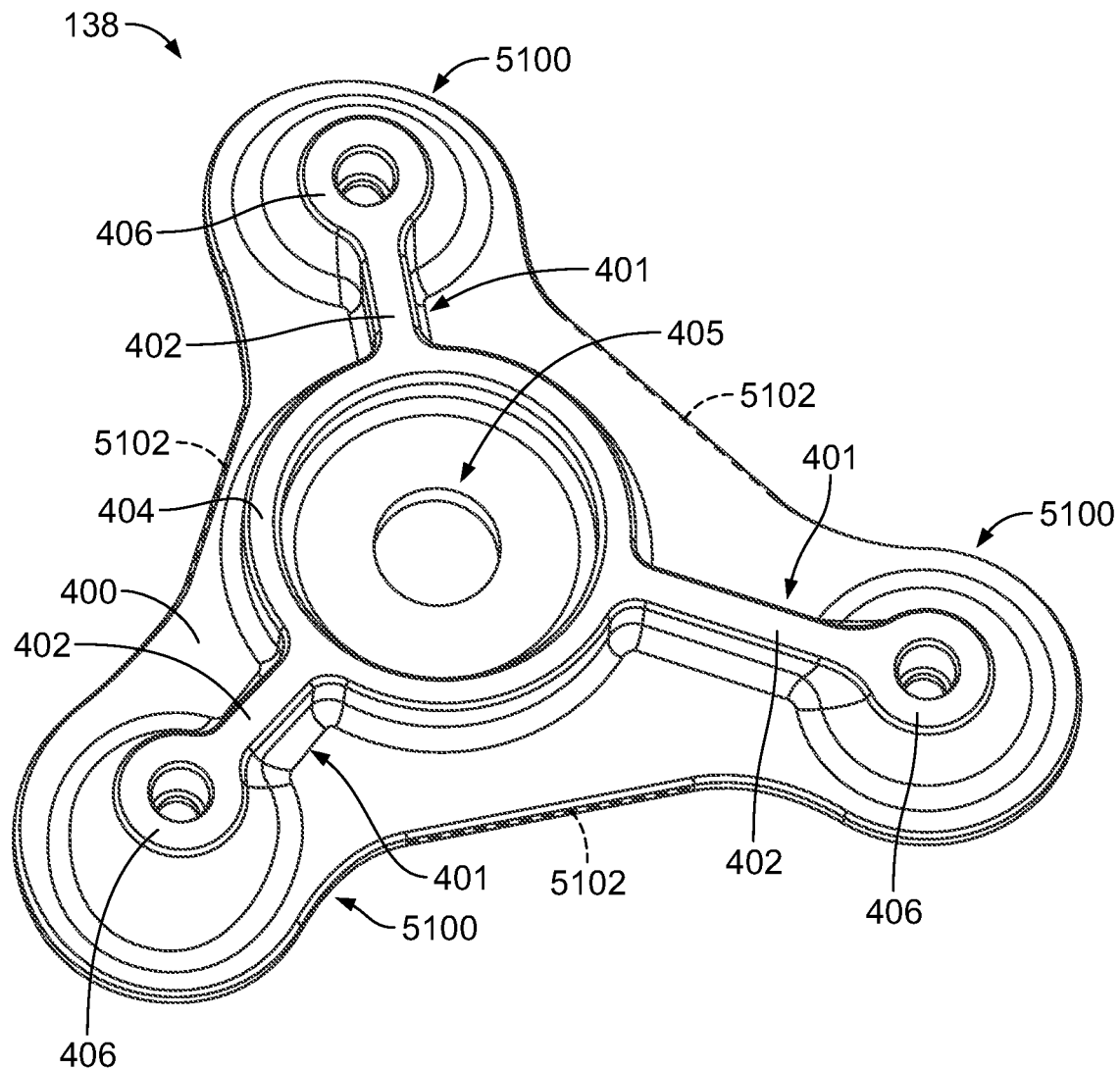
FIG. 51 is a top perspective view of an example doser mounting bracket.

FIGS. 51-62 depict the doser mounting bracket 138 according to various embodiments. The doser mounting bracket 138 is configured to be coupled to the exhaust gas aftertreatment system component 200 as shown in FIG. 2. Referring to FIG. 51, the doser mounting bracket 138 includes the upper surface 400, the support arms 401, the support structures 402, the central support 404, the recess 405, and the attachment structures 406, as previously described.

The attachment structures 406 in the doser mounting bracket 138 shown in FIGS. 51-62 are at least partially frustoconical, as opposed to the generally cylindrical attachment structures 406 of the doser mounting bracket 138 shown in FIG. 4, for example. This frustoconical shape may mitigate stress concentrations and facilitate coupling of the doser mounting bracket 138 to the exhaust gas aftertreatment system component 200 and/or the doser 112.

In addition to being frustoconical, a surface area of the attachment structures 406 that is in contact with the doser 112 when the doser 112 is coupled to the doser mounting bracket 138 is greater in the doser mounting bracket 138 shown in FIGS. 51-62 than the doser mounting bracket shown in FIG. 4, for example. This increased surface area mitigates movement of the doser 112 relative to the doser mounting bracket 138 when the doser 112 is coupled to the doser mounting bracket 138.

Figure 52:
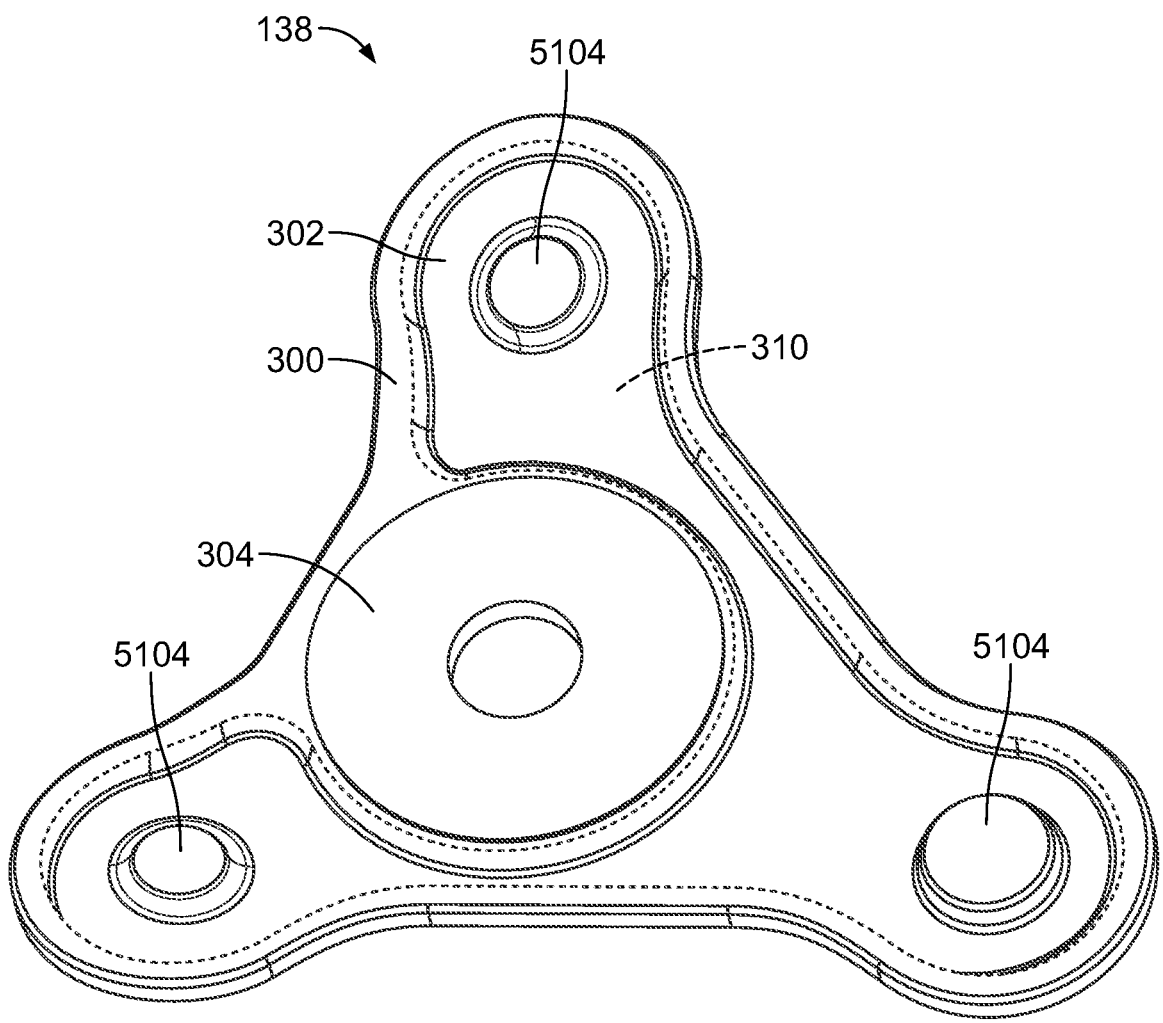
FIG. 52 is a bottom perspective view of the doser mounting bracket of FIG. 51.
Figure 53:
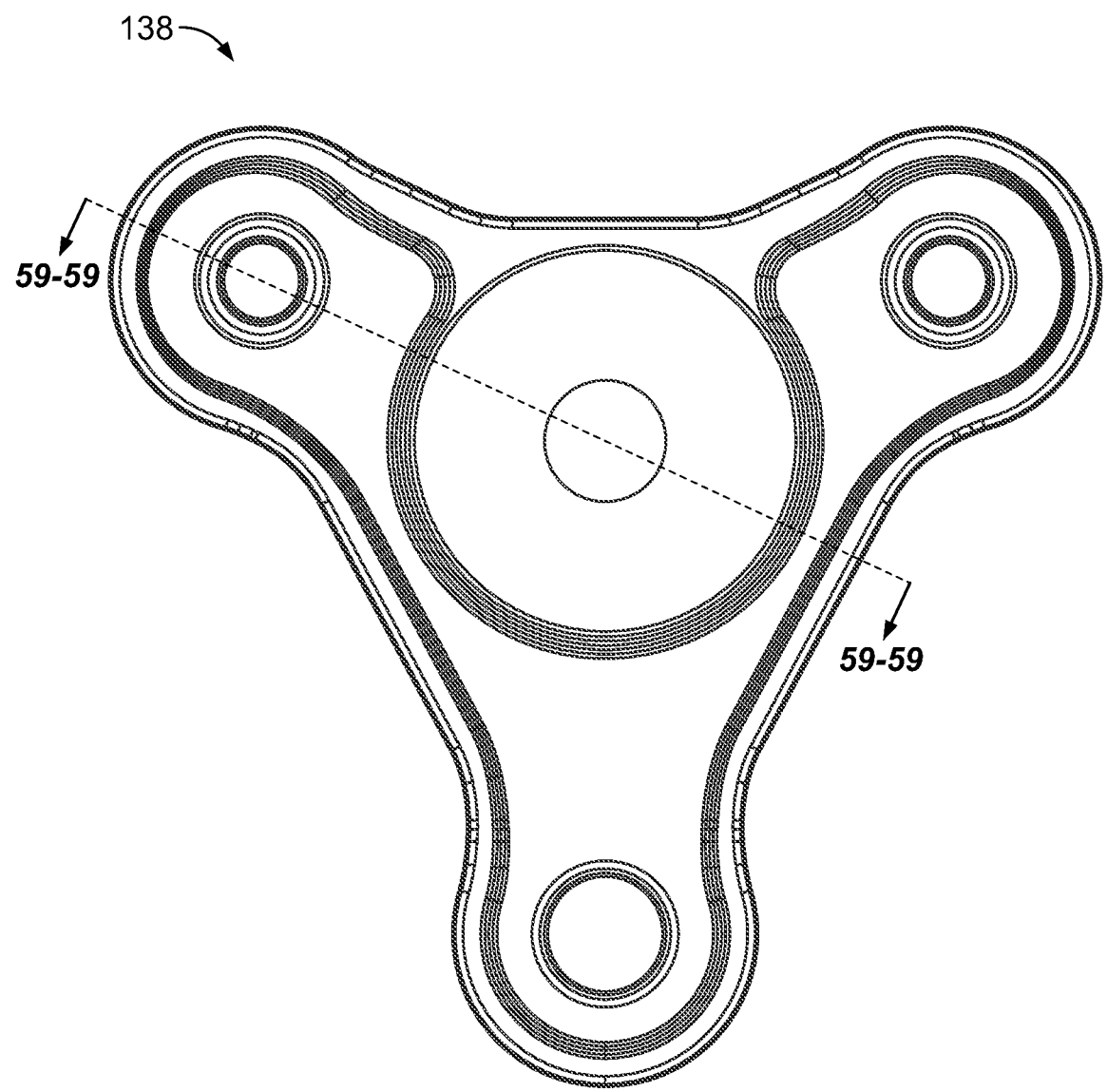
FIG. 53 is a bottom view of the doser mounting bracket of FIG. 51.
Figure 54:
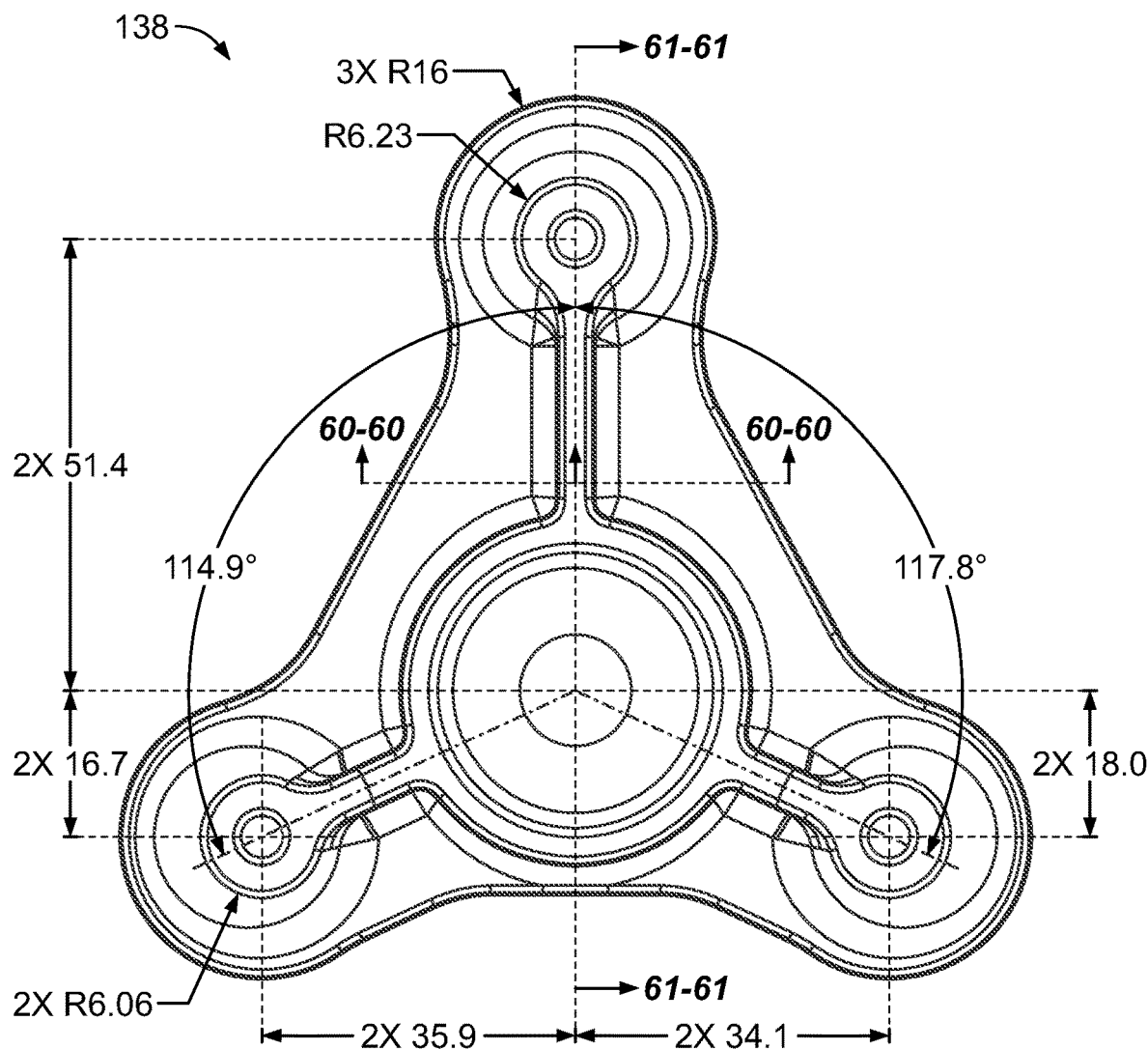
FIG. 54 is a top view of the doser mounting bracket of FIG. 51.
Figure 55:
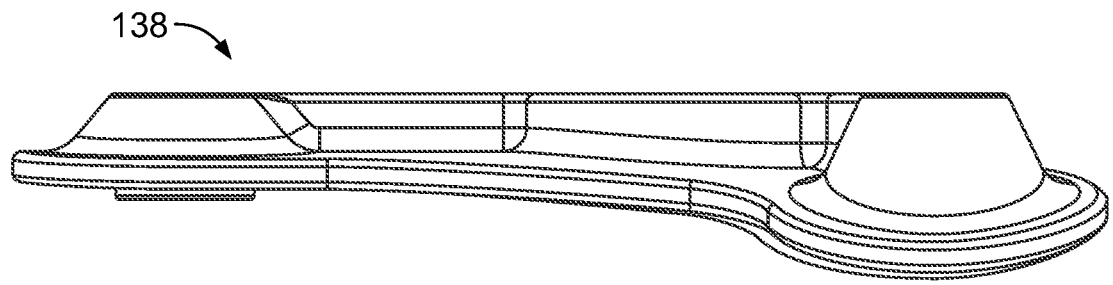
FIG. 55 is a left side view of the doser mounting bracket of FIG. 51.
Figure 56:
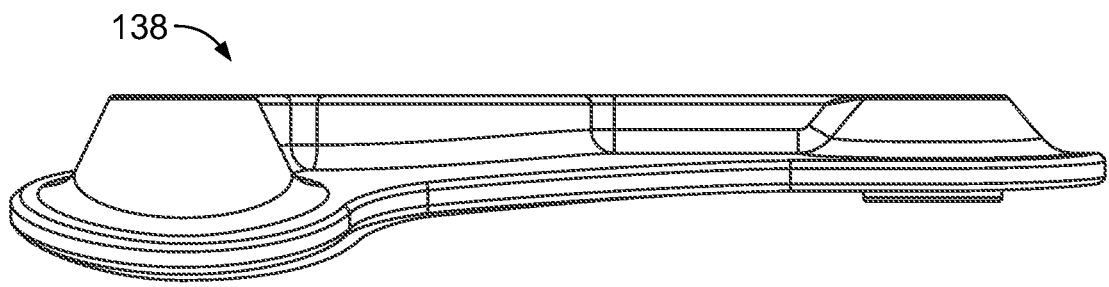
FIG. 56 is a right side view of the doser mounting bracket of FIG. 51.
Figure 57:
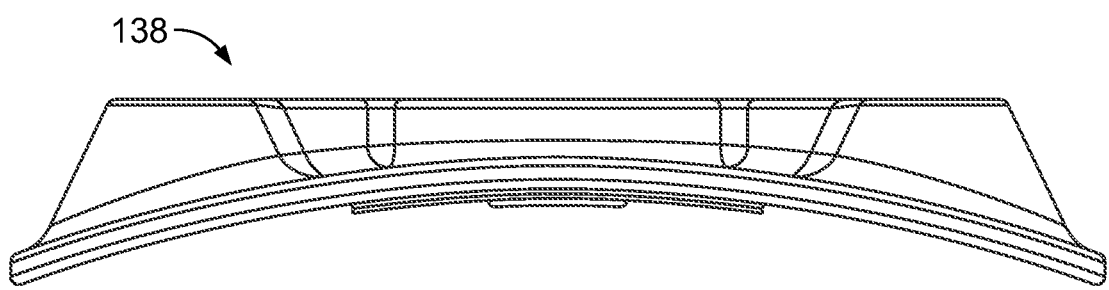
FIG. 57 is a front view of the doser mounting bracket of FIG. 51.
Figure 58:
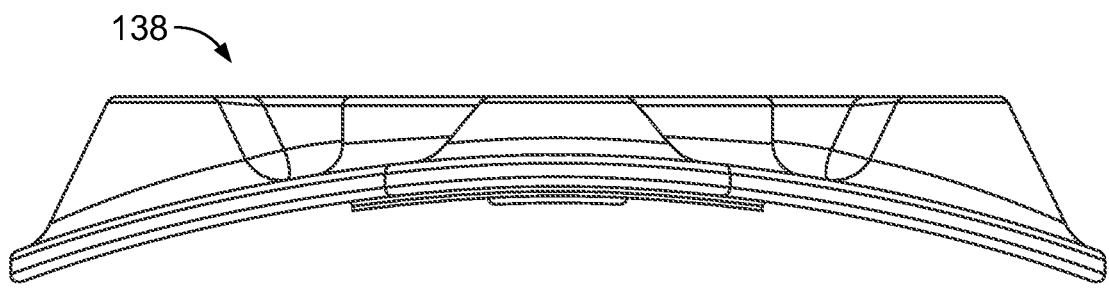
FIG. 58 is a rear view of the doser mounting bracket of FIG. 51.
Figure 59:
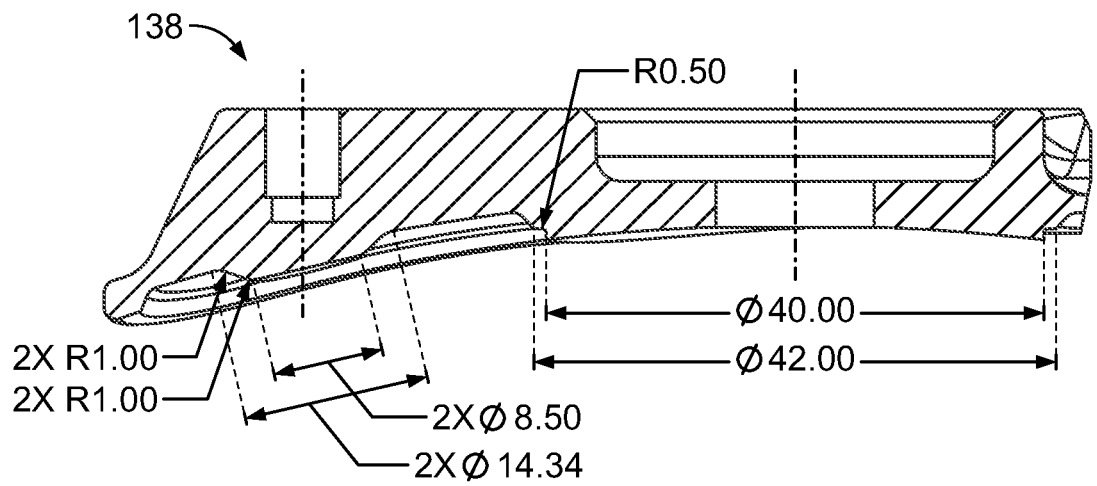
FIG. 59 is a cross-sectional view of the doser mounting bracket of FIG. 51 taken along line 59-59 of FIG. 53.
Figure 60:
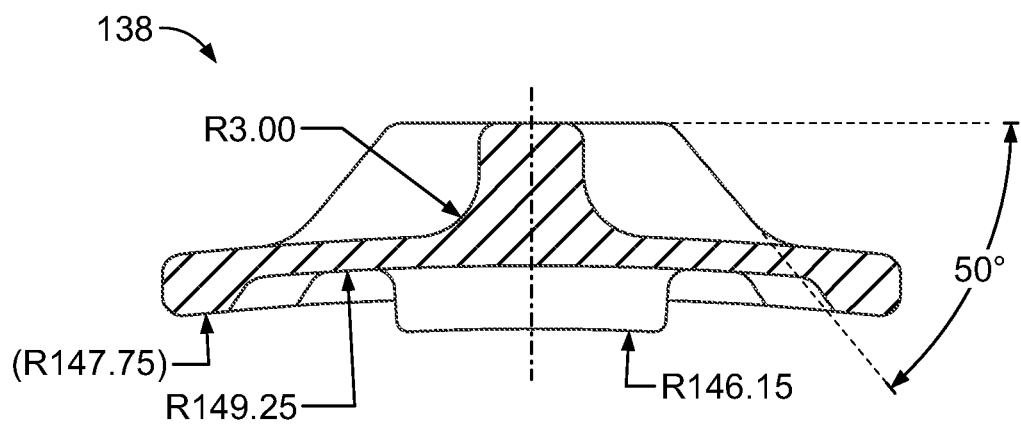
FIG. 60 is a cross-sectional view of the doser mounting bracket of FIG. 51 taken along line 60-60 of FIG. 54.
Figure 61:
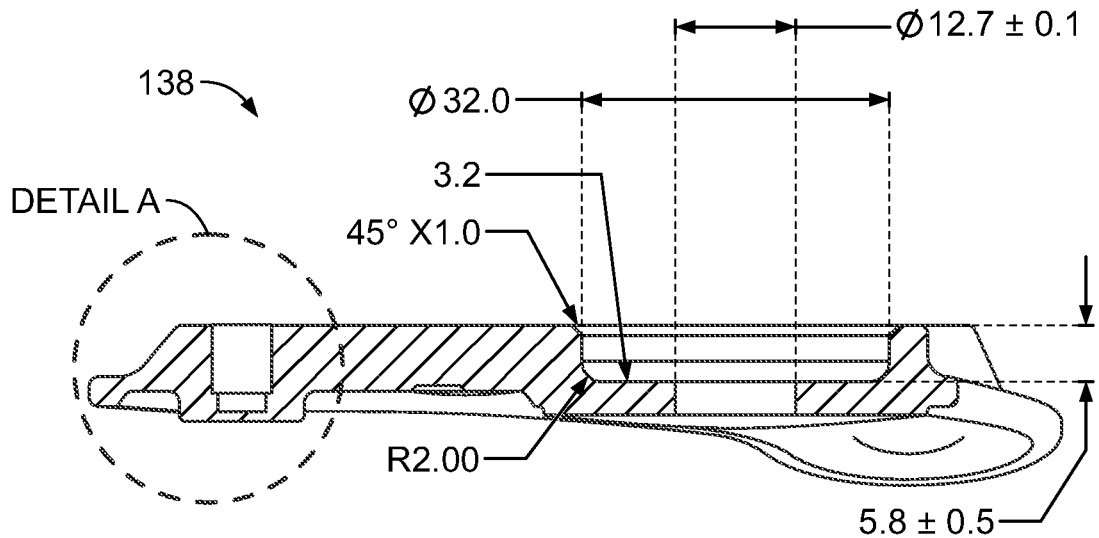
FIG. 61 is a cross-sectional view of the doser mounting bracket of FIG. 51 taken along line 61-61 of FIG. 54.

As shown in FIG. 52, the doser mounting bracket 138 includes the engagement wall 300, the lower surface 302, and the centering structure 304 as previously described. The engagement wall 300, the lower surface 302, and the centering structure 304 cooperate to define the pocket 310, as previously described. In some embodiments, the centering structure 304 does not include the lug receiver 306. In these embodiments, the exhaust gas aftertreatment system component 200 may not include the lug 308.

The doser mounting bracket 138 includes a plurality of corners 5100. The corners 5100 may be partially circular. Each of the corners 5100 extends around one of the attachment structures 406. Each of the corners 5100 is connected to another of the corners 5100 via an edge 5102. The edges 5102 are curved inwardly (e.g., towards the central support 404, towards the centering structure 304, etc.) relative to the corners 5100. In this way, the edges 5102 and the corners 5100 cooperate to minimize a volume of the doser mounting bracket 138 by removing material in relatively low stress locations, such as locations that are halfway between two adjacent attachment structures 406. By removing this excess material, a mass of the doser mounting bracket 138 is decreased. In some embodiments, the edges 5102, in contrast to the corners 5100, are each disposed along a straight line.

The lower surface 302 also includes a plurality of protrusions 5104 (e.g., posts, lugs, etc.). The protrusions 5104 extend from the lower surface 302 towards the exhaust gas aftertreatment system component 200 when the doser mounting bracket 138 is coupled to the exhaust gas aftertreatment system component 200.

Figure 62:
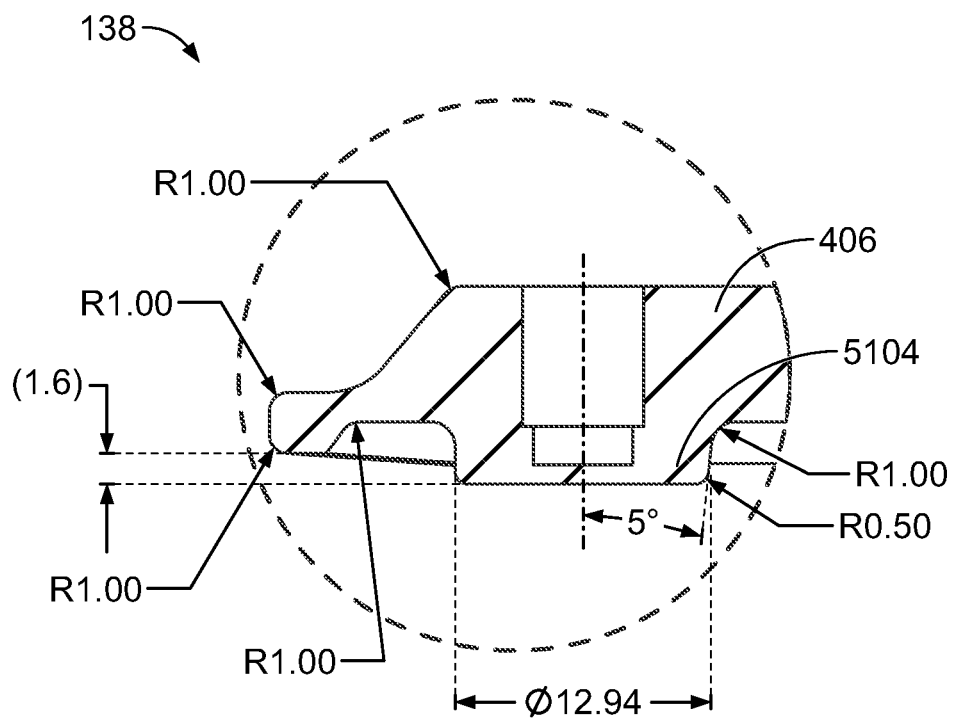
FIG. 62 is a detailed view of DETAIL A in FIG. 61.

Each of the protrusions 5104 is aligned with one of the attachment structures 406. As a result, the protrusions 5104 provide an increased depth for fasteners received in the attachment structures 406 compared to if the protrusions 5104 were not included. This increased depth facilitates minimizing of a thickness of the doser mounting bracket 138, and therefore minimizing a volume of the doser mounting bracket 138. As shown in FIG. 62, this increased depth enables a hole in the attachment structure 406 to extend into the protrusion 5104. In some embodiments, the protrusions 5104 are frustoconical and have a greatest diameter and a smallest diameter that is approximately equal to half of the greatest diameter. In some embodiments, the greatest diameter is approximately equal to 15 millimeters and the smallest diameter is approximately equal to 8 millimeters.

In various embodiments, the exhaust gas aftertreatment system component 200 includes protrusion receivers that are each configured to receive one of the protrusions 5104. Similar to the interaction between the lug 308 and the lug receiver 306 of the doser mounting bracket 138 shown in FIG. 4, the protrusions 5104 and the protrusion receivers facilitate rotational locking of the doser mounting bracket 138 relative to the exhaust gas aftertreatment system component 200 (e.g., when the protrusions 5104 are received within the protrusion receivers.

FIGS. 54 and 59-62 illustrate the doser mounting bracket 138 with dimensions (in millimeters) used in various embodiments of the doser mounting bracket 138 annotated.

In various embodiments, a maximum thickness of the doser mounting bracket 138 is less than approximately 20 millimeters (e.g., within 5% of 20 millimeters, within 3% of 20 millimeters, etc.). For example, a maximum thickness of the doser mounting bracket may be substantially equal to 17.4 millimeters.

In some embodiments, the doser mounting bracket 138 is assembled via additive manufacturing. For example, the doser mounting bracket 138 may be assembled using three-dimensional (3D) printing, selective laser sintering, or other similar processes. As outlined above, the doser mounting bracket 138 is configured such that all components of the doser mounting bracket 138 are integrally formed. As explained above, the components of the doser mounting bracket 138 are "integrally formed" when the components of the doser mounting bracket 138 are formed and joined together as part of a single manufacturing step to a create a single-piece or unitary construction, the doser mounting bracket 138, that cannot be disassembled without an at least partial destruction of the doser mounting bracket 138. For example, the components of the doser mounting bracket 138 are: (i) not separable from each other (e.g., one component of the doser mounting bracket 138 cannot be separated from the doser mounting bracket 138 without destroying the doser mounting bracket 138, etc.); (ii) not formed separately from each other (e.g., the components of the doser mounting bracket 138 are formed simultaneously, the components of the doser mounting bracket 138 are formed as a single component in a single process, etc.); and (iii) there are no gaps or joints along borders between contiguous components of the doser mounting bracket 138 (e.g., components that share a border, etc.). In some embodiments, the doser mounting bracket 138 is constructed entirely of stainless steel (e.g., stainless steel 316, etc.). In other embodiments, the doser mounting bracket 138 is constructed entirely of aluminum or steel.

Additionally, because the doser mounting bracket 138 is assembled via additive manufacturing, a wall thickness of the doser mounting bracket 138 may be less than wall thicknesses of mounts in other systems. Specifically, by using the additive manufacturing process described herein, structural characteristics of the doser mounting bracket 138 may be attained that are not otherwise possible in components that are joined together. For example, components that are separately manufactured and then joined together may need to be thicker than an additive manufactured component such as the doser mounting bracket 138 because the components that are joined together are subjected to stresses due to fasteners, adhesive, and/or welds along joints between the components that are joined together. By eliminating these joints, additive manufactured components such as the doser mounting bracket 138 do not need to be as thick in analogous areas.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W to P, etc.) herein are inclusive of their maximum values and minimum values (e.g., W to P includes W and includes P, etc.), unless otherwise indicated. Furthermore, a range of values (e.g., W to P, etc.) does not necessarily require the inclusion of intermediate values within the range of values (e.g., W to P can include only W and P, etc.), unless otherwise indicated.

What is claimed is:

1. A doser mounting bracket for coupling a doser to an exhaust gas aftertreatment system component having a sidewall and an exhaust gas aftertreatment system component opening, the doser mounting bracket comprising:
   a lower surface configured to be held in a position opposing the sidewall;
   an engagement wall extending from the lower surface and configured to interface with the sidewall;
   a central structure having an opening that extends therethrough, the central structure comprising a centering structure that extends from the lower surface and is configured to be received within the exhaust gas aftertreatment system component opening;
   an upper surface; and
   an attachment structure extending from the upper surface and configured to be coupled to the doser;
   wherein the engagement wall is configured to separate the lower surface from the sidewall when the engagement wall interfaces with the sidewall such that a pocket is formed between the engagement wall, the centering structure, and the lower surface; and
   wherein the central structure further comprises a central support extending from the upper surface around the opening that extends through the central structure.

2. The doser mounting bracket of claim 1, wherein the centering structure comprises a lug receiver configured to receive a lug when the centering structure is received within the exhaust gas aftertreatment system component opening.

3. The doser mounting bracket of claim 1, wherein the engagement wall is defined by a first radius of curvature that is substantially equal to a second radius of curvature that defines the sidewall.

4. The doser mounting bracket of claim 1, wherein the central structure includes a first annular wall and a second annular wall located radially inwards from the first annular wall.

5. The doser mounting bracket of claim 4, wherein the central structure includes an upper wall and a lower wall spaced from the upper wall.

6. The doser mounting bracket of claim 5, wherein the opening is defined by an annular central wall that is attached to and extends between an inner periphery of the upper wall and an inner periphery of the lower wall of the central structure.

7. The doser mounting bracket of claim 6, wherein the first annular wall extends upwards from an outer periphery of the lower wall and the second annular wall extends upwards from an outer periphery of the upper wall.

8. The doser mounting bracket of claim 7, wherein the central structure comprises a connector wall extending between an upper portion of the first annular wall and an upper portion of the second annular wall.

9. The doser mounting bracket of claim 8, wherein a cavity is defined by the first annular wall and second annular wall of the circular structure, the upper wall, the lower wall, the annular central wall, and the connector wall.

10. The doser mounting bracket of claim 9, wherein one or more openings extend through the central structure and fluidly couple the cavity with an ambient environment.

11. The doser mounting bracket of claim 10, wherein the one or more openings extend through the connector wall.

12. The doser mounting bracket of claim 1, wherein the mounting bracket comprises a first wall having the upper surface and a second wall having the lower surface, the first wall and second wall being spaced from one another.

13. The doser mounting bracket of claim 12, wherein an outer periphery of each of the first wall and the second wall is attached to an inner surface of the engagement wall, and an inner periphery of each of the first wall and the second wall is attached to an exterior surface of the central structure.

14. The doser mounting bracket of claim 13, wherein the first wall, the second wall, the engagement wall and the central structure define a cavity.

15. The doser mounting bracket of claim 14, wherein a plurality of openings extend through the first wall and fluidly couple the cavity with an ambient environment.

16. The doser mounting bracket of claim 15, wherein the second wall is a solid structure without any openings extending therethrough.

17. The doser mounting bracket of claim 12, wherein at least one of the first wall or the second wall defines an undulating surface.

18. The doser mounting bracket of claim 17, wherein each of the first wall and the second wall defines an undulating surface.

19. The doser mounting bracket of claim 18, wherein a thickness of the first wall is different than a thickness of the second wall.

20. The doser mounting bracket of claim 19, wherein the thickness of the first wall is less than the thickness of the second wall.

21. The doser mounting bracket of claim 18, wherein at least one of the first wall or second wall has a varying thickness.

22. The doser mounting bracket of claim 1, wherein the attachment structure comprises a plurality of attachment structures extending from various locations along the upper surface.

23. The doser mounting bracket of claim 22, wherein each attachment structure comprises a boss.

24. The doser mounting bracket of claim 23, further comprising a plurality of support structures, each support structure extending from the upper surface between the central structure and a respective one of the bosses.

25. The doser mounting bracket of claim 24, wherein each support structure has an I-shaped cross-section.

26. The doser mounting bracket of claim 24, wherein each support structure has a T-shaped cross-section.

27. The doser mounting bracket of claim 24, wherein each support structure has an V-shaped cross-section.

28. The doser mounting bracket of claim 24, wherein each support structure has an X-shaped cross-section.

29. The doser mounting bracket of claim 24, wherein each support structure includes one or more fins such that each support structure has a multifaceted cross-section configuration.

30. The doser mounting bracket of claim 22, further comprising a plurality of support struts extending between an exterior of each attachment structure and the upper surface.

31. The doser mounting bracket of claim 22, wherein a height of each attachment structure is greater than a height of the central structure.

32. The doser mounting bracket of claim 31, wherein the upper surface extends concavely between the upper surfaces of the attachment structures and the central support.

33. The doser mounting bracket of claim 1, wherein the mounting bracket comprises a single, monolithic wall having each of the upper surface and the lower surface.

34. A doser mounting bracket for coupling a doser to an exhaust gas aftertreatment system component having a sidewall and an exhaust gas aftertreatment system component opening, the doser mounting bracket comprising:
an engagement wall;
a lower surface bordered by the engagement wall, the lower surface recessed relative to the engagement wall so as to cooperate with the engagement wall and the sidewall to define a pocket when the doser mounting bracket is coupled to the sidewall;
an upper surface opposite the lower surface, the upper surface configured to be in confronting relation with the doser when the doser is coupled to the doser mounting bracket;
a doser mounting bracket opening extending through the upper surface and the lower surface, the doser mounting bracket opening configured to receive a portion of the doser when the doser is coupled to the doser mounting bracket; and
an attachment structure protruding from the upper surface and configured to receive a fastener for coupling the doser to the doser mounting bracket.

35. The doser mounting bracket of claim 34, further comprising a protrusion protruding from the lower surface;
wherein the protrusion is aligned with the attachment structure; and
wherein the engagement wall and the protrusion are configured such that the protrusion is separated from the sidewall when the doser mounting bracket is coupled to the sidewall.

36. The doser mounting bracket of claim 34, further comprising a first rounded corner;
wherein the attachment structure is disposed within the first rounded corner.

37. The doser mounting bracket of claim 36, further comprising:
a second rounded corner; and
an edge contiguous with the first rounded corner and the second rounded corner, the edge curved inwardly from the first rounded corner and the second rounded corner.

38. The doser mounting bracket of claim 34, further comprising a central support protruding from the upper surface and extending around the doser mounting bracket opening, the central support and the upper surface cooperating to define a recess.

39. The doser mounting bracket of claim 38, further comprising a support structure protruding from the upper surface and extending between the central support and the attachment structure.

40. The doser mounting bracket of claim 35, further comprising a centering structure protruding from the lower surface;
wherein the doser mounting bracket opening extends through the centering structure.

41. An exhaust gas aftertreatment system comprising:
an exhaust gas aftertreatment system component including a sidewall having an exhaust gas aftertreatment system component opening;
a doser mounting bracket configured to be coupled to the sidewall, the doser mounting bracket comprising:
an engagement wall;
a lower surface bordered by the engagement wall, the lower surface recessed relative to the engagement wall;
an upper surface opposite the lower surface; and
a doser mounting bracket opening extending through the upper surface and the lower surface, the doser mounting bracket opening configured to be aligned with the exhaust gas aftertreatment system component opening when the doser mounting bracket is coupled to the sidewall; and
a doser configured to be coupled to the doser mounting bracket and to be separated from the sidewall by the doser mounting bracket when the doser is coupled to the doser mounting bracket and the doser mounting bracket is coupled to the sidewall;
wherein a pocket is formed between the sidewall, the engagement wall, and the lower surface when the doser mounting bracket is coupled to the sidewall.

42. The exhaust gas aftertreatment system of claim 41, wherein:
   the lower surface is defined by a first radius of curvature; and
   the sidewall is defined by a second radius of curvature that is within 5% of the first radius of curvature.

* * * * *